US006400715B1

United States Patent
Beaudoin et al.

(10) Patent No.: US 6,400,715 B1
(45) Date of Patent: Jun. 4, 2002

(54) NETWORK ADDRESS MATCHING CIRCUIT AND METHOD

(75) Inventors: Denis R. Beaudoin, Missouri City; Jose M. Menendez, Stafford, both of TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 08/715,684

(22) Filed: Sep. 18, 1996

(51) Int. Cl.[7] ............................................... H04L 12/56
(52) U.S. Cl. ...................................... 370/392; 370/402
(58) Field of Search ................................ 370/379, 382, 370/383, 392, 393, 395, 389, 399, 409, 416, 429, 402, 401; 365/49, 190; 395/200, 200.2, 200.21

(56) References Cited

U.S. PATENT DOCUMENTS

| | | | | |
|---|---|---|---|---|
| 5,414,704 A | * | 5/1995 | Spinney | 370/389 |
| 5,414,707 A | * | 5/1995 | Johnston et al. | 370/79 |
| 5,422,838 A | * | 6/1995 | Lin | 365/49 |
| 5,448,565 A | * | 9/1995 | Chang et al. | 370/402 |
| 5,467,349 A | * | 11/1995 | Huey et al. | 370/60.1 |
| 5,475,679 A | * | 12/1995 | Munter | 370/395 |
| 5,481,540 A | * | 1/1996 | Huang | 370/401 |
| 5,684,954 A | * | 11/1997 | Kaiserswerth et al. | 395/200.2 |
| 5,761,191 A | * | 6/1998 | VanDervort et al. | 370/244 |
| 5,812,528 A | * | 9/1998 | VanDervonrt | 370/235 |

* cited by examiner

Primary Examiner—Melvin Marcelo
Assistant Examiner—Chiho Andrew Lee
(74) Attorney, Agent, or Firm—Wade James Brady III; Frederick J. Telecky Jr.

(57) ABSTRACT

A communications system with a circuit having a plurality of communications ports capable of multispeed operation and operable in a first mode that includes address resolution and in a second mode that excludes address resolution and includes a first memory, a plurality of protocol handlers, a bus connected to the protocol handlers, a second memory connected to the bus and a memory controller connected to the bus and the second memory for selectively comparing addresses, transferring data between the protocol handlers and the second memory, and transferring data between the second memory and the first memory. A first embodiment is a local area network controller having a first circuit with a plurality of communications ports capable of multispeed operation and operable in a first mode that includes address resolution and in a second mode that excludes address resolution, and an address lookup circuit interconnected with the first circuit. An integrated circuit having a plurality of protocol handlers, a bus connected to the protocol handlers, a memory connected to the bus, and a memory controller connected to the bus and the memory for selectively comparing addresses, transferring data between the protocol handlers and the memory, and transferring between the memory and an external memory is provided. The address matching circuit has a memory for containing addresses arranged in a linked list, a first state machine for creating and updating the linked list of addresses, a second state machine for provided routing information for a selected address based upon the linked list of addresses and a bus watcher circuit for monitoring data traffic on a bus to detect addresses. An alternative address matching circuit is also provided.

2 Claims, 50 Drawing Sheets

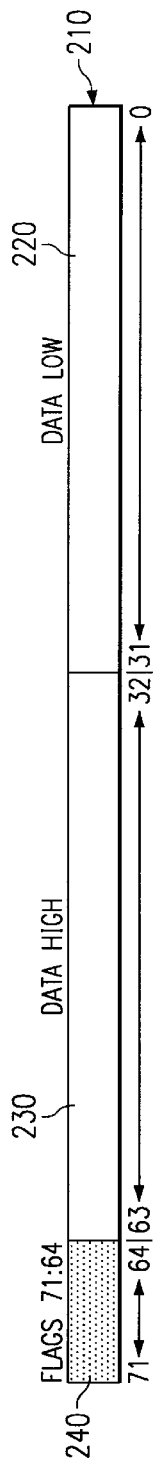
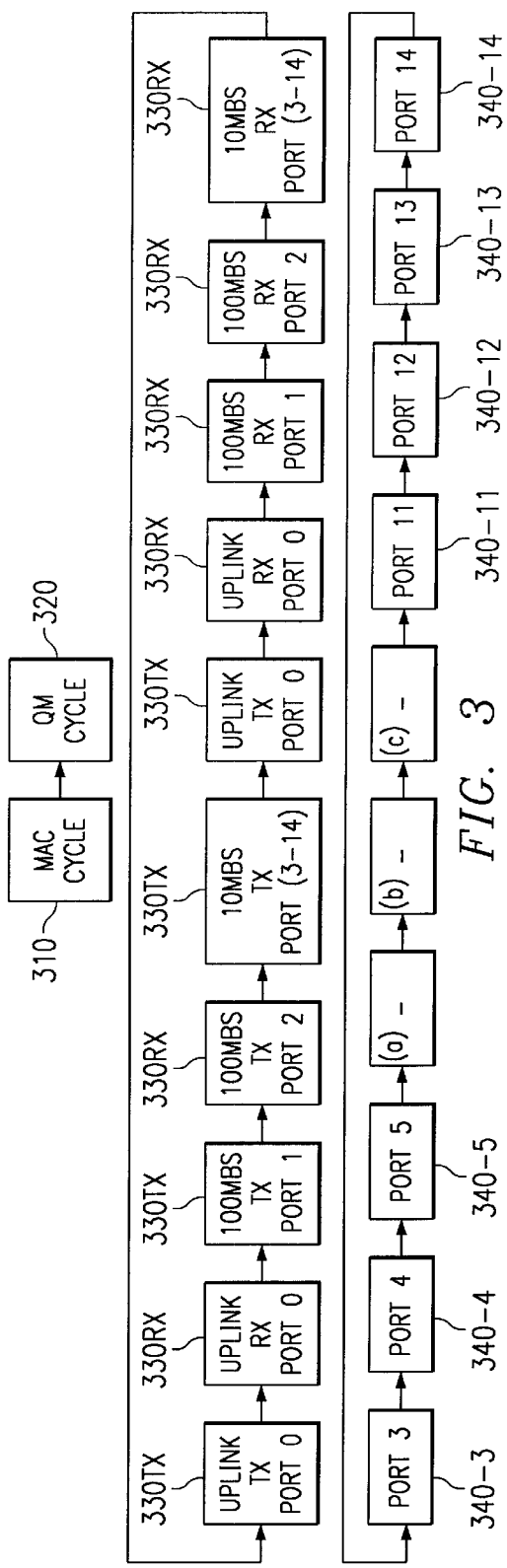
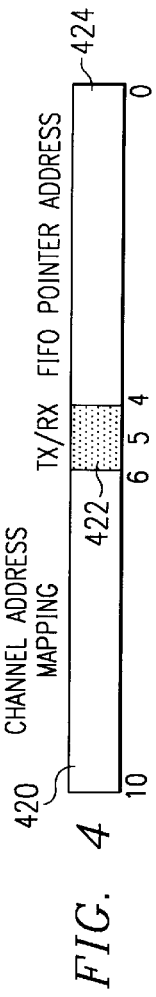
FIG. 2
FIG. 3
FIG. 4

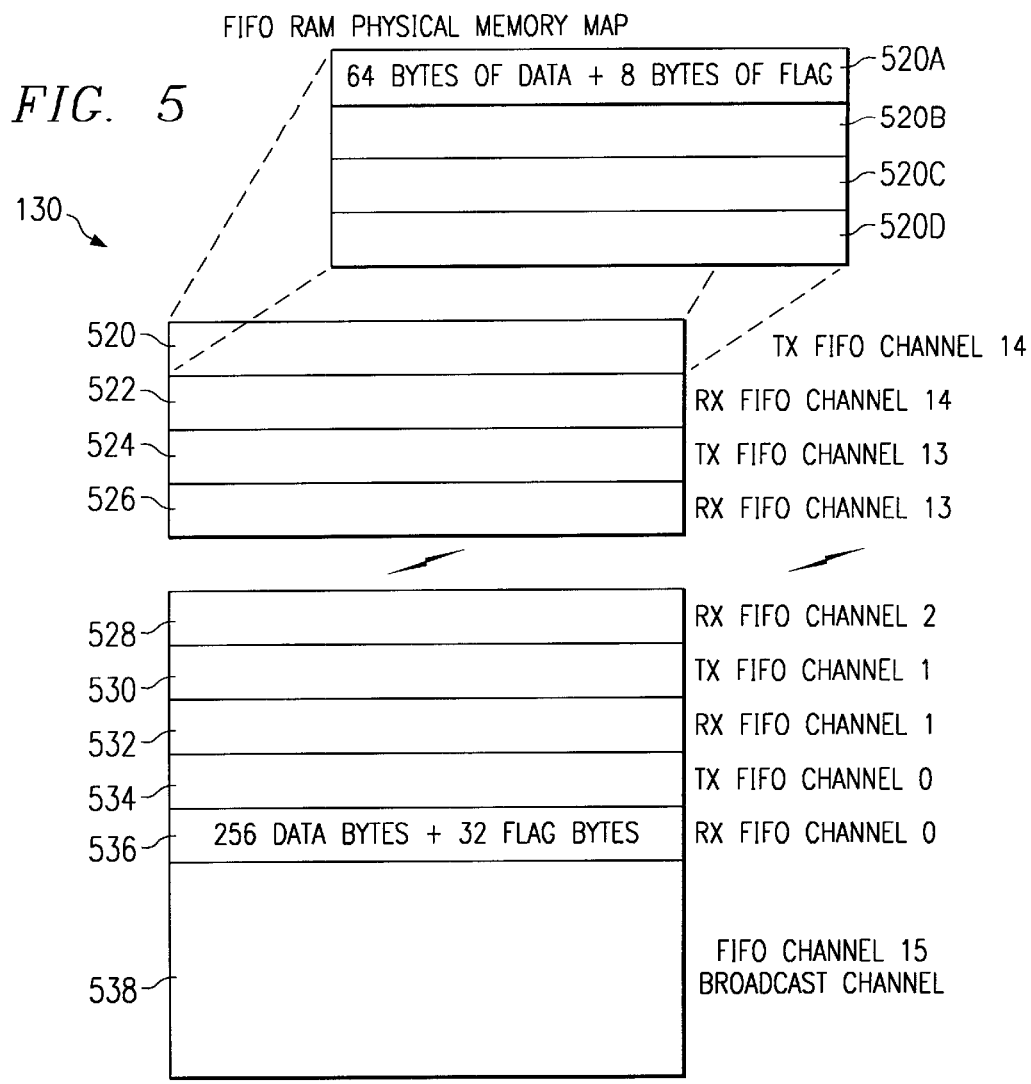
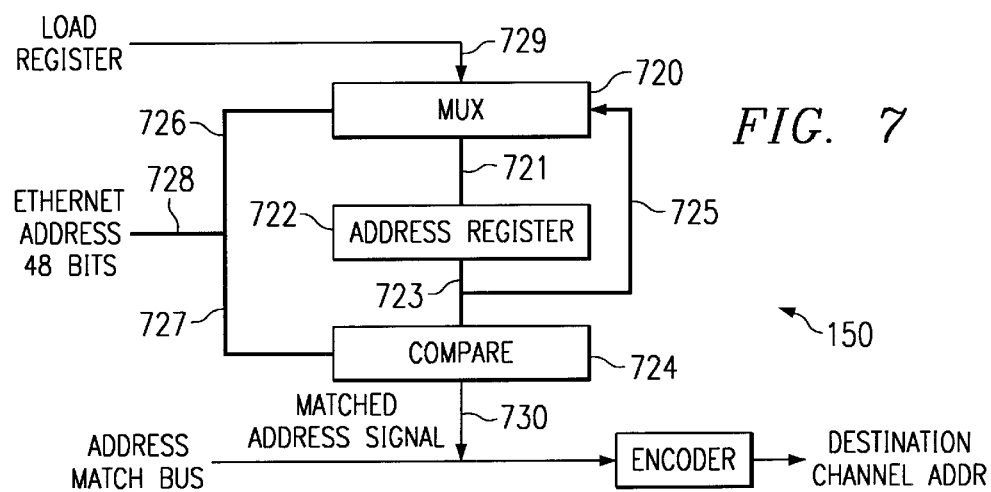

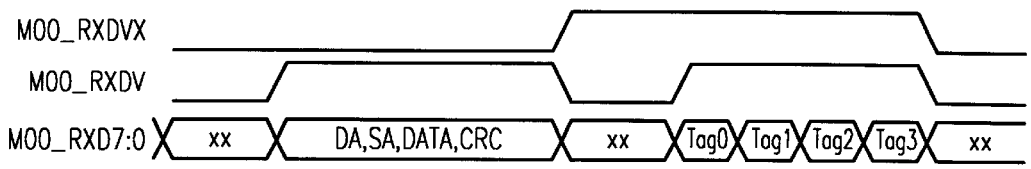
FIG. 29
| | BIT 7 | BIT 6 | BIT 5 | BIT 4 | BIT 3 | BIT 2 | BIT 1 | BIT 0 |
|---|---|---|---|---|---|---|---|---|
| KEYTAG 0: | DEST PORT 8 10MBPS | DEST PORT 7 10MBPS | DEST PORT 6 10MBPS | DEST PORT 5 10MBPS | DEST PORT 4 10MBPS | DEST PORT 3 10MBPS | DEST PORT 2 10/100 | DEST PORT 1 10/100 |
| KEYTAG 1: | RESERVED | | DEST PORT 14 10MBPS | DEST PORT 13 10MBPS | DEST PORT 12 10MBPS | DEST PORT 11 10MBPS | DEST PORT 10 10MBPS | DEST PORT 9 10MBPS |
| KEYTAG 2: | RESERVED | | | | | | | |
| KEYTAG 3: | RESERVED | | | | | | | |
FIG. 30
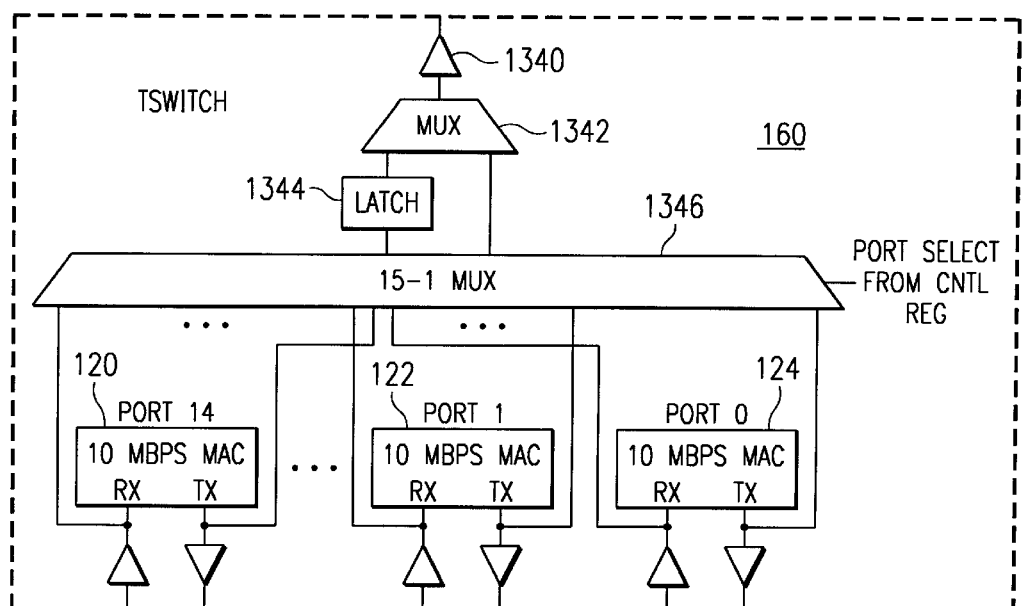
FIG. 32

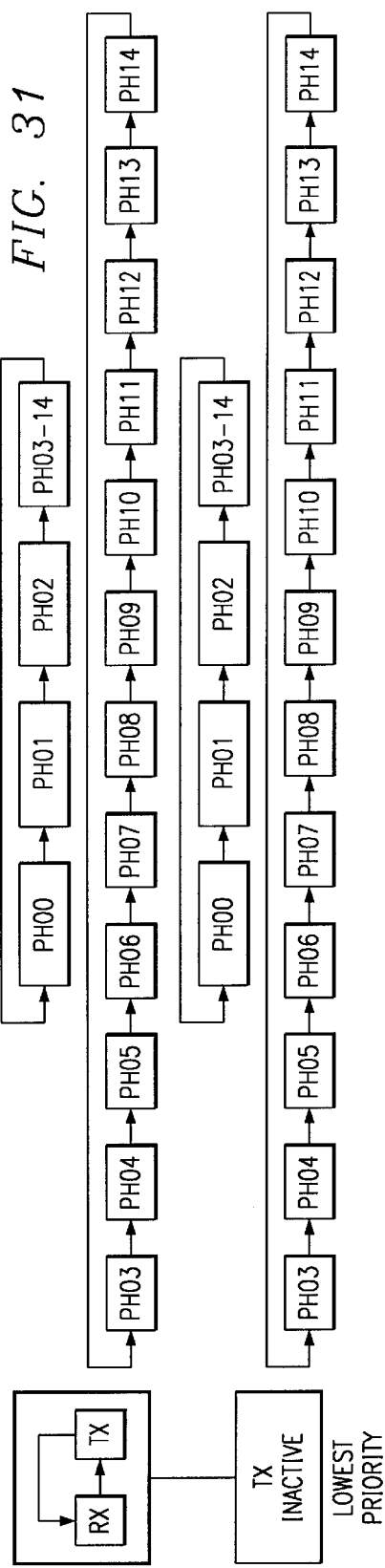
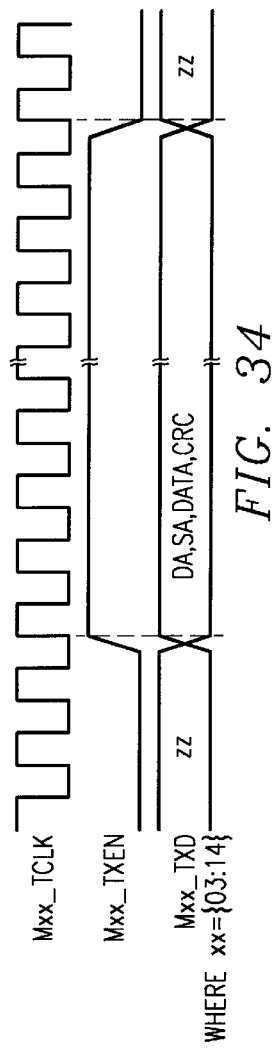
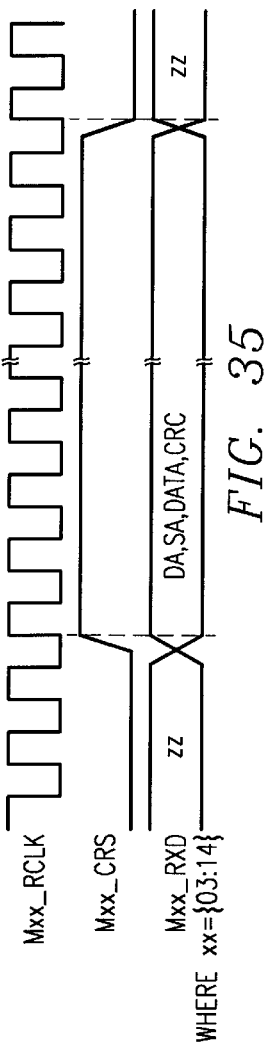

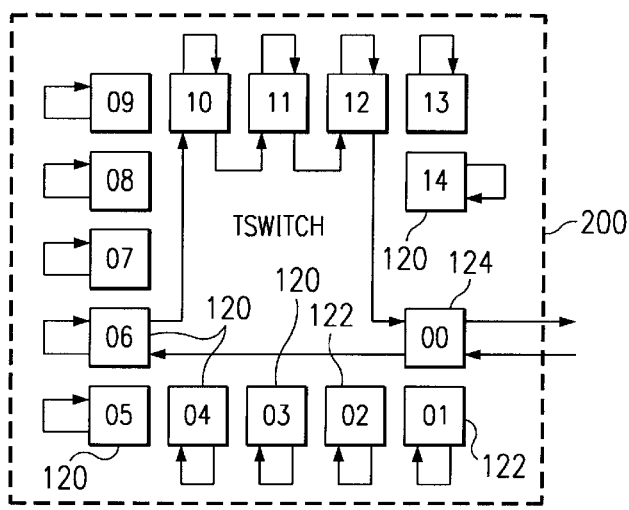
FIG. 39
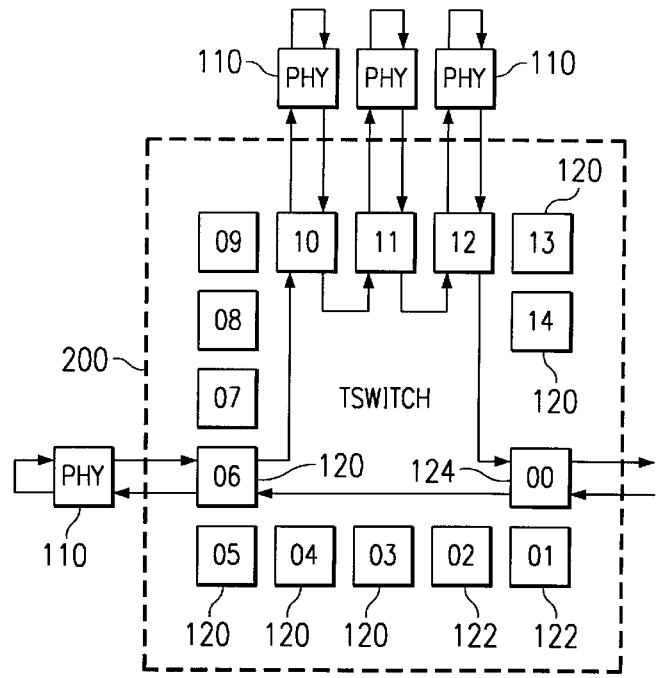
FIG. 40
| VARIANT | | PART NUMBER | | MANUFACTURE | | LSB |
|---|---|---|---|---|---|---|
| BIT 31 | BIT 28 | BIT 27 | BIT 12 | BIT 11 | BIT 1 | BIT 0 |
| 0000 | | 0000000000111000 | | 00000010111 | | 1 |
FIG. 41

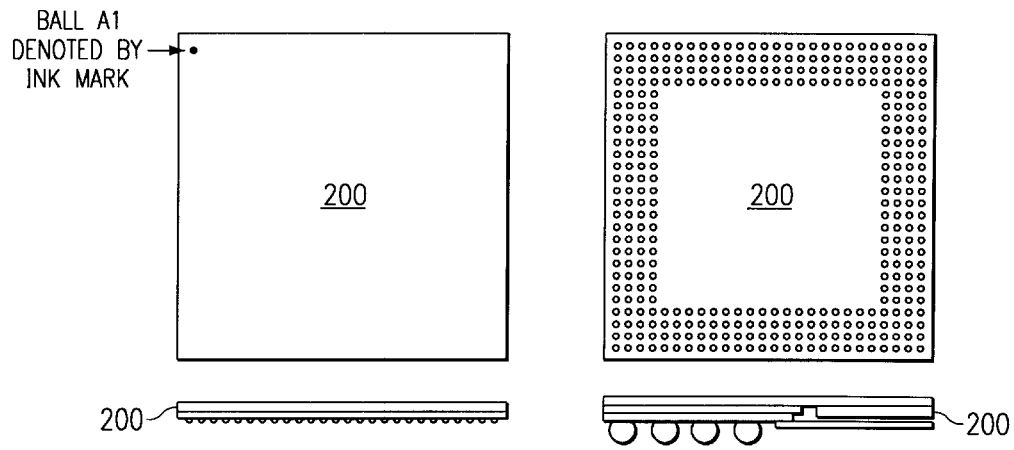
FIG. 58
| 1XXX | 0111 | 0110 | 0101 | 0100 | 0011 | 0010 | 0001 | 0000 |
|---|---|---|---|---|---|---|---|---|
| 71 TO 64 | 63 TO 56 | 55 TO 48 | 47 TO 40 | 39 TO 32 | 31 TO 24 | 23 TO 16 | 15 TO 8 | 7 TO 0 |
FIG. 59
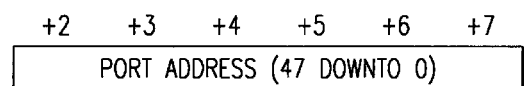
FIG. 60
| BIT | 7 | 6 | 5 | 4 | 3 | 2 | 1 | 0 |
|---|---|---|---|---|---|---|---|---|
| | REVISION | | | | | | | |
| INITIAL VALUE (AFTER RESET) | 00000000 | | | | | | | |
| BIT | NAME | FUNCTION |
|---|---|---|
| 7 THRU 0 | REVISION | HARDWARE REVISION CODE FOR THE DEVICE. THIS FIELD IS READ-ONLY. INITIAL SAMPLES WILL HAVE A REVISION CODE OF 0x00. |
FIG. 61

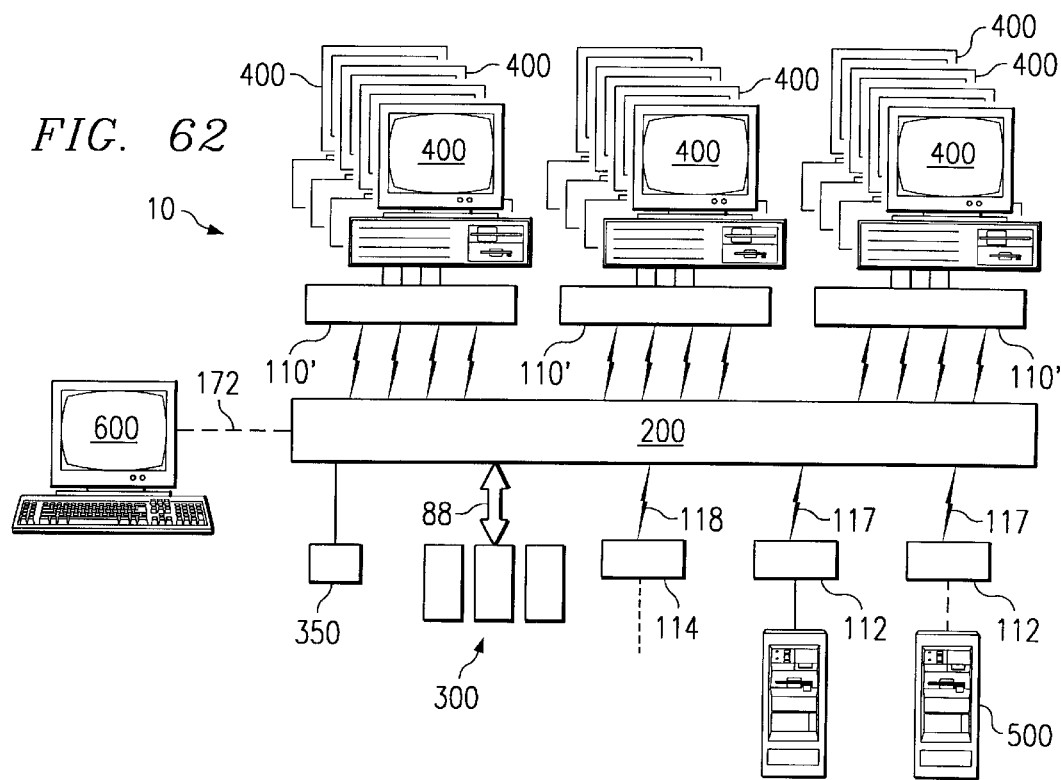
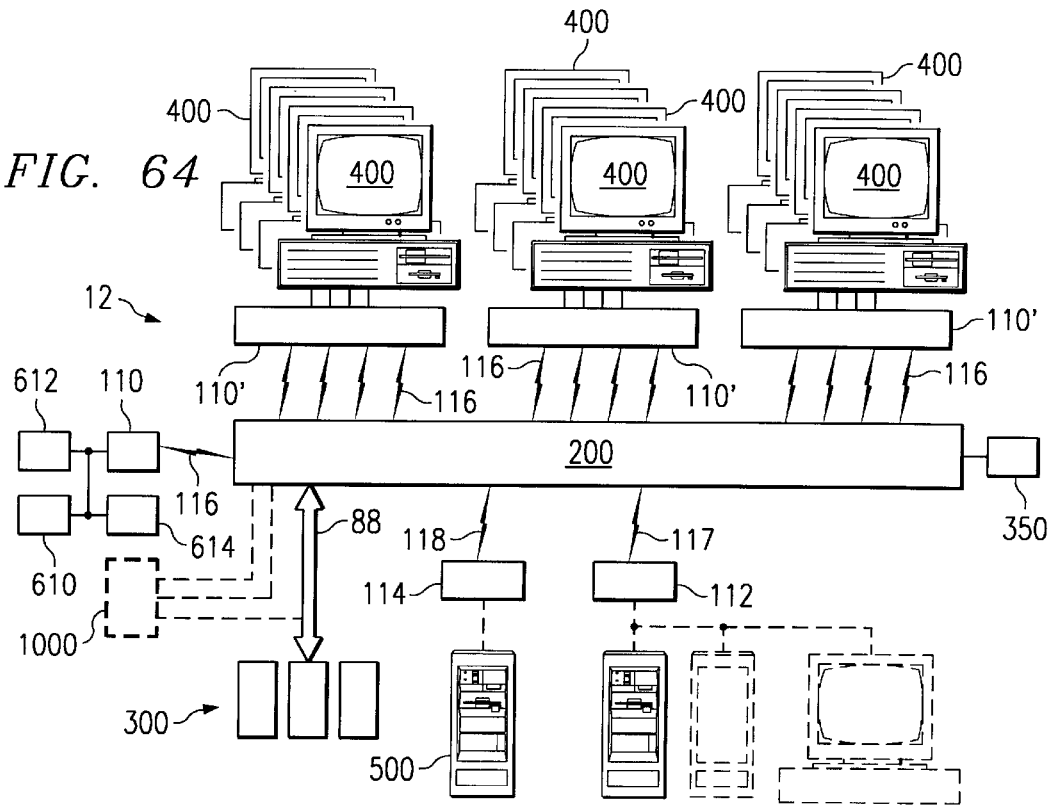

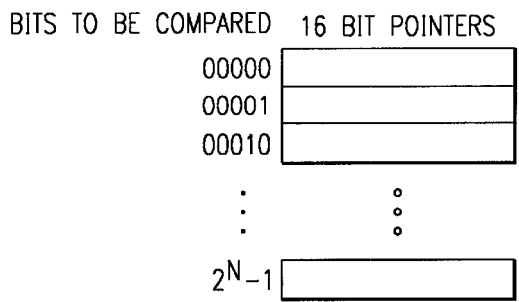
FIG. 78
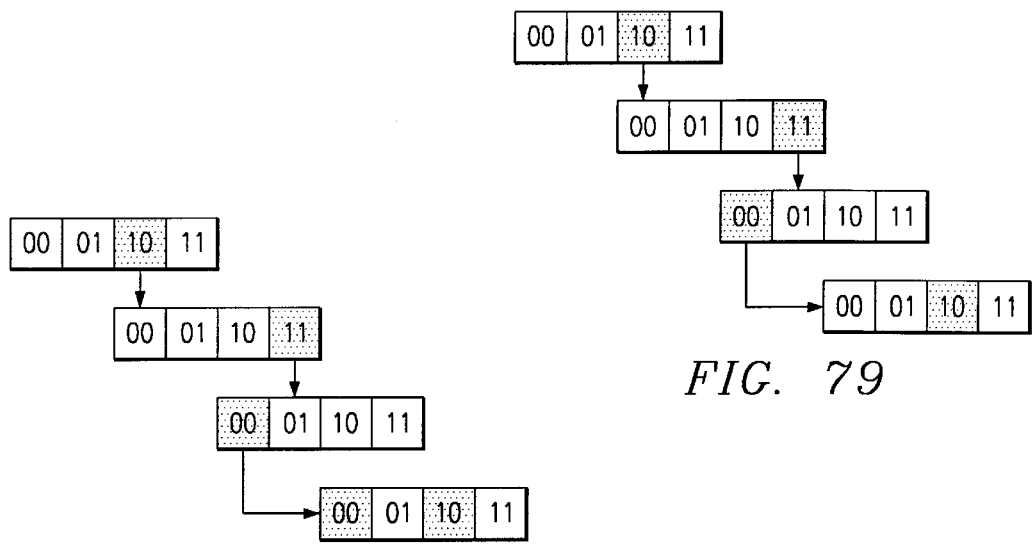
FIG. 79
FIG. 80
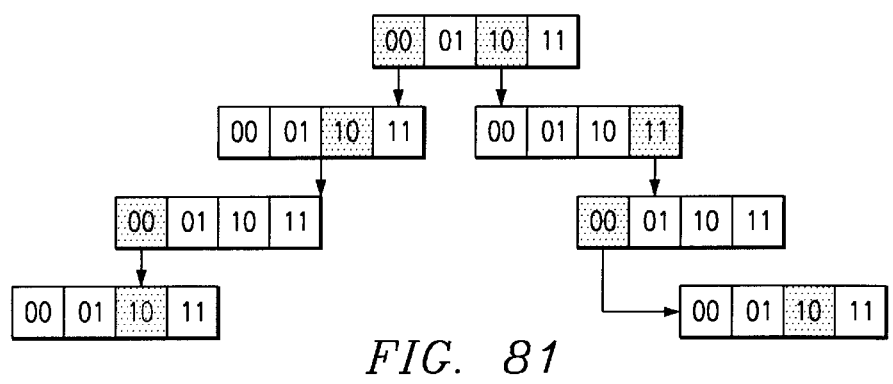
FIG. 81

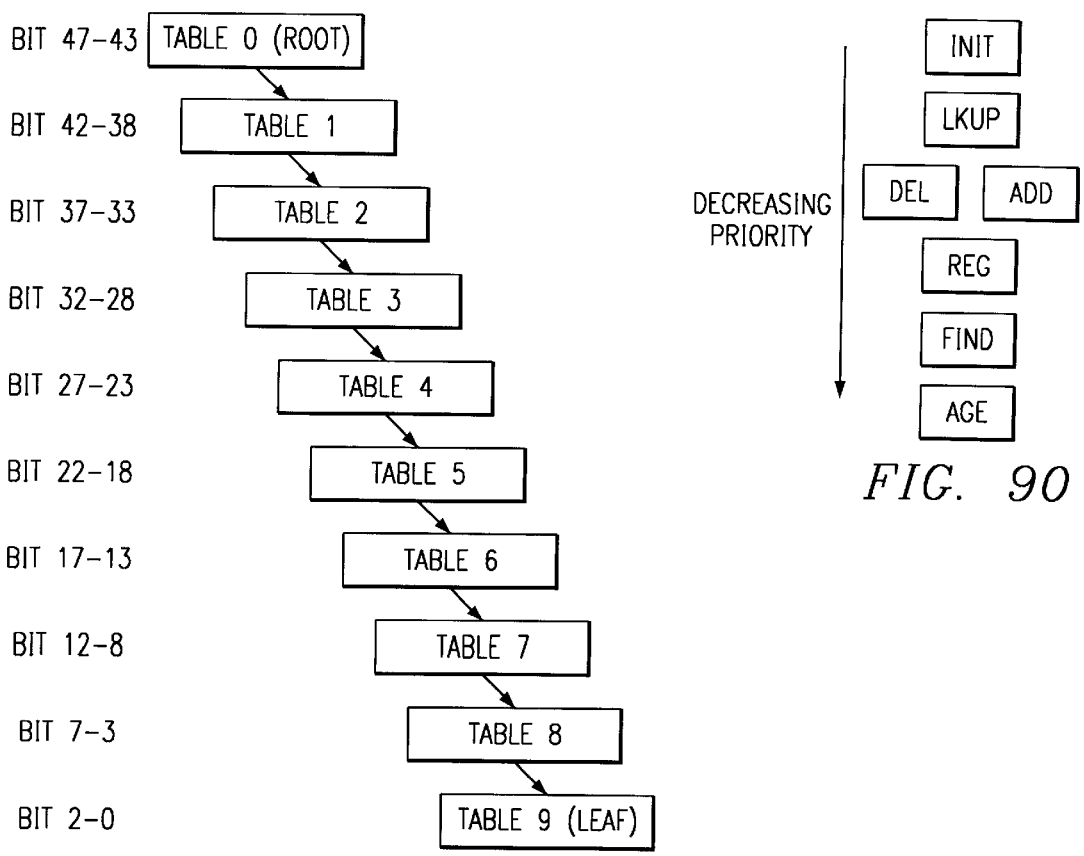
FIG. 90
FIG. 91
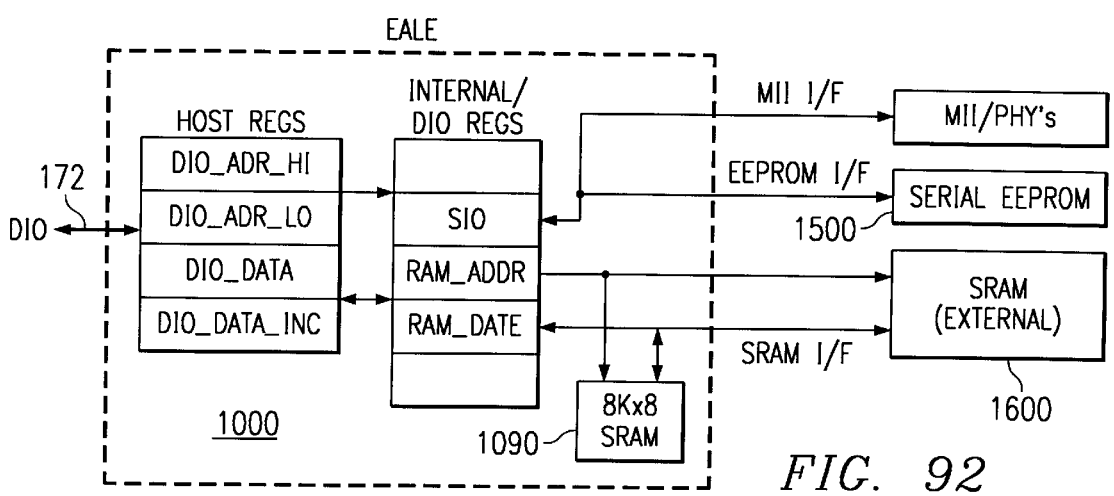
FIG. 92

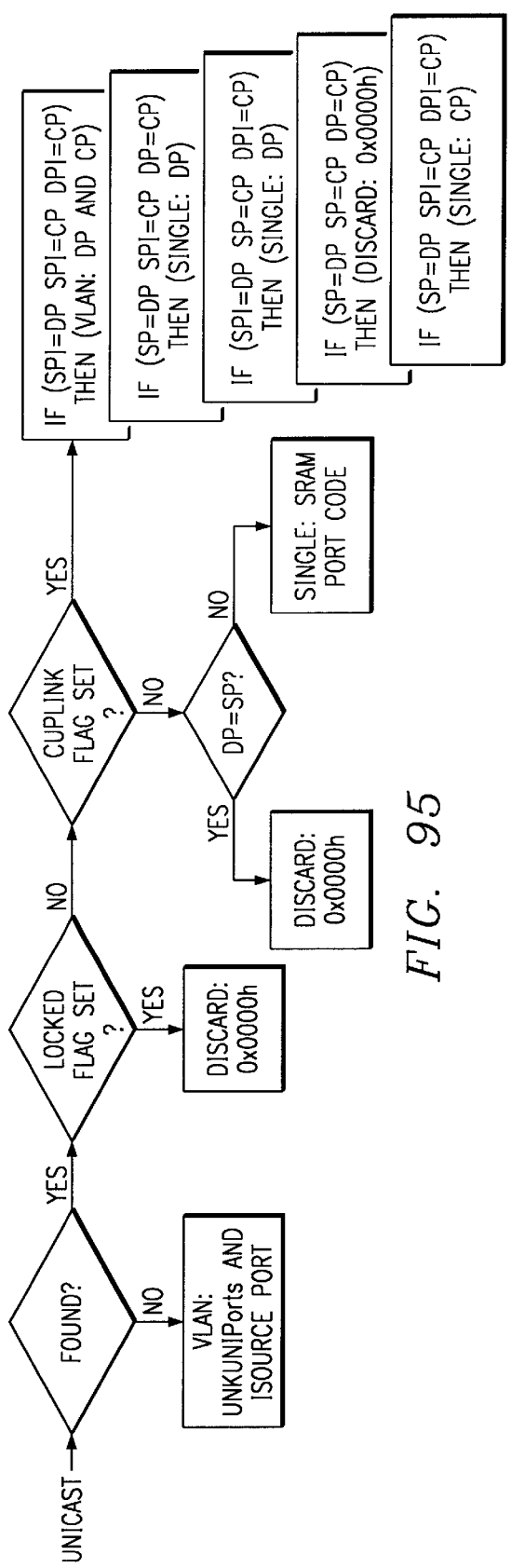
FIG. 95
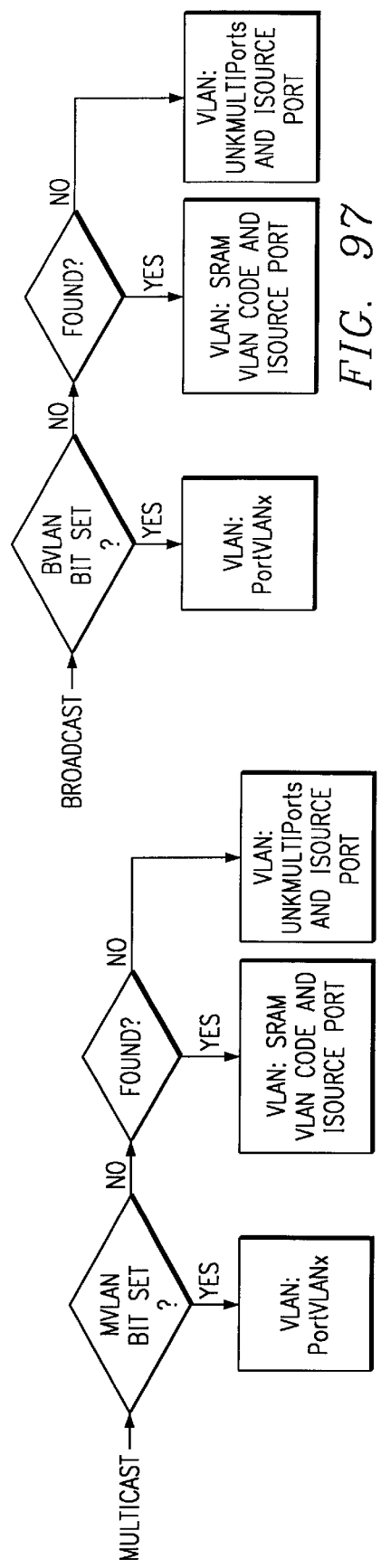
FIG. 97
FIG. 96

NETWORK ADDRESS MATCHING CIRCUIT AND METHOD

CROSS-REFERENCE TO RELATED APPLICATIONS

This application is related to co-pending and co-assigned patent application Ser. No. 08/718,148, filed Sep. 18, 1996, filed contemporaneously herewith and incorporated herein by reference.

(C) Copyright 1989 Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

FIELD OF THE INVENTION

This invention generally relates to communications systems and integrated electronic devices used therein, and more particularly, to improved communications systems and improved apparatus and methods for use in such systems.

BACKGROUND OF THE INVENTION

Local area networks (LANs) have become widely accepted and used within many and various industries as a way to interconnect many work stations and/or personal computers (PCs) to allow them to share resources such as data and applications without the need for an expensive mainframe computer and its associated multiple attached terminals. One widely accepted LAN arrangement is an "Ethernet" LAN, which is defined in the IEEE 802.3 standard.

With the widespread acceptance of LANs and the continuing acceleration of technology, the demand for LAN arrangements with higher and higher transfer rates continues unabated. Two 100 megabit per second (Mbps) LANs are extending the reach of the installed base of 10 Mbps Ethernet LANs; they are the IEEE 802.3u standard for "Fast Ethernet" or 100 MBITS CSMA/CD and the other is the IEEE 802.12 standard for 100 VG-AnyLAN or Demand Priority. In addition, switched Ethernet has been proposed to meet this demand. The emergence of switched Ethernet promises to increase network bandwidth to the desktop without the need to replace network cabling or adapters. However, for this promise to be fulfilled the cost of switching hubs needs to fall towards the cost of conventional repeater hubs.

The present invention provides an ethernet LAN switch capable of performing other network functions that allows for improved communications systems and methods for use in such systems and improved apparatus that support this demand in a cost effective and versatile manner.

SUMMARY OF THE PRESENT INVENTION

Generally, and in one form of the present invention, an improved communications system having a circuit with a plurality of communications ports capable of multispeed operation and operable in a first mode that includes address resolution and in a second mode that excludes address resolution is provided.

An improved communications system having a first memory, a plurality of protocol handlers, a bus connected to said protocol handlers, a second memory connected to said bus, and a memory controller connected to said bus and said second memory for selectively comparing addresses, transferring data between said protocol handlers and said second memory, and transferring data between said second memory and said first memory is provided.

The present invention provides a local area network controller having a first circuit with a plurality of communications ports capable of multispeed operation and operable in a first mode that includes address resolution and in a second mode that excludes address resolution, and an address lookup circuit interconnected to said first circuit.

The present invention provides an integrated circuit having a plurality of protocol handlers, a bus connected to said protocol handlers, a memory connected to said bus, and a memory controller connected to said bus and said memory for selectively comparing addresses, transferring data between said protocol handlers and said memory, and transferring data between said memory and an external memory.

The present invention provides an ethernet switch having a plurality of protocol handlers each having a serializer and deserializer and a holding latch, a bus connected to said holding latches, a memory connected to said bus, and a memory controller connected to said bus and said memory for selectively comparing addresses, transferring data between said latches and said memory and transferring data between said memory and an external memory. The present invention provides a single chip network protocol handler having a first protocol handler having a serializer and deserializer and a holding latch for operating at a first bit rate, a second protocol handler having a serializer and deserializer and a holding latch for operating at a second bit rate, and a controller connected to said protocol handlers for selecting one of said protocol handlers based on preselected control signals.

The present invention provides an address matching circuit having a memory for containing addresses arranged in a linked list, a first state machine for creating and updating the linked list of addresses, a second state machine for providing routing information for a selected address based upon the linked list of addresses, and a bus watcher circuit for monitoring data traffic on a bus to detect addresses.

The present invention provides an address matching circuit having an address memory with an address memory bus, a bus watcher circuit connected to an external data bus for detecting addresses, an arbiter connected to said bus watcher and said address memory bus for generating control signals for prioritizing access to said address memory bus, and a plurality of state machines selectively connectable to said address memory bus in response to said control signals and for providing routing information based upon matching a detected address with an address stored in said address memory, for adding, updating or deleting addresses and associated routing information in said address memory, and for searching for an address in said address memory.

It is an object of the present invention to provide apparatus and methods for hardware control of network switching functions rather than CPU based control.

It is an object of the present invention to provide apparatus and methods for hardware control based communications systems.

It is an object of the present invention to provide simpler apparatus and methods for networking.

It is an object of the present invention to provide lower cost apparatus and methods for networking.

It is an object of the present invention to provide highly integrated apparatus and methods for networking.

It is an object of the present invention to provide simpler and lower cost apparatus and methods for communications systems.

BRIEF DESCRIPTION OF THE DRAWINGS

The invention my be understood by reference to the detailed description which follows, read in conjunction with the accompanying drawings in which:

FIG. 2 depicts the preferred arrangement of data and flag information in a presently preferred 72 bit length word for use by the circuit of FIG. 1;

FIG. 3 depicts the access sequencing scheme that allows the presently preferred FIFO memory of the circuit in FIG. 1 to be accessed as a time multiplexed resource;

FIG. 4 depicts the FIFO memory address format of the circuit of FIG. 1;

FIG. 5 shows how the FIFO RAM memory of the circuit of FIG. 1 is preferably physically mapped into transmit and receive blocks for each communication port;

FIG. 7 is a schematic block diagram of the address compare block for a representative port of the circuit of FIG. 1;

FIG. 29 is a signal timing diagram illustrating that there is no handshake or flow control for the receive uplink path on the circuit of FIG. 1;

FIG. 30 depicts the tag fields of FIG. 29;

FIG. 31 depicts receive arbitration selection for the circuit of FIG. 1;

FIG. 32 is a simplified block diagram of the network monitoring port for the circuit of FIG. 1;

FIG. 33 depicts a CPU and a suitable protocol translating device directly connected to one of the ports for the circuit of FIG. 1 for use with SNMP;

FIG. 34 is a signal timing diagram illustrating the Transmit (Tx) logic signals for a 10 Mbps port for the circuit of FIG. 1;

FIG. 35 is a signal timing diagram illustrating the Receive (Rx) logic signals for a 10 Mbps port for the circuit of FIG. 1;

FIG. 39 depicts how frames can be forwarded between internally wrapped ports before transmission of the frame from the source port for the circuit of FIG. 1;

FIG. 40 depicts how in an internal wrap mode the ports can be set to accept frame data that is wrapped at the PHY for the circuit of FIG. 1;

FIG. 41 depicts IDCODE format for networking equipment;

FIG. 58 shows several views of a plastic superBGA package for the circuit of FIG. 1;

FIG. 59 depicts the DIO RAM access address mapping for the circuit of FIG. 1;

FIG. 60 depicts the content of a port address register of Table 36 for the circuit of FIG. 1;

FIG. 61 depicts the content of the revision register of Table 33 for the circuit of FIG. 1;

FIG. 62 is a block diagram of one improved communications system of the present invention;

FIG. 64 is a block diagram of another improved communications system of the present invention;

FIG. 78 depicts how each table of FIG. 77 needs to compare 2N possible combinations;

FIG. 79 is an example of a method to be used to look-up an address using the circuit of FIG. 76;

FIG. 80 continues the example of FIG. 79;

FIG. 81 continues the example of FIGS. 79 and 80;

FIG. 90 shows the priorities of state machines for the circuit of FIG. 76;

FIG. 91 illustrates the linked address table architecture of the circuit of FIG. 76;

FIG. 92 shows how to access the internal registers for the circuit of FIG. 76;

FIG. 95 depicts a state machine process for the circuit of FIG. 76;

FIG. 96 indicates the steps that a state machine employs if a message is a multicast message for the circuit of FIG. 76;

FIG. 97 shows the steps a state machine employs if it is a broadcast message for the circuit of FIG. 76;

Corresponding numerals and symbols in the different Figures refer to corresponding parts unless otherwise indicated.

DETAILED DESCRIPTION

Figure 1:
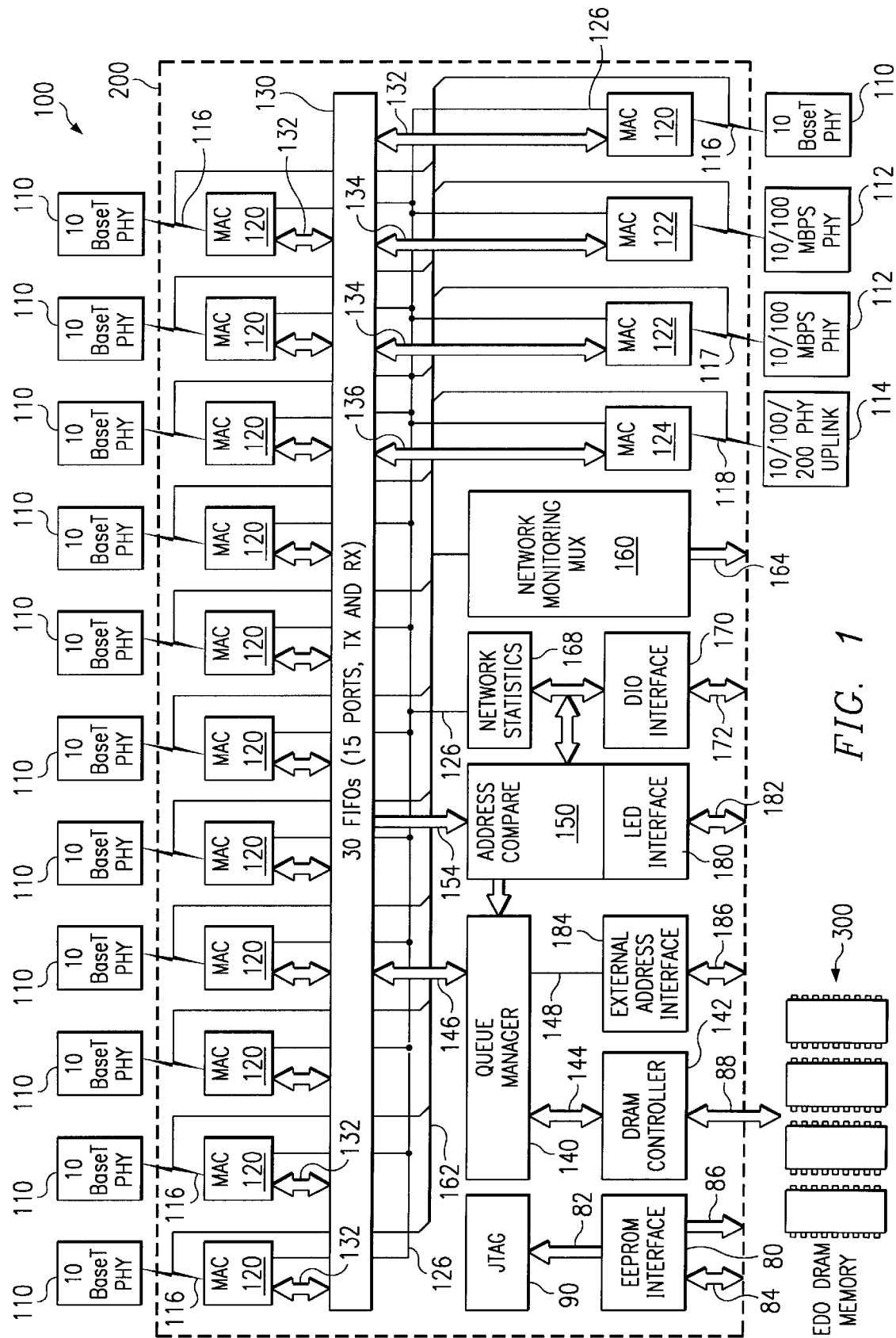
FIG. 1 is a functional block diagram of a circuit that forms a portion of a communications system of the present invention.

Referring initially to FIG. 62, there may be seen a block diagram of one improved communications system 10 of the present invention. In FIG. 62, the communications system includes a multiport, multipurpose network integrated circuit (chip) 2001 having a plurality of communications ports 116,117,118 capable of multispeed operation. The network chip 2001 operates in two basic modes, with one mode including address resolution and a second mode that excludes address resolution. The network chip 2001 has an external memory 350, which is preferably EEPROM, appropriately interconnected to provide an initial configuration of chip 2001 upon startup or reset. The communications system also includes an external memory (DRAM) 300 for use by the network chip 2001 to store communications data, such as for example, but not limited to, frames or packets of data representative of a portion of a communications message.

In addition, the communications system 10 depicted in FIG. 62 includes a plurality of known physical layer devices 110', 1121,1141 that serve as a bridge or interface between the communications system 10 and the servers 500 or clients 400 on the communications system 10. These physical layer devices 110', 1121,1141 are identified as QuadPHY blocks 110' or 10/100 Mbps PHY blocks 118. However, the communications system 10 of the present invention also contemplates the incorporation of these physical devices 110', 1121,1141 and/or memories 300,350 onto or into the chip associated with the network chip 2001.

The communications system 10 also includes a plurality of known communications servers 500 and a plurality of known communications clients 400 that are connected to the physical layer devices. The communications system may also include an optional host CPU 6001 for managing or monitoring the operations of the communications system; however, the host CPU 6001 is not necessary for normal operation of the. communications system of the present invention.

The improved communications system of the present invention depicted in FIG. 62 is suitable for use as a low cost switch for a small office or home office (SOHO) workgroup. The improved communications system of the present invention depicted in FIG. 62 provides a maximum of fifteen, 10 Mbps ports 116 (with the 10/100 117 and uplink 118 ports all operating as 10 Mbps ports).

The improved communications system of the present invention depicted in FIG. 62 provides a maximum of two, 10/100 Mbps fall duplex single address ports 117; three 100 Mbps ports could be provided by utilizing the uplink 118 as an additional 100 Mbps port. However, the use of three 100 Mbps ports may exceed the internal bandwidth during worst case network activity. The improved communications system of the present invention depicted in FIG. 62 provides for a stand alone configuration through the use of an EEPROM 350 that stores initial internal register values (the optional host CPU 6001 connected to a DIO port 172 is used to monitor status and user configuration). The improved communications system of the present invention depicted in FIG. 62 also provides an Uplink port 118 for future expansion capabilities.

This configuration 10 is designed to accelerate the small business user with a small network. All connections are single address desktop or server connections. No external address matching hardware is used and multiple address devices may not be connected to any of the switched ports.

Unused 100 Mbps ports 117 can be used as additional 10 Mbps ports 116, if required, enabling a ceiling of thirteen 10 Mbps ports in a switched workgroup. Future expansion can also be achieved by cascading further network chip devices 2001 on the uplink port 118, as described later herein.

Figure 63:
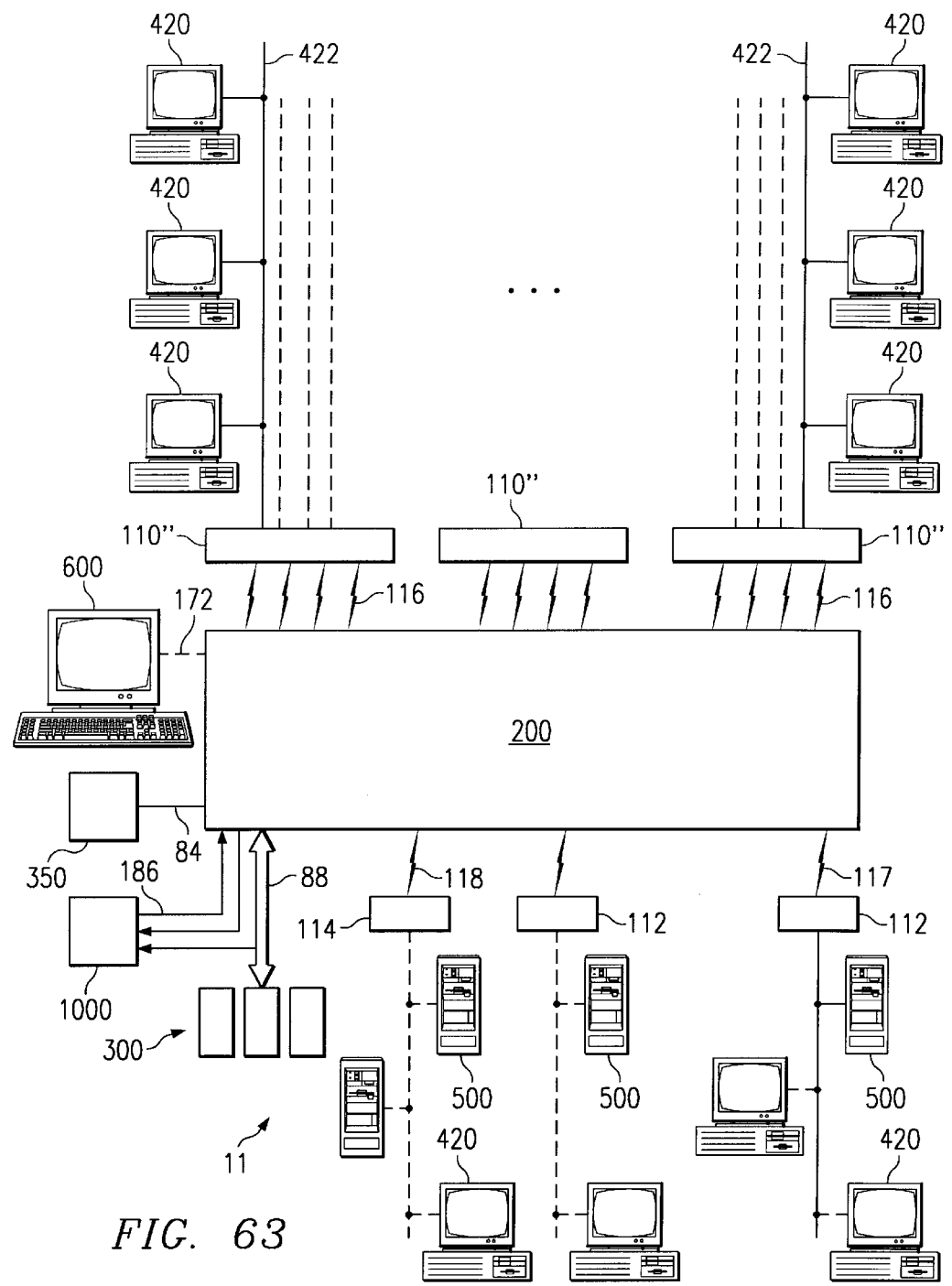
FIG. 63 is a block diagram of another improved communications system of the present invention.

Referring now to FIG. 63, there may be seen a block diagram of another improved communications system 11 of the present invention. In FIG. 63, the communications system 11 includes a multiport, multipurpose network integrated circuit (chip) 200 having a plurality of communications ports 116,117,118 capable of multispeed operation. The network chip operates in two basic modes, with one mode including address resolution and a second mode that excludes address resolution. The communications system 11 also includes an external address lookup integrated circuit 10001 that is appropriately interconnected to the network chip 2001. Both the network chip 200 and the address lookup chip 10001 each have an external memory 350, which is preferably EEPROM (not depicted in FIG. 63 for the address lookup chip), appropriately interconnected to provide an initial configuration of each chip 10001 upon startup or reset. The communications system 11 also includes an external memory (DRAM) 300 for use by the network chip 2001 to store communications data, such as for example, but not limited to, frames or packets of data representative of a portion of a communications message. The communications system 11 may also optionally include an external memory (SRA.M) (not depicted in FIG. 63) for use by the address lookup chip 10001 to increase its addressing capabilities.

In addition, the communications system 11 includes a plurality of known physical layer devices 110", 1121,1141 that serve as a bridge or interface between the communications system 11 and the servers 500 or clients 4201. These physical layer devices are identified as QuadPHY blocks 110", 10/100 Mbps PHY blocks 1121, or as an uplink block 1141. However, the communications system 11 of the present invention also contemplates the incorporation of these physical layer devices and/or memories onto or into the chips 2001 associated with the network chip and/or the address lookup chip 10001.

The communications system 11 also includes a plurality of known communications servers 500 and a plurality of known communications clients 4201,422 that are connected to the physical layer devices. The communications system 11 may also include an optional host CPU 6001 for managing or monitoring the operations of the communications system 11; however, the host CPU 6001 is not necessary for normal operation of the communications system 11 of the present invention.

The improved communications system 11 of the present invention depicted in FIG. 63 is suitable for use as a low cost network switch. The improved communications system 11 of the present invention depicted in FIG. 63 provides a maximum of fifteen, 10 Mbps ports 116 (with the 10/100 117 and uplink ports all operating as 10 Mbps half duplex ports). The improved communications system 11 of the present invention depicted in FIG. 63 provides a maximum of two, 10/100 Mbps fall duplex ports 117; three 100 Mbps ports could be provided by utilizing the uplink port 118 as an additional 100 Mbps port. However, the use of three 100 Mbps ports may exceed the internal bandwidth during worst case network activity. The improved communications system 11 of the present invention depicted in FIG. 63 provides for a stand alone configuration through the use of an EEPROM 3501 that stores initial internal register values (the optional host CPU 6001 connected to a DIO port 172 is used to monitor status and user configuration).

This configuration is designed to switch the business user with a small network. Connections can be either single address desktop or multiple address devices. External address matching hardware is used to permit network switching and multiple addresses.

Referring now to FIG. 64, there may be seen a block diagram of another improved communications system 12 of the present invention. In FIG. 64, the communications system 12 includes a multiport, multipurpose network integrated circuit (chip) 2001 having a plurality of communications ports 116,117,118 capable of multispeed operation. The network chip 2001 operates in two basic modes, with one mode including address resolution and a second mode that excludes address resolution. The communications system 12 also includes an optional external address lookup integrated circuit (in dashed lines) 1000 that is appropriately interconnected to the network chip 2001. Both the network chip and the address lookup chip 1000 each have an external memory 350, which is preferably EEPROM (not depicted in FIG. 64 for the address lookup chip 1000), appropriately interconnected to provide an initial configuration of each chip 1000,2001 upon startup or reset. The communications system 12 also includes an external memory (DRAM) 300 for use by the network chip 2001 to store communications data, such as for example, but not limited to, frames or packets of data representative of a portion of a communications message. The communications system 12 may also optionally include an optional external memory (SRAM) (not depicted in FIG. 64) for use by the optional address lookup chip 1000 to increase its addressing capabilities.

In addition, the communications system 12 includes a plurality of known physical layer devices 110', 1121,1141 that serve as a bridge or interface between the communications system 12 and the servers or clients. These physical layer devices are identified as a 10 Mbps QuadPHY blocks 110', 10/100 Mbps PHY block 1121, or as an uplink block 1141. However, the communications system 12 of the present invention also contemplates the incorporation of these physical layer devices and/or memories onto or into the chips associated with the network chip 2001 and/or the address lookup chip 1000.

The communications system 12 also includes a plurality of known communications servers 500 and a plurality of known communications clients 400 that are connected to the physical layer devices. The communications system 12 also includes a local host CPU 610 connected to a 10 Mbps PHY block 110, a block of MIB counters 612 and a local packet memory 614 for managing or monitoring the operations of the communications system 12; the host CPU 610 provides the intelligence to make this embodiment of the communications system 12 of the present invention an intelligent switch.

The improved communications system 12 of the present invention depicted in FIG. 64 is suitable for use as a low cost intelligent network switch. The improved communications system of the present invention depicted in FIG. 64 provides a maximum of fourteen 10 Mbps switched single address ports (with the 10/100 ports operating as 10 Mbps half duplex ports); network connections are supported when the external address lookup integrated circuit (in dashed lines) 1000 is used. The improved communications system 12 of the present invention depicted in FIG. 64 provides a maximum of two 10/100 Mbps duplex single address ports; network connections are supported when the external address lookup integrated circuit (in dashed lines) 1000 is used. The improved communications system 12 of the present invention depicted in FIG. 64 provides a local host CPU 610 for intelligent control and switching as a stand alone unit. The improved communications system 12 of the present invention depicted in FIG. 64 provides for configuration control through the use of an EEPROM 350 that stores internal register values (the local host CPU 610 connected to a DIO port 172 or a network SNMP may be used to alter configurations).

This intelligent switch configuration is aimed at the workgroup requiring access and control over the switching unit via the network. Connections can be either single address desktop or multiple address devices. External address matching hardware is used to permit network switching and multiple addresses.

Figure 85:
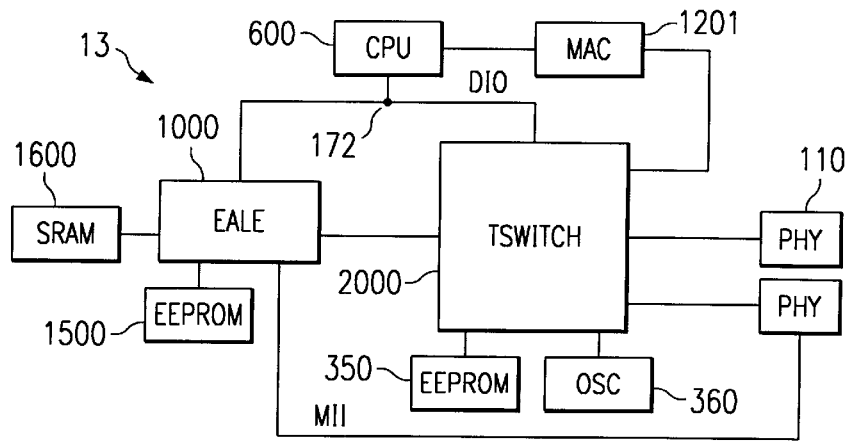
FIG. 85 is a block diagram of another improved communications system of the present invention.

Referring now to FIG. 85, there may be seen a block diagram of another improved communications system 13 of the present invention. In FIG. 85, the communications system 13 includes a multiport, multipurpose network integrated circuit (labeled as "TSWITCH") 20001 having a plurality of communications ports capable of multispeed operation. The network chip 20001 operates in two basic modes, with one mode including address resolution and a second mode that excludes address resolution. The communications system 13 also includes an external address lookup integrated circuit (labeled as "SALE") 10001 that is appropriately interconnected to the network chip 20001. Both the network chip 20001 and the address lookup chip 10001 each have an external memory 350,1500, which is preferably EEPROM, appropriately interconnected to provide an initial configuration of each chip 10001, 20001 upon startup or reset. The network chip 20001 also has an external oscillator block 360 connected to it to provide the requisite clock signals for use by the network chip 20001.

In addition, the communications system 13 includes a plurality of known physical layer devices 110 that serve as a bridge or interface between the communications system 13 and the servers or clients (not depicted in FIG. 85). These physical layer devices 110 are identified as PHY blocks. However, the communications system 13 of the present invention also contemplates the incorporation of these physical layer devices and/or memories onto or into the chips associated with the network chip 20001 and/or the address lookup chip 10001.

The simplest application for the combination of a network chip 20001 and an external address lookup chip system 10001 is shown in FIG. 85 (without optional CPU 600 and optional MAC 1201); this simplest application is a manageless multiport switch. The external address lookup chip 10001 is responsible for matching addresses, learning addresses and for aging out old addresses. Use of an external address lookup chip 10001 still provides options to the manufacturer for changes to the network through its EEPROM 1500; that is, the manufacturer may program this EEPROM 1500 through a parallel port interface to the external address lookup chip (not depicted in FIG. 85). Some options which can be set are the aging time, the UNKUNPorts/UNKMULTIPorts registers (for this application they might be left to broadcast to all ports), and the port-based VLAN registers, PortVLAN. ULAN is supported (on a per-port basis) through the EEPROM 1500. This is the lowest-cost solution for a non-CPU managed, ULAN-capable multinode switch.

The communications system 13 also includes a plurality of known communications servers and a plurality of known communications clients that are connected to the physical layer devices (not depicted for clarity in FIG. 85). The communications system 13 may also include an optional host CPU 600 for managing or monitoring the operations of the communications system; however, the host CPU 600 is not necessary for normal operation of the communications system of the present invention.

The communications system also includes an external memory (DRAM) (not depicted in FIG. 85) for use by the network chip 2001 to store communications data, such as for example, but not limited to, frames or packets of data representative of a portion of a communications message. The communications system 13 may also optionally include an external memory (SRAM) 1600 for use by the address lookup chip 10001 to increase its addressing capabilities.

Continuing to refer to FIG. 85, a second variation on the first application can be achieved by adding external SRAM 1600 to the EALE device 10001. Adding external SRAM 1600 increases the capability of the lookup table and increases the number of nodes supported by the switch. A 1K address switch can be achieved by adding 65 Kx11 of SRAM (typical address spans). The external address lookup chip 10001 supports multiple SRAM 1600 sizes, and switches with varying capacities can be easily built. Again, this is a low-cost solution since no management by an external CPU 600 is needed. The SRAM size is controlled through the EEPROM (RAMsize).

Continuing to refer to FIG. 85, a third variation on the first application can be achieved by adding a microprocessor CPU 600 that interfaces to the external address lookup chip 10001 and network chip 20001 through a common DIO interface 172 to provide a managed multiport switch application. This application provides out of-band management so that the CPU 600 can continue to manage the network even when the rest of the network connected to this network chip 20001 goes "down" or ceases to operate. The microprocessor CPU 600 also has the capability to manage any switch PHY registers through an IEEE 802.3u interface (SIO register).

The microprocessor's CPU 600) tasks are minimized mainly because the CPU 600 does not have to participate in frame matching. The microprocessor (CPU 600) is used to set chip operating modes, to SECURE addresses so that the node does not move ports (useful for routers, attached switches and servers), and for support of destination-address-based-V LANs, The external address lookup chip 10001 is designed for easy management of the lookup table. Address table lookups, adds, edits and deletes are easily performed through its registers. Interrupt support also simplifies the management's tasks; the external address lookup chip 10001 will give an interrupt to the CPU 600 when it changes the lookup table. This minimizes code as the CPU 600 does not have to actively poll a very large address table for changes.

Continuing to refer to FIG. 85, a fourth variation on the first application can be achieved by attaching a MAC 1201 to the CPU 600 to provide an in-band managed switch. The management CPU 600 is able to send and receive frames through the CPU MAC 1201. The external address lookup chip 10001 implements routing registers which are helpful in this application.

The external address lookup chip 10001 has the capability to send all frames whose destination address is not known (UNKUNIPorts, UNKMULTIPorts) to the management CPU 600. At the same time, the external address lookup chip 10001 will learn this address and place it in the address table. The management CPU 600 then has the option to edit the port assignment for this address based on information placed in the frame it received.

The CPU 600 can also receive frames destined for other nodes by tagging, in the address table, the CUPLNK bit for that particular node. The CUPLNK bit copies all frames destined to that node to the ports specified in UPLINKPorts. By setting UPLINKPorts to direct these frames to the management CPU 600, it can receive frames it finds of interest.

The management CPU 600 can use any available port on the network chip 20001 since the routing is controlled by the external address lookup chip's 10001 registers. This means that traffic which would ordinarily move up to the Uplink (Port 0) can be forced to any other port by using the external address lookup chip 10001. This capability is helpful not only in using a 10 Mbps speed port instead of the 100 Mbps Port 0, but it is the basis for the network chip's 20001 cascading capabilities and redundant link capabilities.

Figure 86:
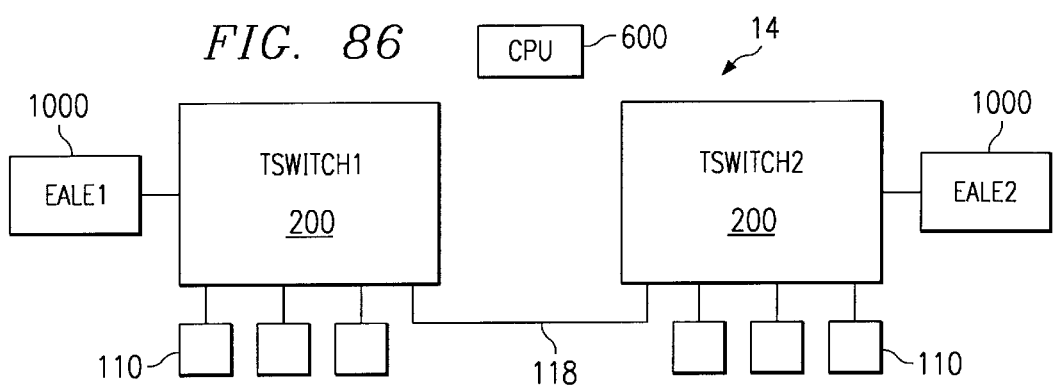
FIG. 86 is a block diagram of yet another improved communications system of the present invention.

Referring to FIG. 86, there may be seen a block diagram of yet another improved communications system 14 of the present invention. In FIG. 86, the communications system 14 includes two multiport, multipurpose network integrated circuits (labeled as "TSWITCH1 and TSWITCH2") 2001 having a plurality of communications ports capable of multispeed operation that are interconnected by their uplink ports 118. Each network chip 2001 operates in two basic modes, with one mode including address resolution and a second mode that excludes address resolution. The communications system 14 also includes two external address lookup integrated circuits (labeled as "EALE1 and EALE2") 10001 that are each appropriately interconnected to one of the network chips 2001. Both the network chips 2001 and the address lookup chips 10001 each have an external memory (not depicted in FIG. 86), which is preferably EEPROM, appropriately interconnected to provide an initial configuration of each chip 2001 upon startup or reset. Each network chip 2001 also has an external oscillator block (not depicted in FIG. 86) connected to it to provide the requisite clock signals for use by the network chip 2001. The communications system 14 also includes an external memory (DRAM) (not depicted in FIG. 86), for use by each network chip to store communications data, such as for example, but not limited to, frames or packets of data representative of a portion of a communications message. The communications system also includes an external SRAM memory (not depicted in FIG. 86) that increases the capability of the lookup table and increases the number of nodes supported by the switch.

In addition, the communications system 14 depicted in FIG. 86 includes a plurality of known physical layer devices 110 that serve as a bridge or interface between the communications system 14 and the servers or clients (not depicted in FIG. 86) on the communications system 14. Again, the communications system of the present invention also contemplates the incorporation of these physical devices 110 and/or memories onto or into the chips associated with the network chip 2001.

The communications system 14 also includes a plurality of known communications servers and a plurality of known communications clients that are connected to the physical layer devices 110. The communications system 14 may also include an optional host CPU 600 for managing or monitoring the operations of the communications system 14; however, the host CPU 600 is not necessary for normal operation of the communications system 14 of the present invention. This communications system 14 may be either managed or unmanaged.

The improved communications system 14 of the present invention depicted in FIG. 86 illustrates a basic way of cascading two network chips 2001 of the present invention by connecting their uplink ports 118 together. This way of cascading two network chips 2001 is simplified by the use of the external address matching hardware 10001 of the present invention. In the improved communications system 14 of the present invention depicted in FIG. 86, each network chip 2001 performs local switching based on their respective external address matching hardware's address table. All addresses which are not known to the external address matching hardware are sent up the uplink 118 to the cascaded network chip 2001.

Both external address matching devices 10001 have the potential of seeing all the nodes on the network. This means that both lookup tables will be mirrored and wastes space on the SRAM (whether internal or external).

An improvement is to place both external address matching devices 10001 in Not Learn Zero mode (NLRNO bit in Control Register). Placing each external address matching device 10001 in NLRNO mode forces it not to learn any addresses located in its uplink port (port 0), so now both devices carry a copy of its local addresses, and no lookup table mirroring is needed which saves space.

Figure 87:
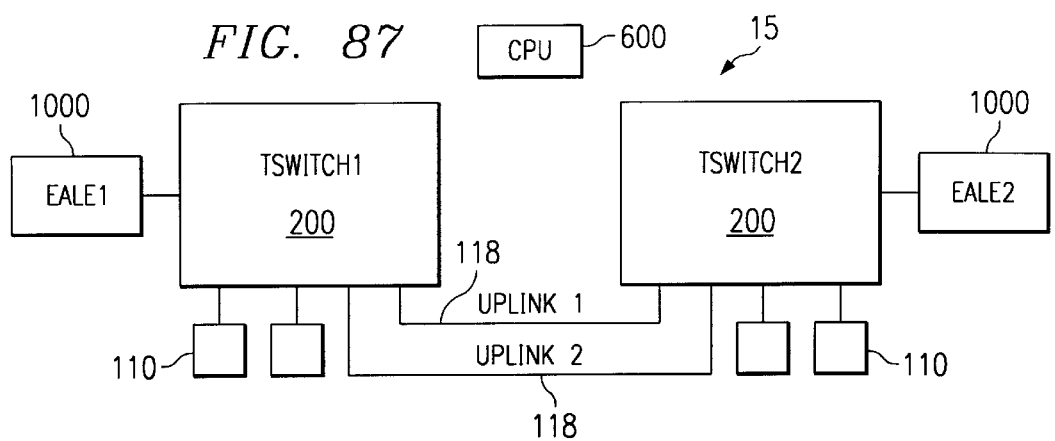
FIG. 87 is a block diagram of yet another improved communications system of the present invention.

FIG. 87 is similar to FIG. 86, except that the two network chips 2001 are connected or cascaded by use of both the uplink ports 118 (labeled UPLINK1 and UPLINK 2 ) to provide load sharing redundant links. Thus, multiple, redundant uplinks for switch load sharing are also supported through external address matching devices and a management CPU 600.

When a frame destined for a node which is not in its address table comes into the first network chip 2001, it is routed to the second network chip 2001 through the uphnk1 port 118. This is the default path for all traffic between switches.

However, the external address matching device 10001 can redirect traffic to a second uplink port 118. The management CPU 600 first commands switch1 2001 to send the node's frames to uplink2 118 freeing traffic on the uplink1 118 path, and balancing the load between the two links.

Figure 88:
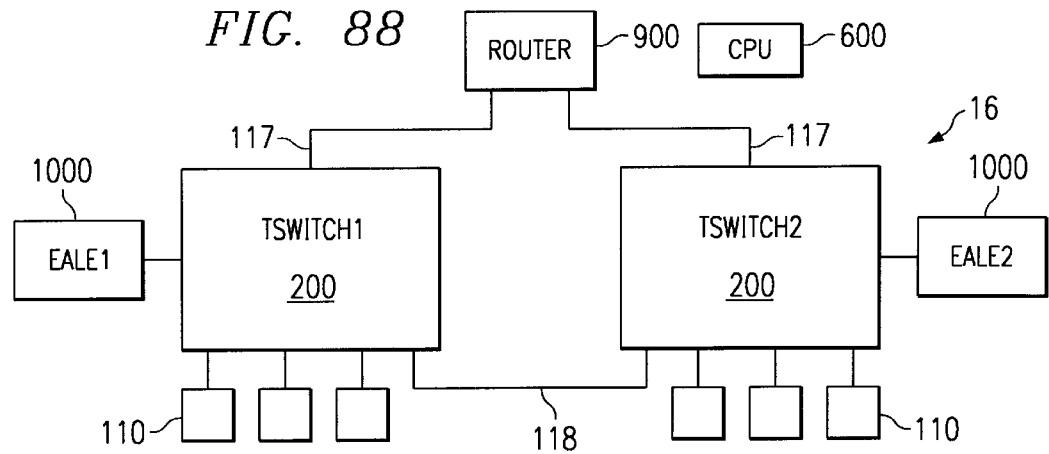
FIG. 88 is a block diagram of yet another improved communications system of the present invention.
Figure 89:
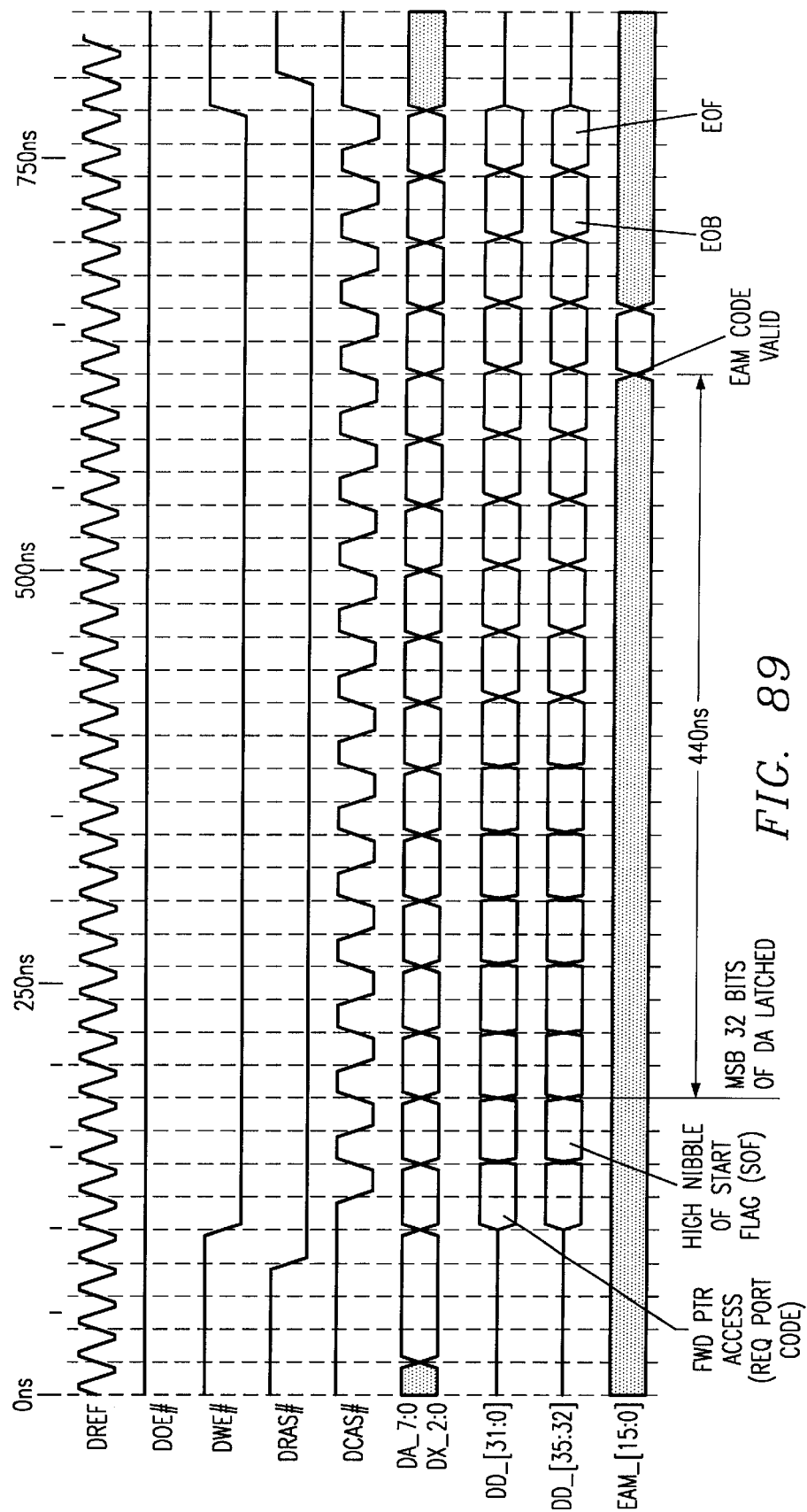
FIG. 89 is a signal timing diagram illustrating the look-up timing for the circuit of FIG. 76.
Figure 93:
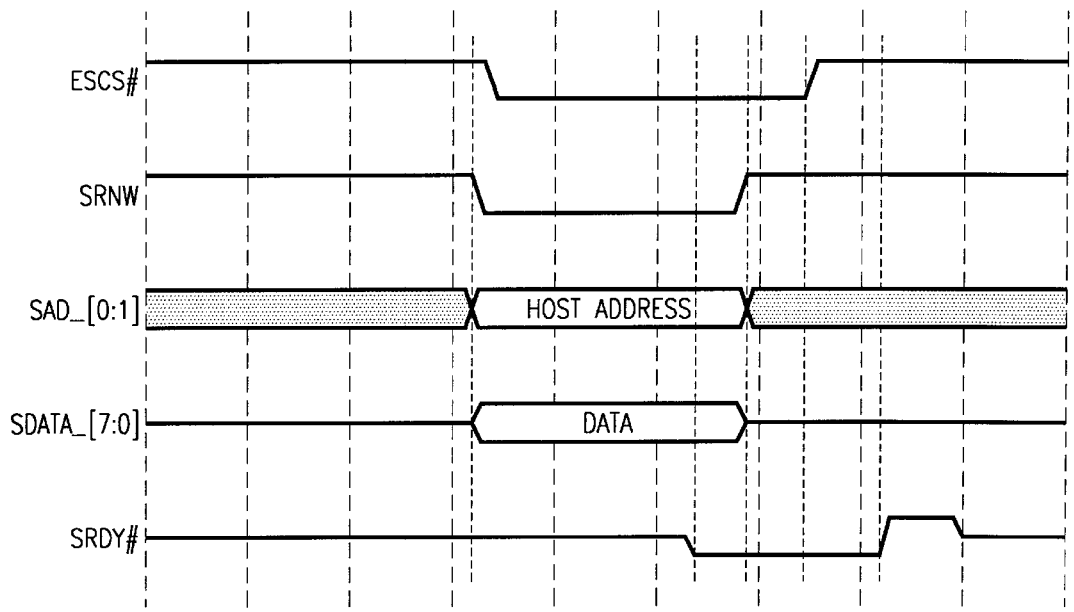
FIG. 93 is a signal timing diagram illustrating a Write Cycle for the circuit of FIG. 76.
Figure 94:
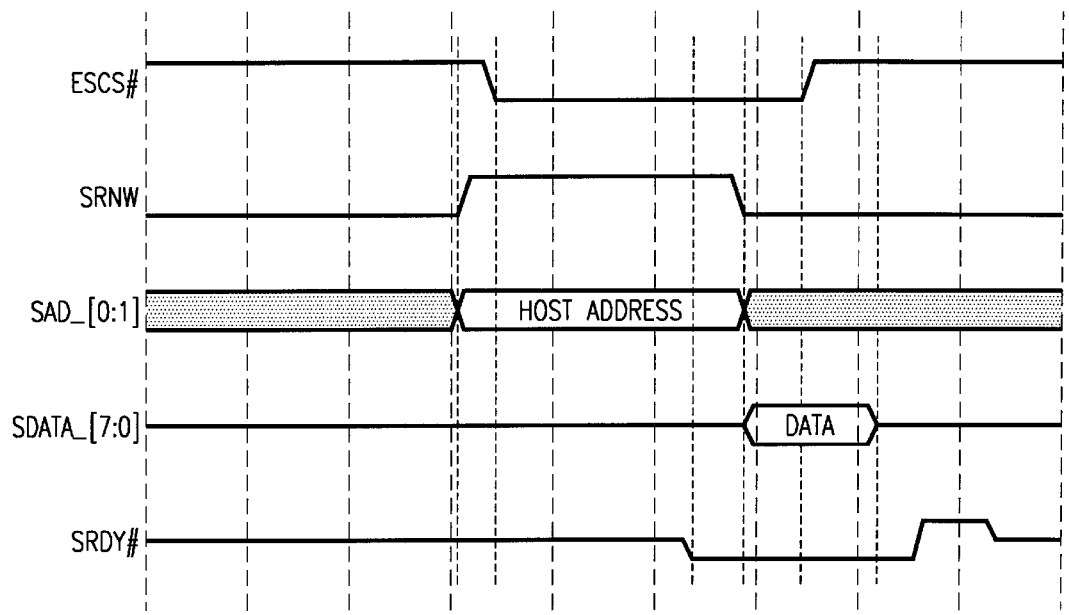
FIG. 94 is a signal timing diagram illustrating a Read Cycle for the circuit of FIG. 76.
Figure 98:
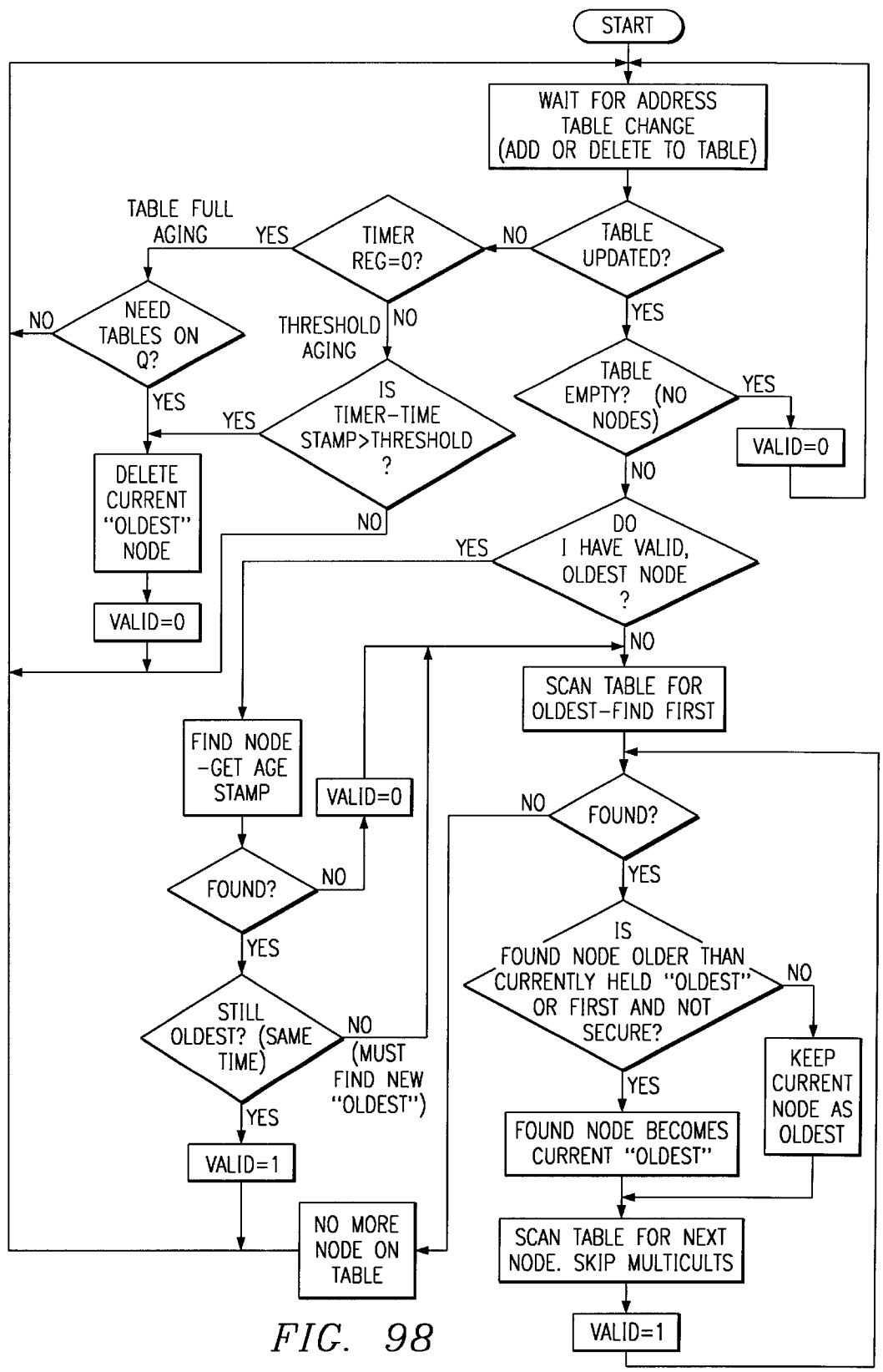
FIG. 98 is a simplified flow diagram of the internal states of the age state machine for the circuit of FIG. 76.
Figure 99:
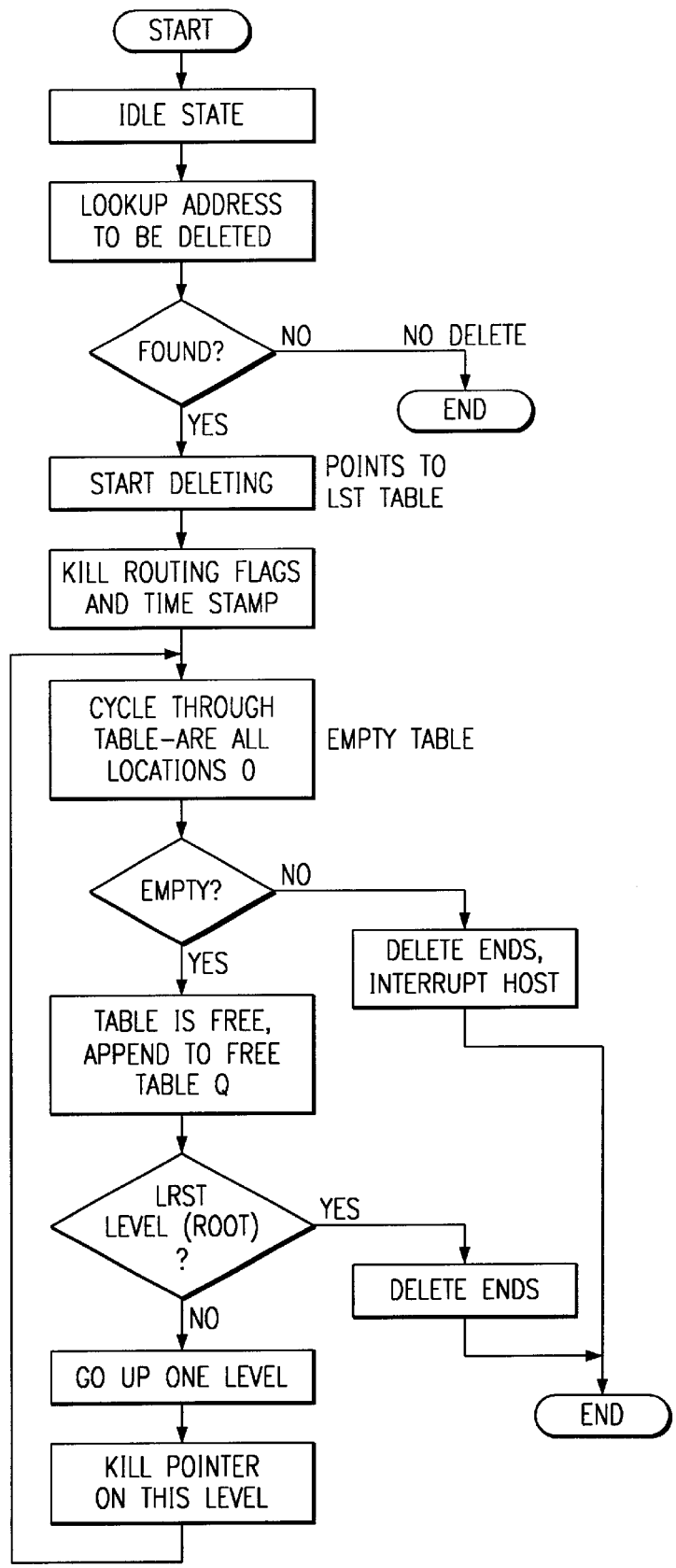
FIG. 99 is a simplified flow diagram of the internal states of the delete state machine for the circuit of FIG. 76.
Figure 100:
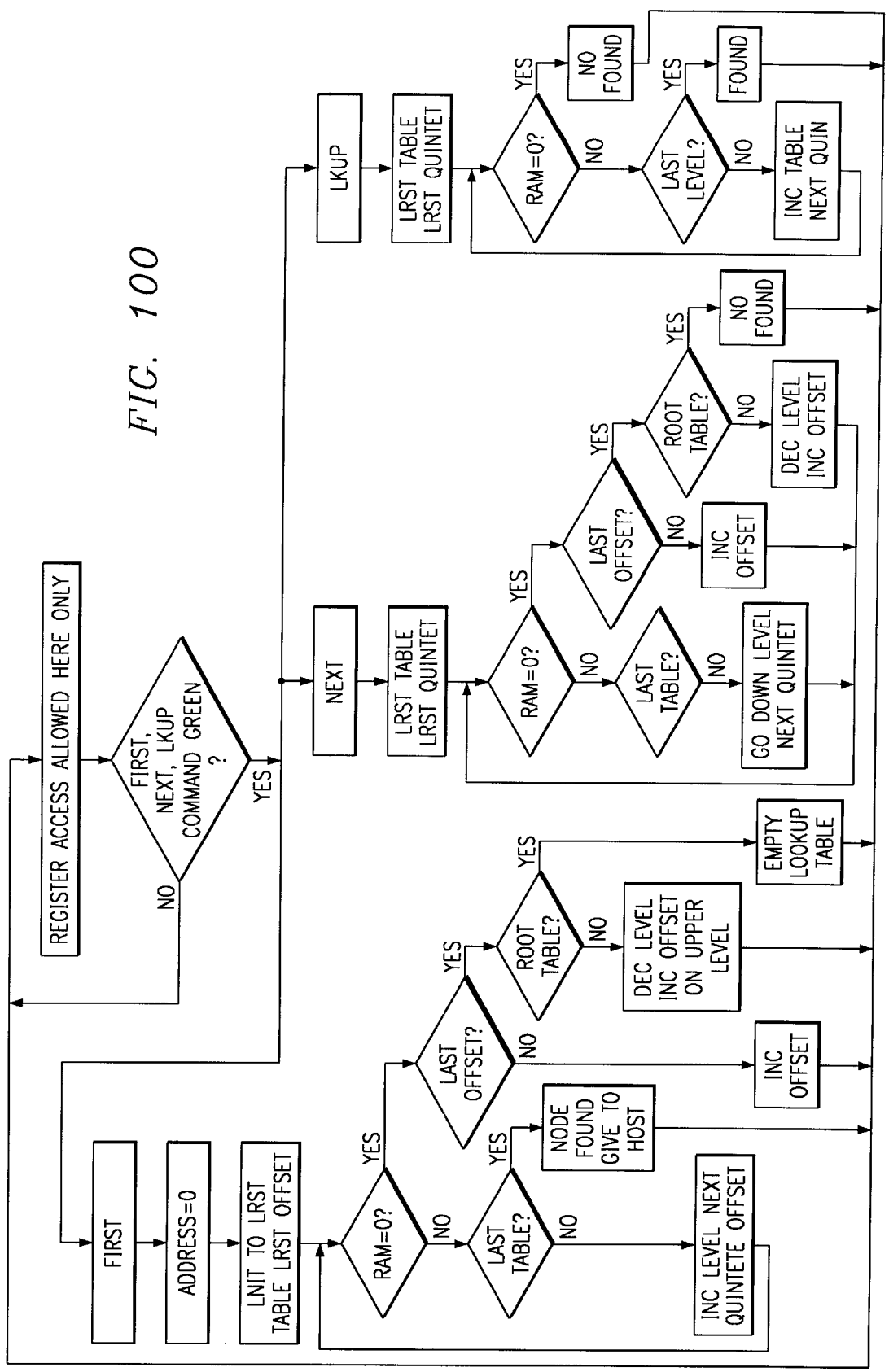
FIG. 100 is a simplified flow diagram of the internal states of the find state machine for the circuit of FIG. 76.
Figure 101:
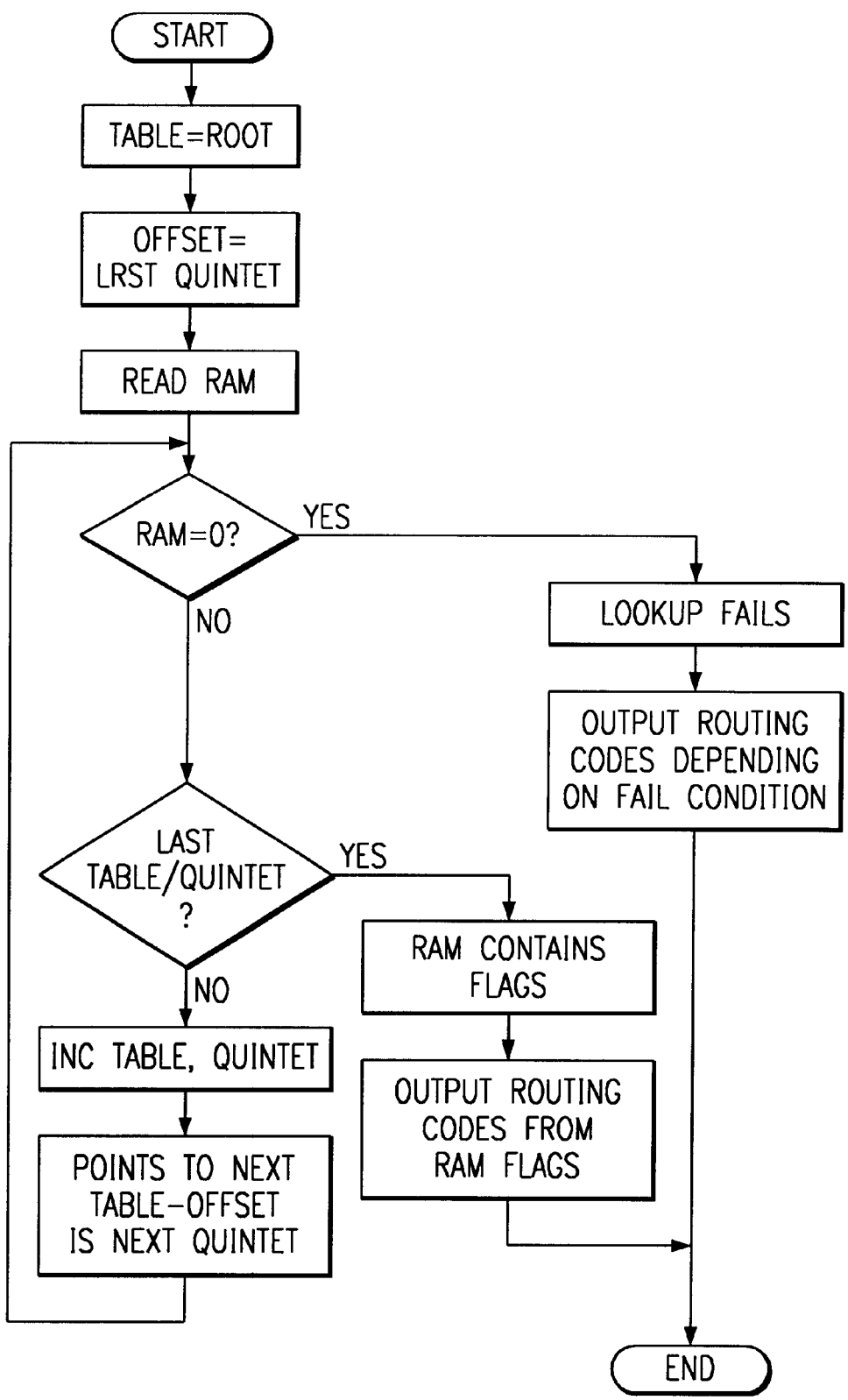
FIG. 101 is a simplified flow diagram illustrating the internal states of the look-up state machine for the circuit of FIG. 76.
Figure 102:
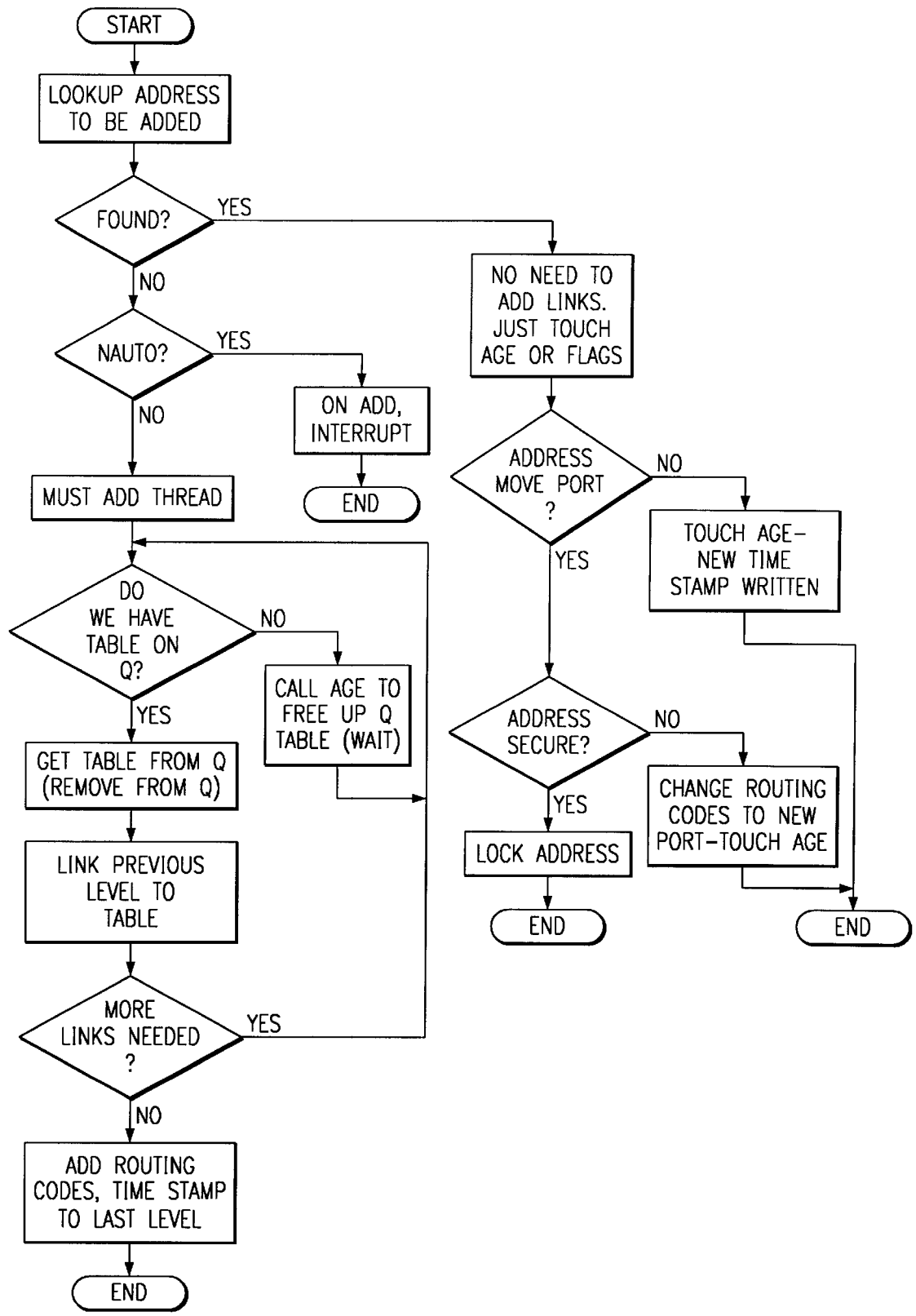
FIG. 102 is a simplified flow diagram of the internal states of the add state machine for the circuit of FIG. 76.

FIG. 88 is similar to FIG. 86, except that the two network chips 2001 are also connected to a router 900 to provide an implementation of a spanning tree algorithm. There is also a port 118 connection between the two network chips 2001 that bypasses the router 900. Thus, multiple, redundant uplinks for switch load sharing are also supported through external address matching devices and a management CPU 600.

The normal frame traffic for a frame which comes into switch one (TSWITCH1 2001) and whose destination address is unknown is this:

Node 1 sends a frame to Node 1

Node 1's frame enters switch one. It is not matched by EALE 1, and gets routed to UNKUNIPorts (which should include the Uplink).

EALE 1 adds node 1 to the lookup table and assigns it to the originating port.

The router 900 broadcasts the frame to TSWITCH2, and the frame enters TSWITCH2 through the Uplink.

EALE 2 does not match the incoming frame, and routes it to its copy of UNKUNPorts, masking out the Uplink if it was set in the register. Node 2 receives the frame.

EALE 2 adds node 1 to its table with the Uplink as the originating port. Now both EALE devices have learned the location of node 1.

Node 2 responds to Node 1's frame. The frame gets routed from TSWITCH2 to TSWITCH1 through the router 900. EALE 2 learns node 2's location, and EALE 1 assigns node 2 to its Uplink.

All frames between 1 and 2 are now routed through the router 900. The router 900 also knows the locations of the nodes 1 and 2 for frames which come to it from the rest of the network.

The spanning tree algorithm is designed to minimize traffic through the router 900. It does this by recognizing that traffic between node 1 and node 2 would be better served if it traveled between the redundant link between TSWITCH1 and TSWITCH2. The management CPU 600 can easily change how the EALEs 10001 route frames.

The management CPU 600 changes EALE 1's information about node 2. Node 2's port is changed from the Uplink to the redundant link. From now on all frames destined to port 2 will bypass the router 900.

The management CPU 600 changes EALE 2's information about node 1. Node 1's port is changed from the Uplink to the redundant link. From now on all frames destined to port 1 will bypass the router 900.

All frames between 1 and 2 are now routed to the redundant link and bypass the router 900. The only frames for 1 and 2 which go through the router 900 are those coming from the rest of the network.

The external address matching device 10001 provides the capability to direct spanning tree BPDUs to a management port, so that the local CPU 600 can process the BPDUs according to the spanning tree algorithm, to determine if its the root switch/bridge, or the lowest cost path to the root.

The algorithm is also responsible for placing the ports into a forwarding or blocking state to eliminate loops in the network.

To direct BPDUs to the management port the all groups multicast address is programmed into the external address matching device. The ULAN mask associated with this address is programmed to forward all packets with this address to the management port (e.g. if port 14 is the management port, the ULAN mask will be programmed to be 0004 Hex). The algorithm will then process the contents of the BPDU and transmit a BPDU back on the same port. To transmit the BPDU on a particular port, the ULAN mask needs to be modified (e.g. to transmit a BPDU to port 9 the mask would be 0024 Hex, as can be seen the mask bit for port 14 is still, however the EALE 10001 insures that it never copies a packet back to the source port, hence the BPDU will not be copied back to port 14, but will allow this port to receive BPDUs from other ports).

To place a port in blocking or forwarding state, the local CPU 600 needs to look at all the MAC addresses in the table. If the address is associated with a port that needs to be blocked then the PortCode needs to be changed to a port that is in forwarding state to allow communication to continue via the root switch/bridge.

Referring now to FIG. 1, there may be seen a functional block diagram of a circuit 200 that forms a portion of a communications system of the present invention. More particularly, there may be seen the overall functional architecture of a circuit 200 that is preferably implemented on a single chip as depicted by the dashed line portion of FIG. 1. As depicted inside the dashed line portion of FIG. 1, this circuit 200 consists of preferably fifteen Ethernet media access control (MAC) blocks 1201,1221,1241, a first-in first-out (FIFO) RAM block 1301, a DRAM interface block 1421, a queue manager block 1401, an address compare block 150, an EEPROM interface block 801, a network monitoring muthplexer (mux) block 1601, an LED interface block 1801, a DIO interface block 1701, an external address interface block 184 and network statistics block 1681. Each of the MACS 1201, 1221, 1241 is associated with a communications port 116,117,118 of the circuit 200; thus, the circuit 200 has fifteen available communications ports for use in a communications system of the present invention.

The consolidation of all these functions onto a single chip with a large number of communications ports allows for removal of excess circuitry and/or logic needed for control and/or communications when these functions are distributed among several chips and allows for simplification of the circuitry remaining after consolidation onto a single chip. More particularly, this consolidation results in the elimination of the need for an external CPU to control, or coordinate control, of all these functions. This results in a simpler and cost-reduced single chip implementation of the functionality currently available only by combining many different chips and/or by using special chipsets. However, this circuit 200, by its very function, requires a large number of ports, entailing a high number of pins for the chip; the currently proposed target package is a 352 pin plastic superBGA cavity down package which is depicted in several views in FIG. 58. The power and ground signals have been assigned to pins in such away as to ensure all VCC power pins, ground (GND) pins and 5V power pins are rotationally symmetrical to avoid circuit damage from powering up the chip with a misoriented placement of the chip in its holder.

In addition, a JTAG block 901 is depicted that allows for testing of this circuit 200 using a standard JTAG interface that is interconnected with this JTAG block 901. As more fully described later herein, this circuit 200 is fully JTAG compliant, with the exception of requiring external pull-up resistors on certain signal pins (not depicted) to permit 5v inputs for use in mixed voltage systems.

In addition, FIG. 1 depicts that the circuit 200 is interconnected to a plurality of other external blocks. More particularly, FIG. 1 depicts 15 PHY blocks 110,112,114 and a set of external memory blocks 300. Twelve of the Ethernet MACS 1201 are each associated with and connected to an off chip 10 BaseT PHY block 110. Two of the Ethernet MACS (high speed ports) 1221 are each associated with and connected to an off-chip 10/100 BaseT PHY block 112. One of the Ethernet MACS (uplink port) 1241 is associated with and connected to an off-chip 10/100/200 Base1OT PHY block 114. Preferably, the external memory 300 is an EDO DRAM, although dearly, other types of RAM may be so employed. The external memory 300 is described more fully later herein. The incorporation of these PHY blocks 110, 112,114 and/or all or portions of the external memories 300 onto the chip is contemplated by and within the scope of the present invention.

Figure 57:
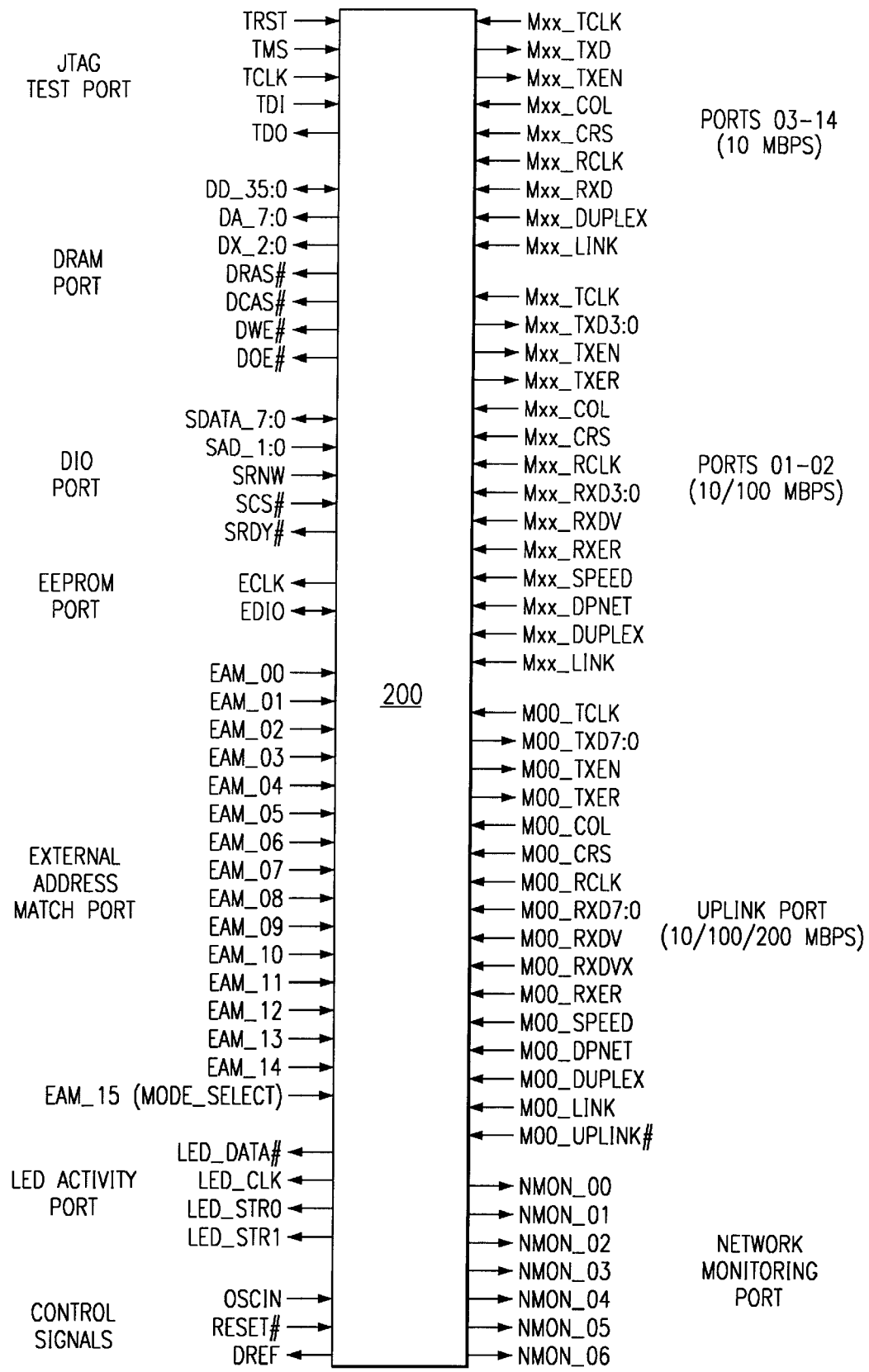
FIG. 57 is a diagram of the signal groups and names for the circuit of FIG. 1.

Referring now to FIG. 57, there may be seen a diagram of the circuit's signal groups and names, More particularly, it may be seen that the JTAG test port has four input signals and one output signal. The pin signal name ("pin name"), type (fin. "P'out"), and "function" for these five JTAG pins are described in Table 14 below.

TABLE 14

| PIN NAME | TYPE | FUNCTION |
| --- | --- | --- |
| TRST | in | Test Reset: Used for Asynchronous reset of the test port controller. An external pull up resistor must be used on TRST, to be JTAG complaint. No internal pull-up resistors are provided to permit the input to be 5v tolerant |
| TMS | in | Test Mode Select: Used to control the state of the test port controller. An external pull up resistor must be used on MS, to be JTAG complaint. No internal pull-up resistors are provided to permit the input to be 5v tolerant |
| TLCk | in | Test Clock: used to clock state information and test data into and out of the device during operation of the test port. |

TABLE 14-continued

| PIN NAME | TYPE | FUNCTION |
| --- | --- | --- |
| TDI | in | Test Data Input: Used to serially shift test data and test instructions into the device during operation of the test port. An external pull-up resistor must be used on TDI, to be JTAG compliant. No internal pull-up resistors are provided to permit the input to be 5v tolerant. |
| TDO | out | Test Data Output: Used to serially shift test data and test instructions out of the device during operation of the test port. |

It may be seen that the uplink port (10/100/200 Mbps) or port 00 has 20 input signals and 10 output signals. The pin signal name (pin name), type (in/out), and function for these pins are described in Table 15 below. However, M00 DUPLEX is not a true bi-directional pin, it is an input with an open collector pull-down.

TABLE 15

| PIN NAME | TYPE | FUNCTION |
| --- | --- | --- |
| M00_TCLK | in | Transmit Clock: Transmit Clock source from the attached PHY or PMI device. |
| M00_TXD7 M00_TXD1 M00_TXD0 | out | Transmit Data: Nibble/Byte Transmit data. When M00 _TXEN is asserted these signals carry transmit data. The source port number appears on TXD once cycle prior to M00_TXEN being asserted. Data on these signals is always synchronous to M00_TCLK. The uplink can transmit 4 bit or 8 bit data, this is determined strapping signal M00 UPLINK# (active low) When low the uplink will operate in wide (8bit mode). When high the upper nibble bits 4:7 are not driven |
| M00-TXEN | out | Transmit Enable: This signal indicates valid transmit data on M00_TXDnn. |
| M00_TXER | out | Transmit Error: This signal allows coding errors to be propagated across the MII. When M00_UPLINK# is low, (200Mbps uplink), TXER is taken high whenever an under-run in the TX FIFO for port 00 occurs and causes fill data is transmitted. This enables external logic to reconstruct and resend the frame. In non-uplink mode (M00_UPLINK#=1), M00_TXER will be asserted at the end of an under running frame, enabling a forced codin error. |
| M00-COL | in | Collision Sense: In CSMA/CD mode assertion of this signal indicates network collision. In Demand Priority mode this signal is used to begin frame transmission. In Full Duplex, MOO_col can be used as a flow control signal |
| M00-CRS | in | Carrier Sense: This signal indicates a frame carrier signal is being received. |
| M00-RCLK | in | Receive Clock: Receive clock source from the attached PHY or PMI device. |
| M00_RXD7 ... M00_RXD1 M00_RXDO | in | Receive Data: Nibble/Byte Receive data from the PMD (Physical Media Dependent) front end. Data is synchronous to MOO _RCLK. Port 00, can transmit 4 bit or 8 bit data, this is determined strapping signal MOO_UPLINK# (active low) When low the uplink will operate in wide (8bit mode). When high the upper nibble bits 4:7 are not driven |

TABLE 15-continued

| PIN NAME | TYPE | FUNCTION |
|---|---|---|
| M00-_RSDV | in | Receive Data Valid: Indicates data on M00_RXDO is valid for 10/100 Mbps operation. Whilst operating in 200 Mbps mode, in conjunction with the M00_RXDVX signal, it indicates the following: M00 _RXDVX (MSB), M00_RXDV(LSB) 00 - Idle (Interframe gap) 01 -data frame available 10 - Idle (waiting for keytag) 11 - Keytag data available. |
| M00_RXDVX | in | This signal is only valid during operation in 200 Mbps mode. In conjunction with the M00_RXDVX signal, it indicates the following: M00 _RXDVX (MSB), M00 _RXDV(LSB) 00 - Idle (Interframe gap) 01 -data frame available 10- Idle (waiting for keytag) 11 - Keytag data available. |
| M00_RXER | in | Receive Error: Indicates reception of a codin error on received data. |
| M00-SPEED | in | Bit rate selection. the speed of the MAC interface is determined by the level on this signal. 1 = 100 Mb s, 0 = 10 Mbs |
| M00_DPNET | in | Demand Priority Selection. The protocol of the 100 Mbps interface is determined by the level on this signal. (high = 100 MbitVG Demand Priority or low = 100 Mbps CSMA/CD). Note there is no comprehension of the priority of DP frames. No change in port arbitration is implemented for DP frame handling. |
| M00_DUPLEX | inout | Switches the interface between full and half duplex. (low = Half Duplex, high = full duplex) Input has an open collector pull down, used to take line low when FORCEHD bit is set. |
| M00_LINK | in | Indicates the presence of port connection. low = no link, high = link ok |
| M00_UPLINK # | in | Active low, mode selection signal for wide 8bit uplink protocol. When low the uplink transmits data at 200 mb s. |

It may be seen that the twelve 10 Mbps ports, or ports 03–14, each have 11 input signals and 3 output signals, where '5" is any one of port numbers 03 through 14. The pin signal name (pin name), type (in/out), and function for these pins are described in Table 17 below. However, Mxx DUPLEX is not a true bi-directional pin, it is an input with an open collector pull-down.

TABLE 17

| PIN NAME | TYPE | FUNCTION |
|---|---|---|
| Mxx TCLK | in | Transmit Clock: Transmit Clock source from the attached PHY or PMI device. |
| Mxx TXD | out | Transmit Data: Transmit data from port xx. When Mxx-TXEN is asserted this signal carries data |
| MXX TXEN | out | Transmit Enable: This signal indicates valid transmit data on Mxx TXD. |
| Mxx_COL | in | Collision Sense: In CSMA/CD mode, assertion of this signal indicates network collision. |
| Mxx_CRS | in | Carrier Sense: This signal indicates a frame carrier signal is bein received. |
| Mxx_RCLK | in | Receive Clock: Receive clock source from the attached PHY or PMI device. |

TABLE 17-continued

| PIN NAME | TYPE | FUNCTION |
|---|---|---|
| Mxx_RXD | in | Receive Data: Receive data from the PMD Front End. Data is synchronous to MXX-RCLK. |
| Mxx_DUPLEX | inout | Switches the interface between full and half duplex. (low = Half Duplex, high = full duplex Input has an open collector pull down, used to take line low when FORCEHD bit is set |
| Mxx_LINK | in | Indicates the presence of port connection |

It may be seen that the two high speed ports (10/100 Mbps), or ports 01–02, each have 14 input signals and 6 output signals, where "xx" is port umber 01 or 02. The pin signal name (pin name), type(in/out), and function for these pins are described in Table 16. However, Mxx_DUPLEX is not a true bi-directional pin, it is an input with an open collector pull-down.

| PIN NAME | TYPE | FUNCTION |
|---|---|---|
| Mxx_TCLK | in | Transmit Clock: Transmit Clock source from the attached PHY or PMI device. |
| Mxx_TXD3 MxxTXD2 MxxTXD1 Mxx_TXDO | out | Transmit Data: Nibble Transmit data from TSWITCH. When Mxx TXEN is asserted these signals carry transmit data. Data on these signals is always synchronous to Mxx TCLK. |
| Mxx TXEN | out | Transmit Enable: This signal indicates valid transmit data on Mxx_TXD. |
| Mxx TXER | out | Transmit Error: This signal allows coding errors to be propagated across the MIL |
| Mxx COL | in | Collision Sense: In CSMA/CD mode, assertion of this signal indicates network collision. In Demand Priority mode this signal is used to begin frame transmission. |
| Mxx CRS | in | Carrier Sense: This signal indicates a frame carrier signal is bein received. |
| Mxx_RCLK | in | Receive Clock: Receive clock source from the attached PHY or PMI device. |
| Mxx_RXD3 MxxRXD2 Mxx_RXD1 Mxx_RXDO | in | Receive Data: Nibble Receive data from the PMC (Physical Media Dependent) front end. Data is synchronous to Mxx_RCLK |
| Mxx RXDV | in | Receive Data Valid: Indicates data on Mx_RSDN is valid |
| Mxx RXER | in | Receive Error: Indicates reception of a codin error on received data. |
| Mxx SPEED | in | Bit rate selection. The speed of the MAC interface is determined by the level on this signal. (1 = 100 Mbp s, 0 = 10 Mb s |
| Mxx_DPNET | in | Demand Priority Selection. The protocol of the 100 Mbps interface is determined by the level on this pin. (high = 100 MbitVG Demand Prior or low = 100 MBPS CSMA/CD). Note there is no comprehension of the priority of DP frames. No change in port arbitration is implemented for DP frame handling. |
| Mxx_DUPLEX | inout | Switches the interface between full and half duplex. (low = half duplex, high = full duplex). Input has an open collector pull down, used to take line low when FORCEHD bit is set. |
| Mxx LINK | in | Indicates the presence of port connection. (low - no link, high = link ok) |

It may be seen that the control signals port has 2 input signals and 1 output signal, the pin signal name (pin name), type (in/out), and function for these pins are described in Table 18.

TABLE 18

| PIN NAME | TYPE | FUNCTION |
| --- | --- | --- |
| OSCIN | in | clock input 50 Mhx |
| RESET # | in | reset input Active low |
| DREF | out | DRAM reference clock |

It may be seen that the DIO port has 8 input/output signals, 4 input signals and 1 output signal. The pin signal name (pin name), type (in/out), and function for these pins are described in Table 20 below.

TABLE 20

| PIN NAME | TYPE | FUNCTION |
| --- | --- | --- |
| SDATA 7:0 | inout | Byte wide bi-operational dio port |
| SAD-1:0 | in | DIO address port, these select the TSWITCH host registers |
| SRNW | in | DIO read not write signal. When low this indicates write cycle on the DIO port |
| SCS# | in | DIO Chip Select signal, when low this indicates a port access is valid. |
| SRDY# | out | DIO Ready signal. When low indicates to the host when data is valid to be read (read cycle) indicates when data has been received (write cycle) This signal is driven high for one clock cycle before placing the output in hi-impedance after SCS# is taken high. SRDY# should be pulled high with an external pull resistor. |

It may be seen that the EEPFROM port has 1 input/output signal and 1 output signal. The pin signal name (pin name), type (in/out), and function for these pins are described in Table 21 below.

TABLE 21

| PIN NAME | TYPE | FUNCTION |
| --- | --- | --- |
| ECLK | out | EEPROM Data clock: Serial EEPROM Clock Signal. ECLK requires an external pull-up resistor. |
| EDIO | inout | EEPROM Data I/O: Serial EEPROM Data I/O signal requires an external pull-up (See EEPROM data sheet) for EEPROM operation. Tying this signal to ground will disable the EEPRO interface and prevent auto-configuration. EDIO requires an external pull-up resistor. |

It may be seen that the DRAM port has 36 input/output signals and 15 output signals. The pin signal name (pin name), type (in/out), and function for these pins are described in Table 19.

TABLE 19

| PIN NAME | TYPE | FUNCTION |
| --- | --- | --- |
| DD 35:0 | inout | DRAM Data bus, bi-directional |
| DA-7:0 | out | DRAM Address bus (time multiplexed with Row and column address strobes |
| DX 2:0 | out | DRAM Extended Address lines (time multiplexed with Row and Column strobes |
| DRAS# | out | DRAM Row Address Select signal |
| DCAS# | out | DRAM Column Address Select signal |
| DWE# | out | DRAM Write Enable signal |
| DOE# | out | DRAM Output enable signal |

It may be seen that the external address match port has 16 input signals. The pin signal name (pin name), type (in/out), and function for these pins are described in Table 22 below.

TABLE 22

| PIN NAME | TYPE | FUNCTION |
| --- | --- | --- |
| EAM-00 | in | External routing signal, when EAM-15 is low and this signal is high it indicates the frame should be transmitted from port 00. |
| EAM_01 | in | External routing signal, when EAM-15 is low and this signal is high it indicates the frame should be transmitted from port 01. |
| EAM_02 | in | External routing signal, when EAM-15 is low and this signal is high it indicates the frame should be transmitted from port 02. |
| EAM_03 | in | External routing signal, when EAM-15 is low and this signal is high it indicates the frame should be transmitted from port 03. |
| EAM_04 | in | External routing signal, when EAM-15 is low and this signal is high it indicates the frame should be transmitted from port 04. |
| EAM_05 | in | External routing signal, when EAM-15 is low and this signal is high it indicates the frame should be transmitted from port 05. |
| EAM_06 | in | External routing signal, when EAM-15 is low and this signal is high it indicates the frame should be transmitted from port 06. |
| EAM 07 | in | External routing signal, when EAM-15 is low and this signal is high it indicates the frame should be transmitted from port 07. |
| EAM_08 | in | External routing signal, when EAM-15 is low and this signal is high it indicates the frame should be transmitted from port 08. |
| EAM 09 | in | External routing signal, when EAM-15 is low and this signal is high it indicates the frame should be transmitted from port 09. |
| EAM_10 | in | External routing signal, when EAM-15 is low and this signal is high it indicates the frame should be transmitted from port 10. |
| EAM_11 | in | External routing signal, when EAM-15 is low and this signal is high it indicates the frame should be transmitted from port 11. |
| EAM_12 | in | External routing signal, when EAM-15 is low and this signal is high it indicates the frame should be transmitted from port 12. |
| EAM_13 | in | External routing signal, when EAM-15 is low and this signal is high it indicates the frame should be transmitted from port 13. |
| EAM_14 | in | External routing signal, when EAM-15 is low and this signal is high it indicates the frame should be transmitted from port 14. |
| EAM_15 (MODE SELECT) | in | When high indicates the least significant nibble encodes a single port routing code. |

It may be seen that the LED activity port has 4 output signals. The LED driver interface signals provide port state information. The pin signal name (pin name), type (in/out), and function for these pins are described in Table 23.

TABLE 23

| PIN NAME | TYPE | FUNCTION |
| --- | --- | --- |
| LED STR1 | out | TxQ data strobe, pulses high for one LED CLK cycle, one LED CLK cycle after the end of valid led data for TxQ status |
| LED STRO | out | Port status strobe, pulses high for one LED CLK cycle, one LED CLK cycle after the end of valid led data for port status. |
| LED DATA# | out | Active Low, Serial LED status data |
| LED CLK | out | Serial Shift clock for the LED status data |

It may be seen that the network monitoring port has 7 output signals. The network monitoring (NMON) interface signals provide traffic information for monitoring purposes without interrupting normal traffic operation. The output of the NMON pin is controlled by the bits MONWIDE and MONRXTX, which are in the system network monitoring (NMON) register described herein. The pin signal name (pin name), type (in/out), and function for these pins are described in Table 24, where "~3" is the port number of the port being monitored.

TABLE 24

| | | FUNCTION | | |
|---|---|---|---|---|
| PIN NAME | Te | MONWIDE = 0 | MONWIDE = 1 MONRXTX = 0 | MONWIDE = 1 MONRXTX = 1 |
| NMON_00 | out | Mxx-Rxd | Mxx-Rx D 0 | Mxx_TX D 0 |
| NMON_01 | out | Mxx__CRS | Mxx-RX D 1 | Mxx_TX D 1 |
| NMON_02 | out | Mxx__RCLK | Mxx-RX D 2 | Mxx_TX D 2 |
| NMON_03 | out | MxxTxD | Mxx-RX D 3 | Mxx_TX D 3 |
| NMON_04 | out | Mxx TXEN | Mxx_RX DV | Mxx-TX EN |
| NMON_05 | out | Mxx TCLK | Mxx_RC LK | Mxx_TC LK |
| NMON_06 | out | Mxx CO1 | Mxx SPEED | Mxx SPEED |

It should be noted the that the "function" description for each of the foregoing signal pin tables represents the presently preferred function, operation and operative level, if noted therein.

Referring again to FIG. 1, it may be seen that each of the MACS 1201,1221,1241 interface to individual 1301 associated with each port and provide network "media access control" functions for that port. Such network "media access control" functions include, for example, but are not limited, to basic data framing/capture functions (such as preamble generation/check, data serialization/deserialization, etc.), Ethernet binary exponential backoff (with FIFO based retries), filtering of runt packets (<64 byte frames are discarded in FIFO), network statistics capture, and adaptive performance optimization (APO) capability.

Briefly, the circuit 200 switches communications packets between networks (or other devices, circuitry or hardware) associated with one or more port by storing all incoming packets in a common buffer memory 130, then reading their back for transmission on the appropriate output port or ports. A single common memory sub-system for buffer memory keeps system costs down. More particularly, data received from a MAC interface 110 is buffered in an associated receive (Rx) FIFO 1301, before storage in external memory 300 under control of the queue manager logic 1401. Preferably, the external (buffer) memory 300 is EDO DRAM. (queue manager state machine logic 1401 applies round robin arbitration to maintain bandwidth and fast data transfer without contention. The address compare block 1501 determines the destination port for a packet. The queue on which the data from the FIFO 1301 is appended is determined by the address compare block 1501.

On transmission, frame data is obtained from the buffer memory 300 and buffered temporarily in the transmit (Tx) FIFO 1301, before transmission on the associated MAC 1201,1221,1241 for that port. The FIFO 1301 allows data bursting to and from the preferred DRAM external memory 300. If a collision occurs during transmission, data recovery and re-transmission occurs from the FIFO 1301. Preferably, all DRAM memory 1300 transfers are made within a memory page boundary, permitting fast burst accesses.

Statistics compilation logic is integral to the queue manager unit 1401. Statistics on the frame data being switched and port activity are collected, collated and stored for each port 168. Access to the statistics registers 1681 is provided via the Direct Input/Output (DIO) blck 1701 to a host interface. The host interface is primarily intended for low speed configuration and monitoring operations and is not needed to manage or control the flow of data through the circuit 200. Statistics information may be monitored by an external CPU or host computer.

The circuit 200 allows any port configuration, including those which may exceed the maximum internal and/or external memory bandwidth. This can cause packets to be dropped; in order to avoid these conditions, the port configurations are preferably restricted so that the maximum allowable bandwidth to the external memory is not exceeded.

Preferably, all the 10 Mbps ports 110 internally support a single MAC address per port; preferably, external address compare logic or address matching circuitry (described more fully later herein) is required to support multiple addresses or users on any one of these ports. Preferably, ports 1 and 2 (the 10/100 Mbps high speed connections) 112 are similarly restricted. As discussed later herein, the address compare block 1501 preferably contains only one address compare register for ports 1 through 14 112,110, precluding assignment of multiple address networks to these ports without utilizing some kind of external address compare logic. Preferably, the uplink port (Port 0) 114 does not have any internal address associated with it and can thus support multiple addresses.

In operation, packets are normally routed to local ports based on the destination MAC address. However, the circuit 200 also allows for frame cut through; cut-through, if enable, starts transmission on the destination port before complete reception of the frame. This reduces the switch latency, since the frame is re-transmitted before reception is complete. For cut-through, the circuit 200 will not be able to flag any errors until after the retransmission has already started; this potentially wastes bandwidth. Cut through may be employed for all situations where the transmission pores data. Rate is slower than, or equal to, the data rate on the receiving port; for example a 100 Mbps port may 112 cut-through to another 100 Mbps port 112 or a 10 Mbps port 110. However, a 10 Mbps port 110 preferably cannot cut-through to a 100 Mbps port 112; for this case, local cut-through will be disabled to prevent under flow. Instead, packet based switching will be used. Further, cut-through is not permitted for broadcast frames and cut-through may be selectively disabled by either the receiving port or transmitting port, on a per port basis, by appropriately setting the store and forward bits in the port control register for that port.

FIG. 2 depicts the preferred arrangement of data and flag information in a presently preferred 72 bit length word 210. More particularly, FIG. 2 depicts the use of a low 2201 and high 2301 data word, each of 32 bits length, and 8 bits of flag information 2401. The flag information 2401 is generated by the MAC interfaces 1201, provides useful status and control information, and is passed along with the data 2201, 2301 to the FIFO 1301.

The FIFO 1301 buffers the data between the MAC interfaces 1201 and external or buffer memory 300 under control of the queue manager block 1401. The FIFOs 1301 preferably implemented as a single port SRAM. There are independent FIFOs 1301 allocated for transmit and receive for each port. Preferably, the depth of the FIFO 1301 storage is 256 bytes per direction, per port. The RAM space for each direction of a port is further subdivided into four 64 byte buffers. There is an additional FIFO 1301 storage block allocated for storage of a broadcast frame. The total FIFO RAM 1301 memory size is presently preferably organized as 1152×72 bit words. Clearly, more or less FIFO RAM may be provided, and/or organized in different sized words and different buffer sizes and numbers of buffers.

The FIFO RAM 1301 provides for temporary storage of network or communications data and allows burst transfers to and from the external memory or DRAM 300. The FIFO RAM 1301 also provides for network retries and allows runt frame filtering to be handled on-chip.

Preferably, each access to a FIFO 1301 provides 8 bytes of data and 1 byte of flag information. To ensure sufficient bandwidth, the access sequencing scheme depicted in FIG. 3 allows the presently preferred FIFO memory 1301 to be accessed as a time multiplexed resource. That is, access to the FIFO 1301 memory is allocated on a time division multiplexed basis rather than on a conventional shared memory bus or separate buses basis; this removes any need for bus arbitration (and any bus arbitration logic) and provides a guaranteed minimum bandwidth even under maximum communications loading circumstances.

More particularly, FIG. 3 depicts that the first access level to the FIFO RAM 1301 is equally divided between queue manager 1401 access (QM Cycle) 320 and MAC (or port) access cycles (MAC Cycle) 310. That is, half the FIFO accesses (every other cycle) are allocated by the queue manager 1401; however, if the queue manager 1401 has no need to access the FIFO 1301 it passes the access on to the MAC access cycle 310. During the queue manager cycle 320, data collated into a FIFO buffer 1301 is transferred between the FIFO 1301 and the external DRAM 300 under the control of the queue manager logic 1401.

During the port access cycle (MAC Cycle) 310, the port that is able to access the FIFO 1301 is based on the round robin scheme shown in the second and third access levels depicted in FIG. 3. The second access level depicts the allocation between individual transmit MO 330Tx and receive (Rx) 330Rx slots for the lower ports (ports 0–2) and transmit (Tx) and receive (Rx) slots as a group for the upper ports (ports 3–14). That is, for the first port access cycle (MAC Cycle) 310 depicted in the second access level, the uplink port (port 0) has a transmit (Tx) 330Tx slot available which it either uses or passes access to the QM cycle 320; when the next port access cycle (MAC Cycle) 310 occurs, the uplink port (port 0) has a receive (Rx) 330Rx slot available which it either uses or passes. Thus, for each access slot from the first level of FIG. 3, the second level depicts the sequence of accesses. The third access level depicts the allocation between individual transmit (TX) or receive (Rx) slots 340-XX for each of the upper ports (ports 3–14) that make up a group access slot at the second access level. Thus, for each port 3 14 access slot, 330Tx or 330Rx, from the second level of FIG. 3, the third level depicts the sequence of accesses. The "line" in the center of the three blank boxes (a), (b), (c) between port 5 and port 11 on the third access level represent the remaining ports between 5 and 11.

Each MAC port block 1201 in FIG. 1 has a number of FIFO pointers associated with it.

These pointers are maintained by the queue manager 1401 and are used by the queue manager logic 1401 to point to the locations within the FIFO 1301 where data can be stored or removed from. Independent pointers for receive (Rx) and transmit (Tx) operations exist for the queue manager and each MAC port 1201. The five bit FIFO pointers address one of a possible 32 locations in the memory, corresponding to a total data access of 32 x. The FIFO address format is depicted in FIG. 4. More particularly, FIG. 4 depicts that the channel address 420 is a 5 bit encoding of the channel, with which the information is associated, found in bit positions six through ten. (For example, channel 0 maps to 00011, channel 1 to 00100, and channel 14 to 10001) Bit 5 422 is set, or reset, depending upon the operation being a transmit or a receive, respectively. Bit positions zero through four in FIG. 4 are the five bit FIFO pointer address 424.

Referring now to FIG. 5, it may be seen how the FIFO RAM memory 1301 is preferably physically mapped into transmit and receive blocks for each port. Further, it may be seen that each of the 32 FIFO blocks 520–538 is subdivided into 4 buffers A–C, with each buffer holding 64 bytes of data and bytes of flag information. Channel 15 538 is for broadcast frames and is sized to be able to completely store a maximum length frame. The flag byte records end of buffer information for the last buffer in a frame, where the buffer may be incompletely used.

Figure 6:
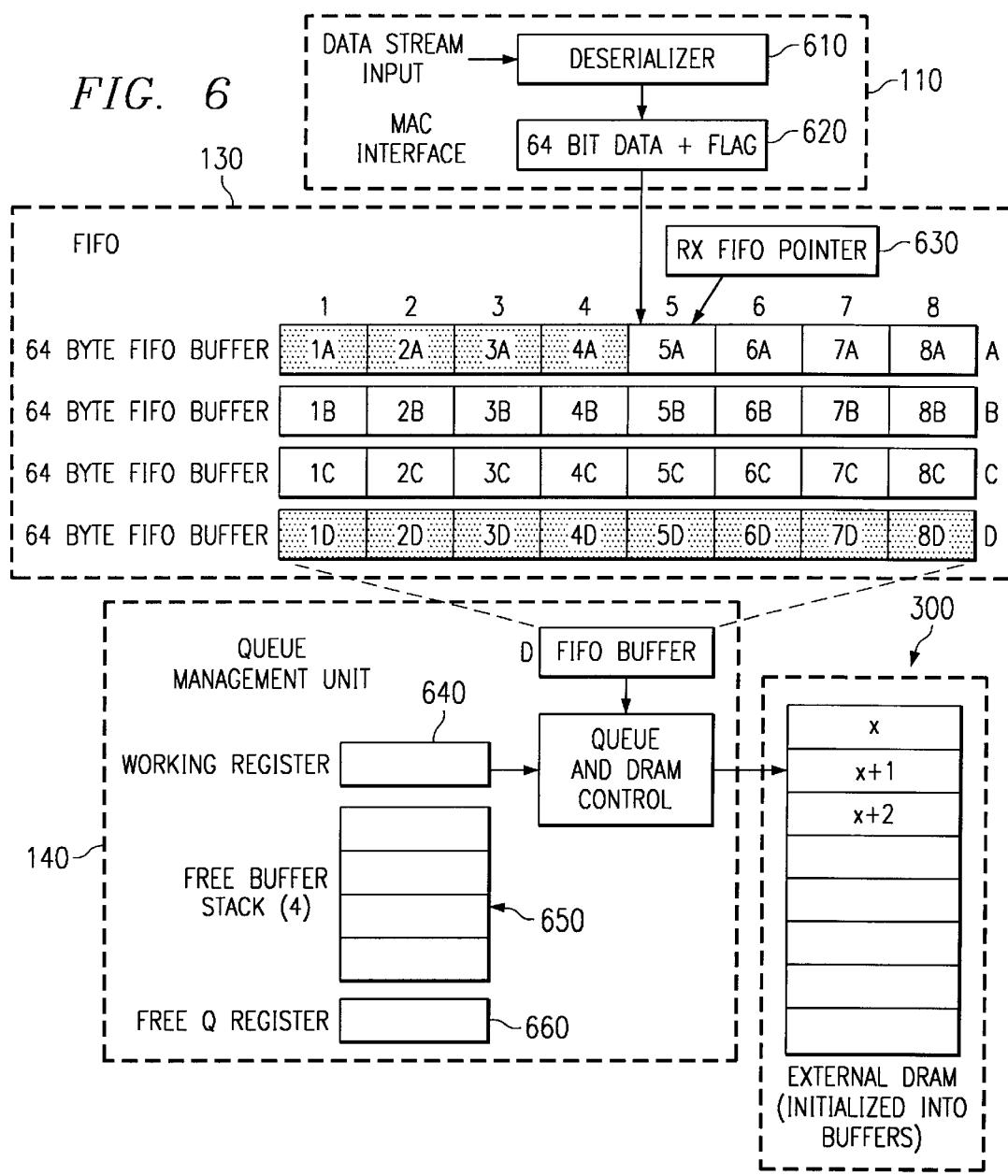
FIG. 6 is a schematic block diagram depicting the flow of normal frame data to the FIFO and from there to the external memory under the control of the queue management block of the circuit of FIG. 1.

Referring now to FIG. 6, there may be seen a schematic block diagram depicting the flow of normal frame data to the FIFO 1301 and from there to the external memory 300 under the control of the queue management block 1401. More particularly, it maybe seen how a data stream is received by a MAC 1201 and deserialized by deserializer 610 into a 64 bit word and associated flag 620. Further, it may be seen that upon data reception, the data is loaded in a FIFO 1301 buffer location "5A" pointed to by a Rx FIFO pointer 630 for that port. As illustrated by the bottom FIFO buffer D, when a FIFO buffer becomes full, that fall buffer D is archived or transferred to the external memory 300, while the next buffer A is used to receive data. Fast page access of the external memory 300 enables swift data transfer. The queue manager 1401 uses the pointer from the working register 640 to archive or transfer the fall. FIFO buffer D to the external or buffer memory 300 at location X+1. The working register value 640 is then replaced by the next pointer in the free buffer stack 650. When all the pointers in the free buffer stack 650 have been used, the free queue (Q) register 660 will be loaded on demand with buffers from the free buffer queue.

If the FIFO 1301 becomes fall and the external buffer memory 300 is also full, then any subsequent frame data will be lost and an error logged. If this condition occurs then the health of the network at large is questionable. That is, more data is entering than can leave the circuit over a sustained period, for which, the buffer depth is insufficient, resulting in storage overflow.

FIFO RAM 1301 access for test is preferably provided via the DIO interface 1701. This allows fall RAM access for RAM testing purposes. Any access to the FIFO 1301 should only be allowed following a soft reset but before the start bit is written (or after power up, but before the start bit is written). As noted more fully later herein, the soft reset bit should be asserted then deasserted; if the soft reset bit is not cleared, the circuit will hold the DRAM refresh state machine in reset and the contents of the external memory will become invalid.

Referring now to FIG. 7, there may be seen a schematic block diagram of the address compare block 1501 for a representative port. The address compare block 1501 provides the switching information required to route the data packets. The source and destination Ethernet addresses are examined by the address compare logic 1501; the address compare logic 1501 uses source addresses to determine the port's address, while destination addresses are used to determine the destination of a packet. If a match is found the appropriate destination channel address is generated and provided to the other circuit blocks.

Each port (except the uplink port) has an address compare register associated with it. Each register holds a 48 bit Ethernet address. The Ethernet source address will be taken from a received frame and assigned to the channel it was received on; this occurs for each frame received. The destination address is compared to the address registers for all the ports. If matched, the channel address for that port or ports is assigned. If no match is found for the destination address then the frame will preferably be sent to the uplink port.

The address compare registers learn their Ethernet address, used for comparison, from the source address of a received frame. The address registers may be accessed via the DIO interface 1701, this allows the ports to be setup and secured under management control, or port addresses monitored.

An address compare state machine handles the extraction and comparison of both the source and destination Ethernet addresses from the queue management block.

Continuing to refer to FIG. 7, it may be seen that as the frame is loaded the source address is compared against the source address 722 already attributed to that port. If the address has changed and the port address 728 acquired by the circuit 200 was secure, an error is logged. During this comparison, is possible to detect multiple entries of the same address in the compare unit 724.

This is also an error, it is erroneous to have the same address applied to multiple ports.

If external address matching logic 1000 is not used, the switched ports (114) must be confined to a single address (desktop) rather than network (multiple address) switching. The uplink port is a switched port and accordingly, a network (multiple address devices) may be connected to this port, For a single address per port (desktop configuration), the circuit provides internal registers 722 to hold the Ethernet address associated with each port. These addresses can be assigned explicitly or dynamically. An address is explicitly assigned by writing it to the port address registers 722 via the DIO interface 1701. An address is assigned dynamically by the circuit hardware loading the register from the source address field of the received frames. If the port is in a secured mode, the address will be loaded only once from the first frame. In an unsecured mode the address is updated on every frame received.

The uplink port (port 0) does not have any port address. This port can be connected to a network segment, so suspension of port activity due to source address mismatch is not supported for this port; there may be many different source addresses on this port. However, port 0 may become disabled due to duplication if the SECDIS bit is set to 1 (in the system control register portion of a port's VLAN register) and a duplicate address is detected.

The circuit 200 provides two different methods for handling broadcast/multicast traffic. One method is out of order broadcast operation. For this method, channel 15 (the broadcast channel) is an area of shared memory 538 within the internal FIFO RAM 1301 reserved for broadcast frame handling. A broadcast frame is transferred in its entirety to this area of the FIFO RAM. Each port has a local set of pointers to access this area of RAM. All ports can access this region of RAM independently under the round robin FIFO access arbitration outlined earlier. Allowing multiple (independent) access, prevents the necessity to replicate the broadcast frame for each port explicitly in the external memory buffers.

The maximum broadcast bandwidth is determined by the speed of the slowest port. Broadcast frames are not permitted to operate in cut-through mode. Broadcast frame requests are interleaved with normal frame switching to prevent multiple broadcast requests from stalling normal frame transfers for extended periods of time. During normal operation of the presently preferred circuit 200 of the present invention, the maximum broadcast bandwidth will be reduced to approximately 5 Mbps due to this interleaving. The circuit 200 will not block the inputs; all the data is written to the external buffer memory 300. Data will be discarded at the output queues, when the queues reach maximum length.

Transmission of an out-of-order broadcast frame only starts when a port becomes free (i.e. after the end of a frame previously being transmitted). To prevent broadcast frames being sent to ports which are not linked (stalling the circuit), a port's Mix LINK signal is sampled prior to the start of transmission. For each port without link, the broadcast frame is not transmitted on that port. This only occurs prior to the start of transmission not when the broadcast frame is queued.

If the address compare unit determines that the first bit of the address is set to a '1', the frame is multi-east to all the other ports of the circuit 200 (excluding the port that initiated the multi-east frame) via the broadcast channel; the broadcast address is a special case of the multi-east address.

Figure 8:
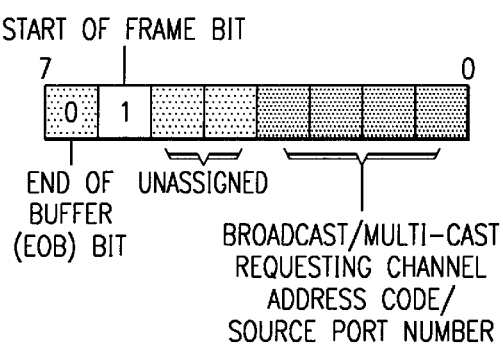
FIG. 8 shows the format for the eight bit flag byte of the circuit of FIG. 1.

To prevent echoing a multi-cast or broadcast frame back to the receiving port, the channel address on which the request was made is recorded in the flag byte. The format for the eight bit flag byte is shown in FIG. 8. More particularly, FIG. 8 depicts that the format of the flag byte depends on the state of the end of buffer (EOB) bit, which is the eighth bit. If the EOB bit is reset, the format shown in FIG. 8 is applicable, with the lowest "nibble" of four bits (bits 0–3) storing the requesting channel code information. If the EOB bit is set, the format of the flag byte changes, as noted later herein in the discussion of the 10 Mbps MAC interface.

The requesting channel code is used to clear the respective bit in the channel mask applied for the multi-cast/broadcast frame, hence the frame is not echoed to the requesting channel.

Figure 9:
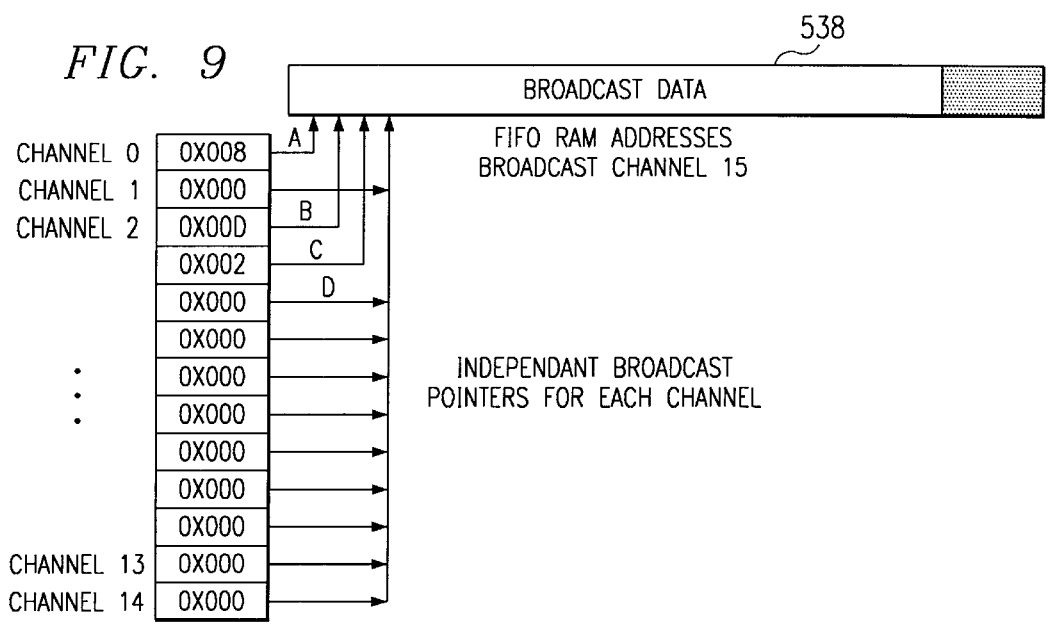
FIG. 9 is a simplified schematic diagram of the use of independent broadcast pointers A–D for each channel of the circuit of FIG. 1.

The other method for handling broadcast/multicast traffic is in order broadcast operation. This method of handling broadcast traffic is selected by setting the in order broadcast mode (IOBMOD) bit (in the system control register portion of a port's VLAN register). Unlike out of order broadcast handling, in order broadcast (IOB) handling ensures that frames which are broadcast, follow the strict order in which they were received. This cannot be guaranteed for out of order broadcast operation. Referring now to FIG. 9, there may be seen a simplified schematic diagram of the use of independent broadcast pointers A–D for each channel. Again, as depicted in FIG. 9, the channel 15 shared memory portion 538 of the internal FIFO RAM 1301 is used to store the broadcast frames.

Figure 10:
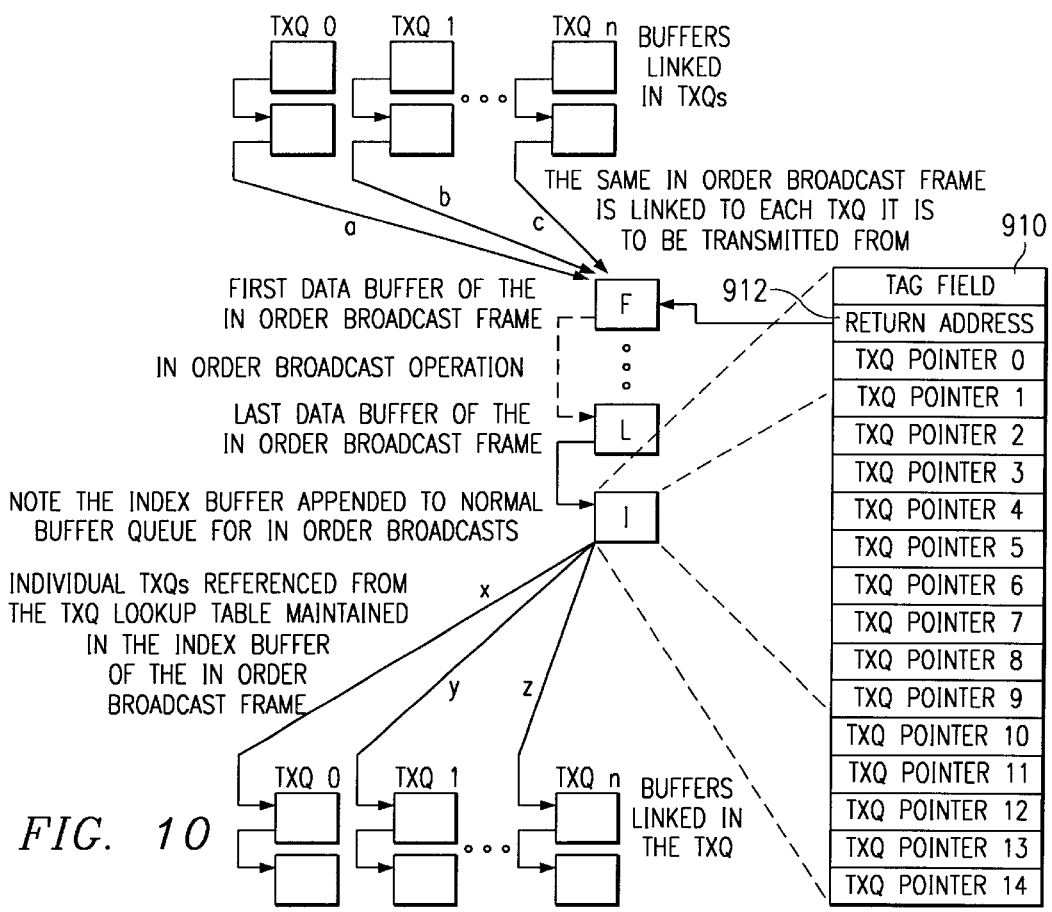
FIG. 10 is a schematic block diagram depicting the flow of broadcast frame data through the FIFO under control of the queue management block of the circuit of FIG. 1.

Referring now to FIG. 10, there may be seen a schematic block diagram depicting the flow of broadcast frame data through the FIFO 1301 under control of the queue management block 1401. More particularly, it may be seen how on data reception, when a multi-cast frame is detected in IOB mode, the reception continues as for a normal store and forward frame. The buffers comprising the received frame are linked together in the receive queues (RxQ), as depicted by buffer "F" with dotted line to buffer "L".

When the end of frame is detected an additional buffer "I" is linked to the end buffer "L" of the RxQ link. This buffer "I" is exactly similar in size to a normal data buffer but contains indexed queue information rather than frame data. To distinguish between the types of buffer, bit 23 of the forward pointer pointing to the "index" buffer I is set.

The linked RxQs "F"–"L" are then linked to the transmit queues (TxQs) on which the multi-east data is to be transmitted, as depicted by the solid lines a,b,c. The ports to which the data is sent can be defined two ways. If no external addressing logic is used, the multi-east data will be linked to all currently active ports, defined in the port bitmap held in the Virtual LAN (ULAN) register for the port on which the data was received. Alternatively the port bitmap presented on the external address interface 184 (EAM) pins will be used, the data will be linked to the active port subset of that defined on the pins.

Having determined the TxQs onto which the IOB data will be linked, the forward pointer a,b,c for each TkQ is updated to point to the head of the RxQ (IOB data). In this way, the multi-cast data buffers will appear linked on to multiple queues without the overhead of replicating the multi-cast data. The index buffer "I" is used to preserve the separate TxQs as they form following the IOB data frame. Each index buffer contains a forward pointer x,y,z referencing the continuation of the TxQ for every port. As new TxQ data is enqueued, the forward pointers in the index buffer are updated to reflect the continuation of the independent TxQs.

The IOB frame buffers can only be returned to the free buffer queue when all ports have transmitted the IOB data. Since there could be a large discrepancy between the first port completing transmission and the last (due to a long TxQ prior to the IOB data), a tag field 910 is used to record which ports have transmitted the IOB data, from the list of ports that the data was to be sent to originally. The tag field 910 is also stored in the index buffer. When the last port tag is cleared all the buffers can be returned to the free pool of buffers.

The buffers can only be freed after the last transmission, by which stage the forward pointer pointing to the head of the IOB buffers will itself have been freed. The return address field 912 of the index buffer is used to store the head address of the IOB buffers. Thus even after the last IOB transmission the head of the IOB buffers remains known. Freeing the buffers then becomes the simple matter of writing the pointer to the top of the freeQ to the last forward pointer of the IOB buffers and moving the return address into the top of the freeQ, thereby placing the used IOB buffers onto freeQ.

If a frame enters on a port whose address matches the destination address of the frame, the frame is not echoed back on that port. As a general rule, no frame is echoed back to the port it was received upon. If frame routing is being performed by an external address matching (EAM) circuit connected to the EAM interface 184, it is the system/user's responsibility to enforce this; the circuit 200 will no t enforce this.

Figure 11:
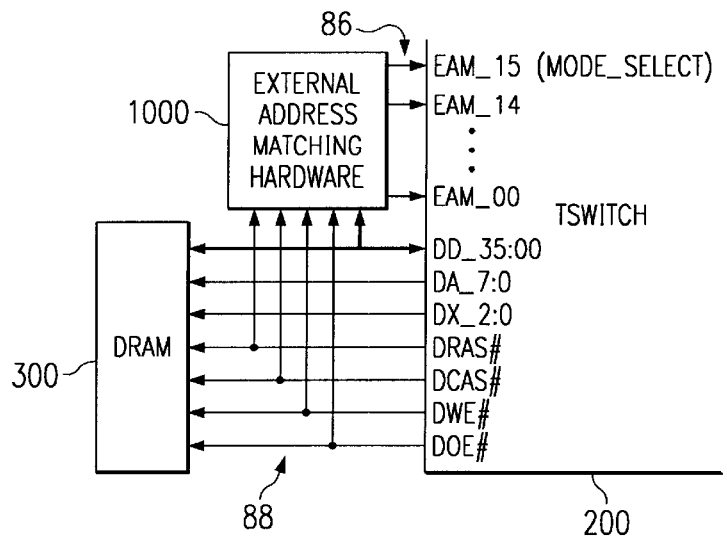
FIG. 11 depicts how all valid frames are passed across the DRAM interface from the circuit to the external memory using the DRAM bus of the circuit of FIG. 1.

As depicted in FIG. 11, all valid frames are passed across the DRAM interface 1421 from the circuit 200 to the external memory 300 using the DRAM bus 88. The external EAM circuit or hardware 10001 can detect the start of a new frame from the flag byte information. That is, the first flag nibble on the DRAM data bus 88 (DD bits 35:32) correspond to bits 7:4 of the frame flag. In conjunction with the DRAM column address strobe (DCAS), external EAM logic 10001 can access the frame addresses and perform external address look up.

The external EAM logic 10001 may use the row address strobe DRAS# and column address strobe DCAS# to identify the position of the forward pointer, the top nibble of the flag byte and whether the nibble contains the start of frame code 01XX. For example, bit 35 of the forward pointer should be zero if denoting a start of frame. If it is high the frame is an IOB link buffer and not the start of data frame (bits 34, 33, 32 contain parity information for the 3 forward pointer data bytes). Bits 28 thru 24 of the forward pointer will denote the active channel code. Bit 28 denotes TX (1) or RX (0). Bits 27 thru 24 denote the active port number Port 00=0000 Port 01=0001 etc.

The external EAM logic 10001 may also use the DRAM column address select to identify the presence of destination and source address data on the DRAM interface 1421 and then perform appropriate address processing. The external EAM logic 10001 may then provide the destination channel bit map 12 memory cycles after the high nibble of the start flag is transmitted on the DRAM interface 1421. These activities are described more fully later herein in reference to the external address compare logic of the present invention. FIG. 11 depicts the interconnection of external address matching hardware 10001 (address compare logic or EAM logic) with the circuit 200 and its associated external DRAM 300. For FIG. 11 and the discussion herein any signal that ends with a "#" is an active low signal. As may be seen from FIG. 11, the EAM hardware block 10001 is interconnected to the DRAM bus 88 and its associated control signals, as well as the EAM bus 86 of the circuit 200.

The circuit 200 will use the external channel address in priority over the internal channel address match information, to route the frame to the appropriate channel. To disable the EAM interface 184, a 'no-op' code should be used.

If there is no external EAM hardware 10001 present the 'no-op' code should be hardwired onto the EAM interface 184. The 'no-op' code causes the internal destination selection to be used.

Table 1 below provides the 4 bit code needed to identify the destination port when using the EAM interface 184 with EAM-15 (MODE SELECT) bit set.

When the EAM-04 bit is set and the EAM-15 bit (MODE SELECT) is set, all other EAM bits will be ignored (this is the "no-op" code); the frame will use the internal address match information. When the EAM-04 is reset then the four EAM-03:00 bits will be used to identify a single destination port or broadcast queue.

To discard a frame the external interface 184 should provide a no-match code and all internal address registers should be disabled with the address disable bit (port control register bit 3).

TABLE 1

External Address Match Port Codes

| Port | EAM-15 MODE SELECT | EAM-04 'no-match' | EAM 03:00 |
|---|---|---|---|
| Port 0 u link | 1 | 0 | 0000 |
| Port 1 10/100 Mbit | 1 | 0 | 0001 |
| Port 2 10/100 Mbit | 0 | 0010 | |
| Port 3 10 Mbit | 1 | 0 | 0011 |
| Port 4 10 Mbit | 1 | 0 | 0100 |
| Port 5 10 Mbit | 1 | 0 | 0101 |
| Port 6 10 Mbit | 1 | 0 | 0110 |
| Port 7 10 Mbit | 1 | 0 | 0111 |
| Port 8 10 Mbit | 1 | 0 | 1000 |
| Port 9 10 Mbit | 1 | 0 | 1001 |
| Port 10 10 Mbit | 1 | 0 | 1010 |
| Port 11 10 Mbit | 1 | 0 | 1011 |
| Port 12 10 Mbit | 1 | 0 | 1100 |
| Port 13 10 Mbit | 1 | 0 | 1101 |
| Port 14 10 Mbit | 1 | 0 | 1110 |
| Broadcast channel (Out of Order Broadcast) | 1 | 0 | 1111 |
| No-O | 1 | 1 | XXXX |
| Bitmap mode | 0 | EAM(14:0) = portdestinationbitmap I | |

When the EAM-15 bit (MODE SELECT) is reset (0), the EAM-14:00 inputs, provide a mechanism for the EAM interface to specify which destination port or group of destination ports will be used to transmit the frame. Each signal represents one destination port, asserting just one signal will send the frame to one destination port, asserting more than one signal will send the same frame to multiple ports. This allows the EAM interface to limit the broadcast/ multi-cast trafc within a virtual LAN. By "virtual Lan" (ULAN) it is meant that portion or subset of the many nodes connected to network that form a smaller "virtual" LAN so that messages maybe sent to only those nodes that are part of the virtual LAN, rather than the entire network and thereby avoid unnecessary traffic congestion. This mode of operation employs the IOB mechanism to append the frames onto the transmit queues of the ports the frame is to be transmitted from. However, the IOB mechanism is an inefficient way to send frames to single ports; when possible individual port codes should be used for this task.

Figure 12:
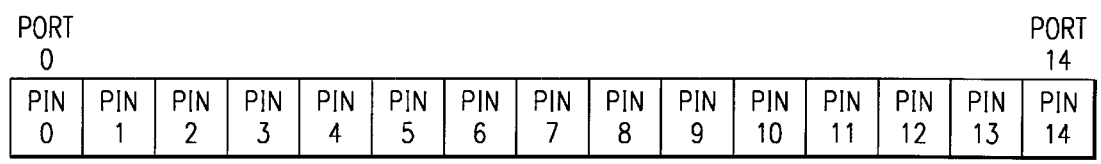
FIG. 12 depicts the external address match interface information for ports 0 to port 14 of the circuit of FIG. 1.

For the single address per port mode, the circuit 200 provides a ULAN register per port. Each register contains a bit map to indicate the VLAN group for the port. All broadcast/multi-cast traffic received on that port is then only sent to the ports that are a part of the same ULAN. FIG. 12 depicts the external address match interface information for ports 0 to port 14. More particularly, it may be seen that each pin number corresponds to its numeric port number, and as noted earlier herein, asserting a signal on a pin results in the frame/traffic being transmitted on the port number corresponding to that pin number with a signal on it.

Figure 13:
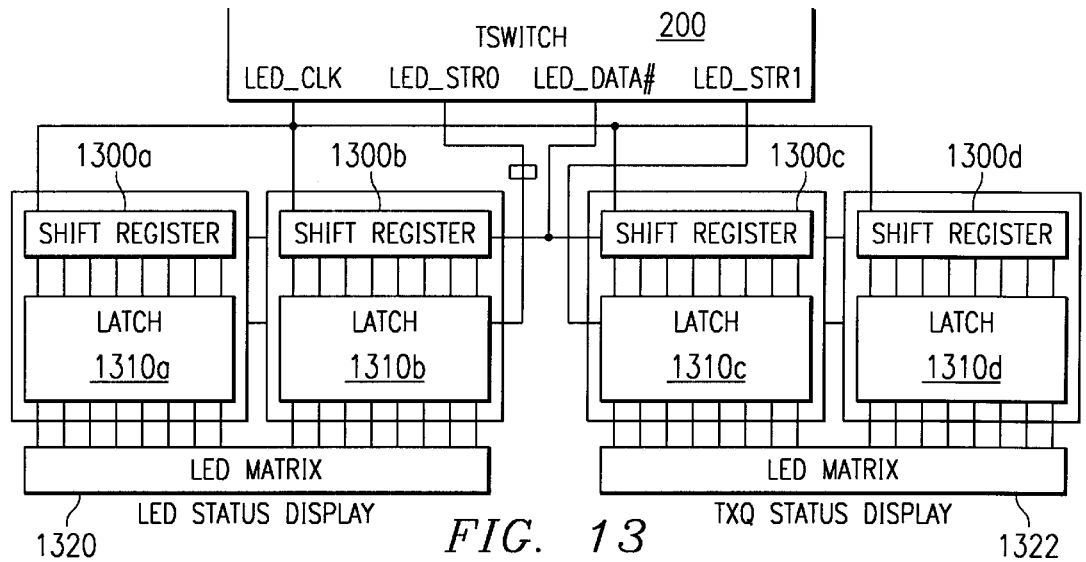
FIG. 13 is a schematic block diagram of the interconnection of external circuitry with selected signals of the circuit to provide visual status of the circuit of FIG. 1.

The circuit 200 includes an LED interface 1801 allowing a visual status for each port to be displayed. FIG. 13 depicts a schematic block diagram of the interconnection of external circuitry with selected signals of the circuit 200 to provide this visual status. More particularly, as seen in FIG. 13, the data supplied by the circuit 200 is multiplexed between port status (LED status display) 1320 and TxQ congestion (TxQ status display) 1322 information. The data type is determined by the two strobe signals (LED STRO and LED STRI). As depicted in FIG. 13, port status information is latched on the LED STRO signal, while Transmit Q congestion information is latched on the LED_STR1 signal.

The LED port status output 1320 will be driven low when the port state is "suspended" or "disabled", except where the suspension is caused by a link loss.

During normal operation the output will be high. The TxQ congestion status 1322 will be driven low when the TxQ length has become negative for a port (indicating no further frames can be queued). For uncongested operation the latched output will be high. The LED DATA# signal is active low since TTL is more efficient at driving low than high.

Whenever a change is detected in the port status or TxQ congestion status, the LED interface 1801 will update the LED data. Although sixteen bits of status are shifted out serially into a shift register 1300 at each update, as described later herein, the sixteenth bit is reserved. The LED STRO or LED STR1 signal is pulsed once upon completion of the shift, to latch the data in the shift register 1300 into a latch 1310. The latch is then used to drive an LED matrix 1320,1322 which provides the requisite visual status of the ports.

As shown in FIG. 1, a flash EEPROM interface 801 is provided on the circuit 200 to allow for pre-configuring a system; alternatively, this EEPROM interface 801 allows the system to be changed or reconfigured and such preferences retained between any system power downs. The flash EEPROM 350 contains configuration and initialization information which is accessed infrequently; that is, information which is typically accessed only at power up and reset.

Figure 14:
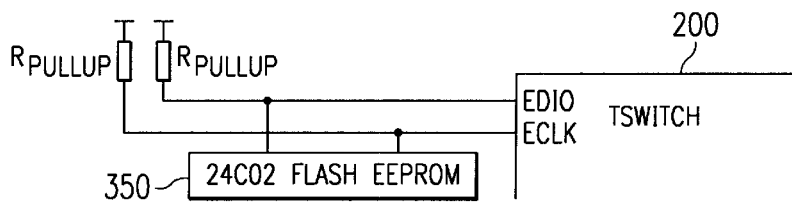
FIG. 14 depicts the interconnection of an EEPROM device to the circuit of FIG. 1.

The circuit 200 preferably uses an industry standard 24C02 serial EEPROM device (2048 bits organized as 256×8). This device uses a two wire serial interface 801 for communication and is available in a small footprint package. Larger capacity devices are available in the same device family, should it be necessary to record more information. FIG. 14 depicts the interconnection of such an EEPROM device 350 to the circuit 200, and associated pull-up resistors.

The EEPROM 350 may be programmed in one of two ways. It may be programmed via the DIO/host interface 1701 using suitable driver software. Alternatively, it may be programmed directly without need for any circuit interaction by use of suitable external memory programming hardware and an appropriate host interface.

The organization of the EEPROM data is in the same format as the circuit's internal registers, preferably at addresses 0x00 thru OXC3, which are described later herein. This allows a complete initialization of circuit 200 to be performed by down loading the contents of the EEPROM into the circuit 200. During the download, no DIO operations are permitted. The download bit cannot be set during a download, preventing a download loop. The download bit is reset after completion of the download.

The circuit 200 auto-detects the presence or absence of the EEPROM 350. If it is not installed the EDIO pin should be tied low. As depicted in FIG. 14, for EEPROM operation the pin will require an external pull up. When no EEPROM is detected the circuit 200 assumes default modes of operation at power and downloading of configuration from the EEPROM pins will be disabled. The signal timing information for the EEPROM interface 801 is discussed later herein.

As shown in FIG. 1, the DIO interface (Direct Input Output) 120 allows a host CPU to access the circuit. The DIO interface 1701 provides a system/user and a test engineer with access to the on-chip registers and statistics. The test engineer is interested in quickly configuring and setting the circuiVs registers to minimize testing time. The system/ user is interested in monitoring the device using a host and tailoring the device's operations based on this monitoring activity.

The DIO port 1701 provides a host CPU 6001 with access to network statistics information that is compiled and stored in the statistics RAM. The DIO port 1701 allows for setting or changing operation of the circuit. The DID port also provides access to port 1701 control, port status and port address registers permitting port management and status interrogation. The DIO port 1701 also allows for test access, allowing functional testing.

Figure 15:
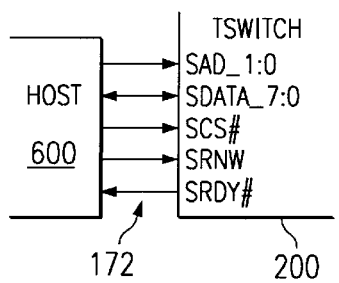
FIG. 15 is a simplified block diagram illustrating the interconnection of DIO port signals with a host for the circuit of FIG. 1.

Referring now to FIG. 15, there may be seen a simplified block diagram illustrating the interconnection of DIO port signals 172 with a host 6001. To reduce design overheads and to simplify any interfacing logic, a byte wide asynchronous bi-directional data interface (SDATA 7:0) is utilized by the circuit 200, as illustrated in FIG. 15. The host 6001 synchronizes the interface signals.

Access to the internal registers of the circuit 200 is available, indirectly, via the four host registers that are contained in the circuit 200. The details of this access is provided later herein, but the access is similar to that depicted in FIG. 92. Table 2 below identifies these four host registers and the signal combinations of SAD-1 and SAD-0 for accessing them.

TABLE 2

| SAD_1 | SAD U | Host Register |
|---|---|---|
| 0 | 0 | DIO_ADR_LO |
| 0 | 1 | DIO_ADR_HI |
| 1 | 0 | DIO_DATA |
| 1 | 1 | DIO DATA INC |

More particularly, the four host registers are addressed directly from the DIO interface 1701 via the address lines SAD-1 and SAD 0. Data can be read or written to the address registers using the data lines SDATA 7:0, under the control of Chip Select (SCS#), Read Not Write (SRNW) and Ready (SRDY#) signals.

The queue manager unit 1401 performs a number of functions or tasks. At the top level is provides the control for the transfer of data between the DRAM memory 300 and the FIFOs 1301. The queue manager 1401 uses an internal 64 bit memory to maintain the status of all the queues. The queue manager 1401 is preferably implemented as a hardware state machine. That is, the queue manager state machine is preferably sequential logic configured to realize the functions described herein. The queue manager 1401 uses three queues to transfer data between the DRAM memory 300 and the FIFOs 1301. The three queues are associated with each port and are the receive queue (RxQ), the transmit queue (TxQ) for store and forward operation, and the immediate queue (InQ) for cut through operation.

Figure 16:
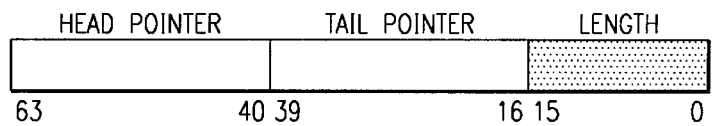
FIG. 16 depicts the format of the internal registers used by the queue manager to maintain the status of all the queues in external or buffer memory for the circuit of FIG. 1.

FIG. 16 depicts the format of the internal registers used by the queue manager 1401 to maintain the status of all the queues in external or buffer memory. As depicted in FIG. 16, the head pointer of 24 bits records the starting address of the queue in the external or buffer memory. The tail pointer of 24 bits records the last (or the tail) address of the queue. For transmits (Tx) the length field of 16 bits is a residual length indication and provides an indication of how many buffers are available to the queue. As described more fully later herein, the number of buffers allocated to a queue at initialization is dependent upon the size and the configuration of the external memory; this information can be stored in an EEPROM connected to the EEPROM interface or written to the registers directly. For receives (Rx) the length recorded is the absolute number of buffers enqueued.

The receive queue (RxQ) collates buffer data for frames that can not be cut-through to the destination port. All the frame data to be switched is collated on the appropriate RxQ. It is t hen concatenated to the end of the destination TxQ. Concatenation entails placing the head pointer of the RxQ in the forward pointer of the last buffer in the TxQ. The length of the RxQ (number of buffers used) is subtracted from the number of free TxQ buffers available. The tail pointer of the Rx data becomes the new tail pointer for the TxQ. There is one RxQ for every channel. If the destination port becomes idle and the frame collated on the RxQ can be cut through, the RxQ will be written to the IMQ for transmission.

The transmit queue (TxQ) stores complete frames that are ready for transmission. Once placed on the transmission queue the data will be transmitted; the Tx queues are not stalled pending the completion of receive data. The queues will only be stalled if transmission can not occur. There is one TxQ for every channel.

The immediate queue (ImQ) collates cutthrough mode buffer information. If there is data enqueued to the ImQ and the destination port is available, the data will be transmitted. New frame data will only be placed onto the immediate queue if (a) the data can cut-through from source to destination, (b) the transmitter is currently idle on the destination port, and (c) there is no existing frame transfer occurring on either TxQ or im.Q.

If the number of buffers, in the buffer pool becomes less than or equal to zero, no further data will be accepted. Rx frame data will be discarded until the free queue contains free buffers again. Additionally individual queues can overflow, in particular the TxQ. The TxQ length is recorded as a residual figure (i.e., number of buffers remaining, rather than number of buffers queued). If this becomes negative, no further frame data will be queued and frames will be discarded.

Figure 17:
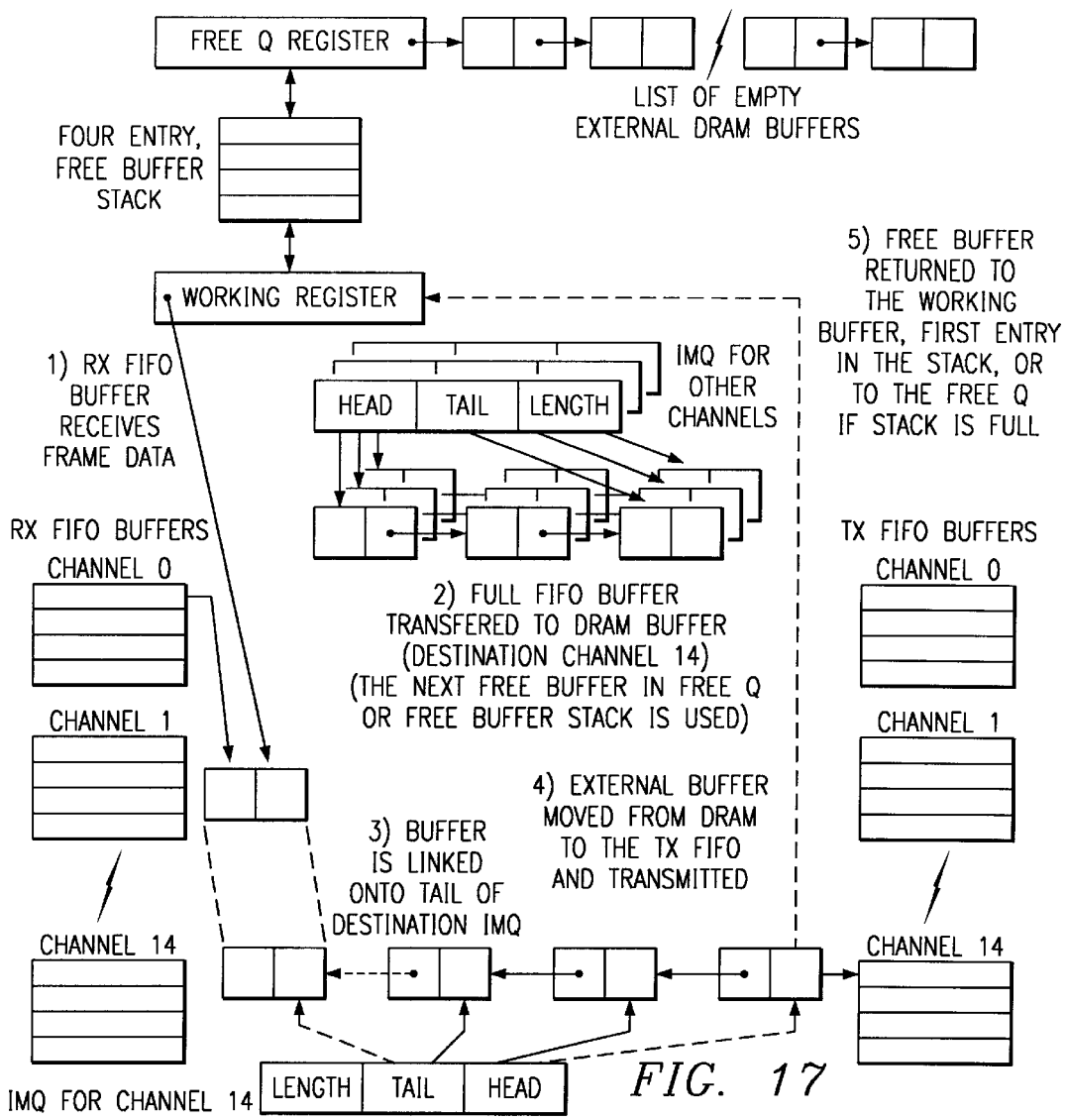
FIG. 17 is a schematic diagram depicting the steps the queue manager performs for a cut-through operation for the circuit of FIG. 1.

Referring now to FIG. 17, there may be seen a schematic diagram depicting the steps the queue manager 1401 performs for a cut-through operation. More particularly, it may be seen that initially a Rx FIFO buffer receives frame data. After a full frame of FIFO buffer of data is accumulated the data is transferred to an external memory buffer and is designated for transmission by channel 14; the external buffer used to store the data is the next free buffer in the free Q or the free buffer stack. The buffer is then linked onto the tail of channel 14's IMQ; the IMQ for channel 14 has its tail pointer modified to reflect the addition of this buffer to the list of IMQ buffers. After the data in a buffer on top of the channel 14 IMQ buffer list is transferred to a channel 14 Tx FIFO buffer, the head pointer is modified and buffer on top is returned to the working register, free buffer stack, or free Q if the stack is fall. Once the Tx FIFO buffer is loaded, the data is transmitted by channel 14.

Figure 18:
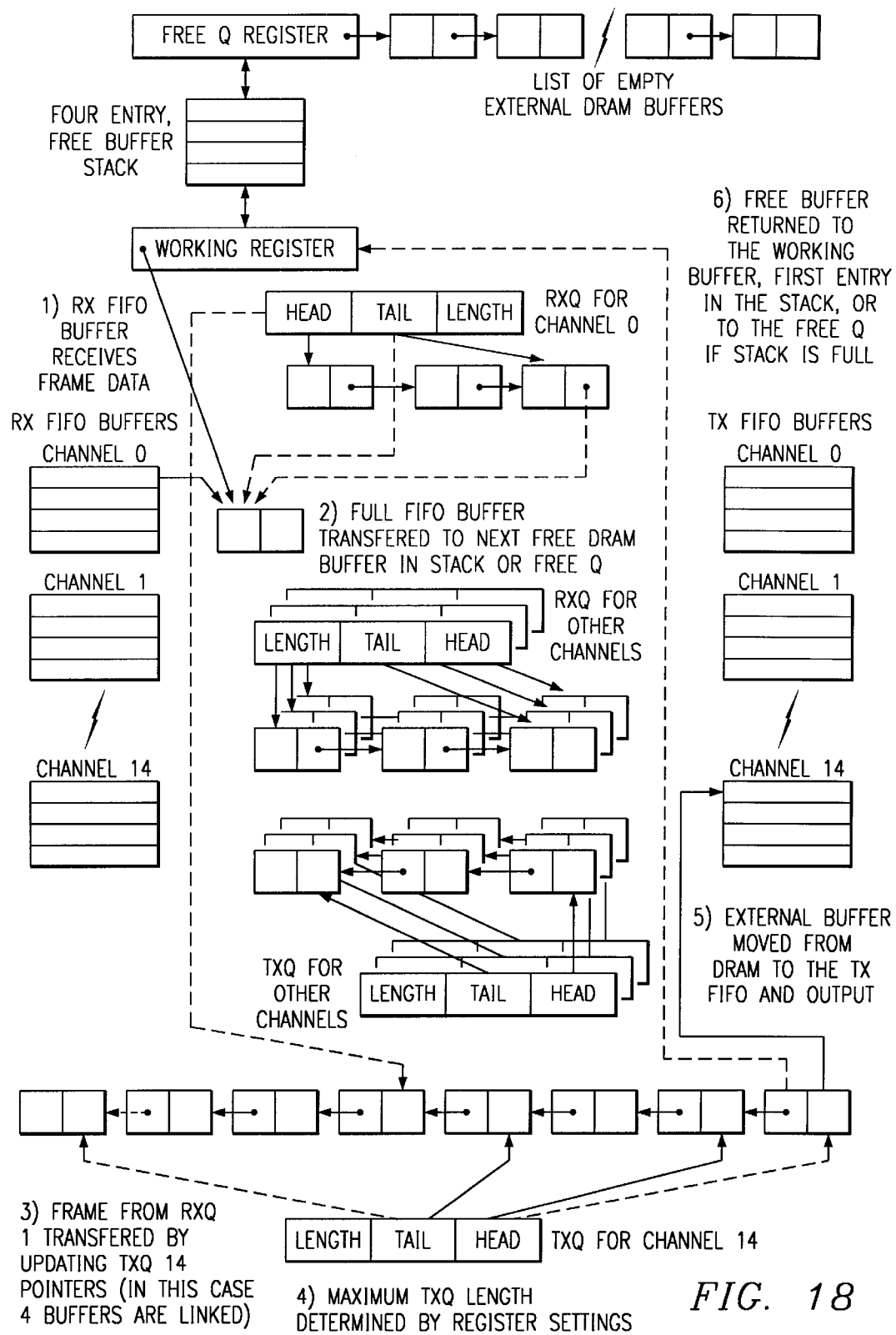
FIG. 18 is a schematic diagram depicting the steps the queue manager performs for a store and forward operation for the circuit of FIG. 1.

Referring now to FIG. 18, there may be seen a schematic diagram depicting the steps the queue manager performs for a store and forward operation. More particularly, it may be seen that initially a Rx FIFO buffer for channel 0 receives frame data. After a full frame of FIFO buffer of data is accumulated the data is transferred to an external memory 300 buffer and is designated for the receive Q (RxQ) for channel 0; the external buffer used to store the data is the next free buffer in the free Q or the free buffer stack. The buffer is then linked onto the tail of channel 0's RxQ; the RxQ for channel 0 has its tail pointer modified to reflect the addition of this buffer to its list of RxQ buffers.

The four buffers in channel 0's RxQ are designated for channel 14 to transmit. So the head of the four buffer chain is added to the tail of channel 14's existing TxQ and the end of the four buffer chain becomes the new tail pointer; this assumes the maximum length TxQ of channel 14 is not exceeded as determined by various internal register settings. After the data in a buffer on top of the channel 14 TxQ buffer list is transferred to a channel 14 Tx FIFO buffer, the head pointer is modified and buffer on top is returned to the working register, free buffer stack, or free Q if the stack is full. The length of the TxQ of channel 14 is modified to reflect the removal of this buffer. Once the Tx FIFO buffer is loaded, the data is transmitted by channel 14.

Figure 19:
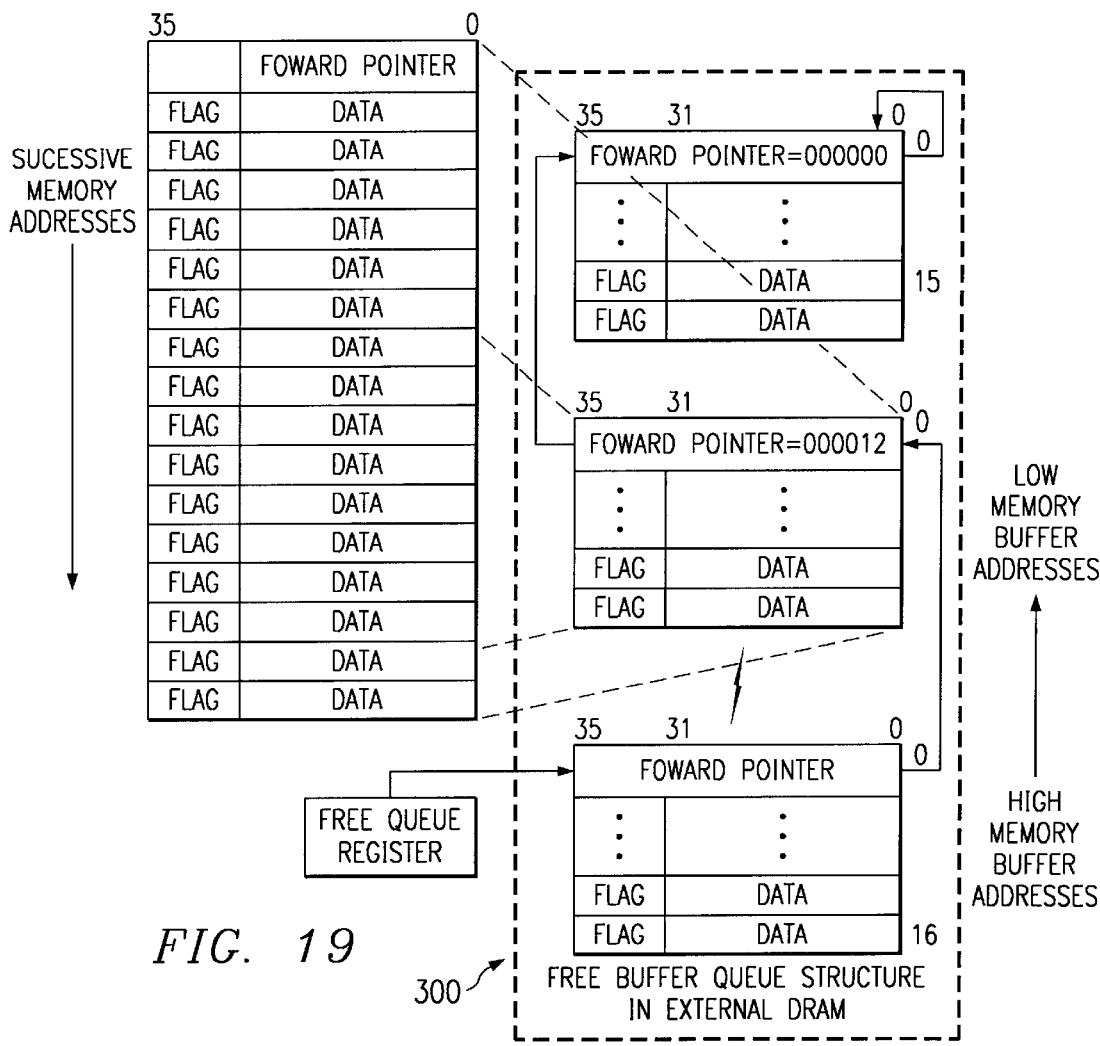
FIG. 19 is a schematic diagram of the arrangement of the buffers in the external memory and the arrangement of the interior of a representative buffer for the circuit of FIG. 1.

Referring now to FIG. 19, there may be seen a schematic diagram of the arrangement of the buffers in the external memory 300 and the arrangement of the interior of a representative buffer. Each buffer is capable of holding the complete contents of one of the internal FIFO buffers (which corresponds to the minimum size Ethernet frame). The buffers are aligned to fit within a page of the external memory. No buffer crosses a page boundary; this allows for consistent access times to be attained at the expense of a small amount of unused memory. The external memory 300, organized in this way, permits fast data bursts between the internal FIFO 1301 and external memory 300. This reduces the amount of intermediate data management that is needed and in turn increases the internal bandwidth.

At initialization, the circuit 200 loads the configuration information from the EEPROM 350 (if present) or uses its reset values to set the length field for each of the queues, unless initialized by DID access. This fixes the maximum number of buffers that a port can use for transmit queues. As buffers are used by these queues the length field is adjusted to indicate the number of buffers that are still allocated for use by that particular queue.

The total number of buffers available to the circuit is determined by the size of the external memory 300. The RSIZE (RAM Size) field of the RAM size register (which is a portion of the ULAN register map), is loaded from the EEPROM 350 or from the DIO interface 1701 with the appropriate system ram code. The circuit 200 uses this sizing information to modify the DRAM addressing limit when initializing the data buffer structures in the external memory 300. The external memory (DRAM) 300, as depicted in FIG. 19, is initialized to contain a single list of data buffers (free buffer queue) available to all queues. Each buffer is preferably 76.5 bytes in size; the least significant byte of the DRAM address is incremented in steps of 17. During initialization, normal circuit operation is disabled. Once the buffer structure has been created in the DRAM, no further use is made of the sizing information.

The queue size for the transmit queues can be increased by adding a two's compliment number (representing the number of buffers that need to be added to the queue) to the TxQ length field. Reducing the number of buffers allocated to the ports is done in the same way by adding a negative length field. The length is updated after the transmission of a buffer. The update bit is cleared once the update has occurred.

There is no checking between the number of free buffers physically available in memory and the number of buffers allocated to each queue. It is possible to oversubscribe the memory between the queues. If a frame is being buffered when the buffer ceiling is reached, all buffers constituting that incomplete queue of buffers will be purged and replaced on the free buffer stack or queue. Thus, when memory is limited, large frames will be inherently 'filtered' in favor of smaller frames. When all buffers are subscribed and none are available for use, the circuit will accept no new frames, but will wait for buffers to be freed before continuing.

Figure 67:
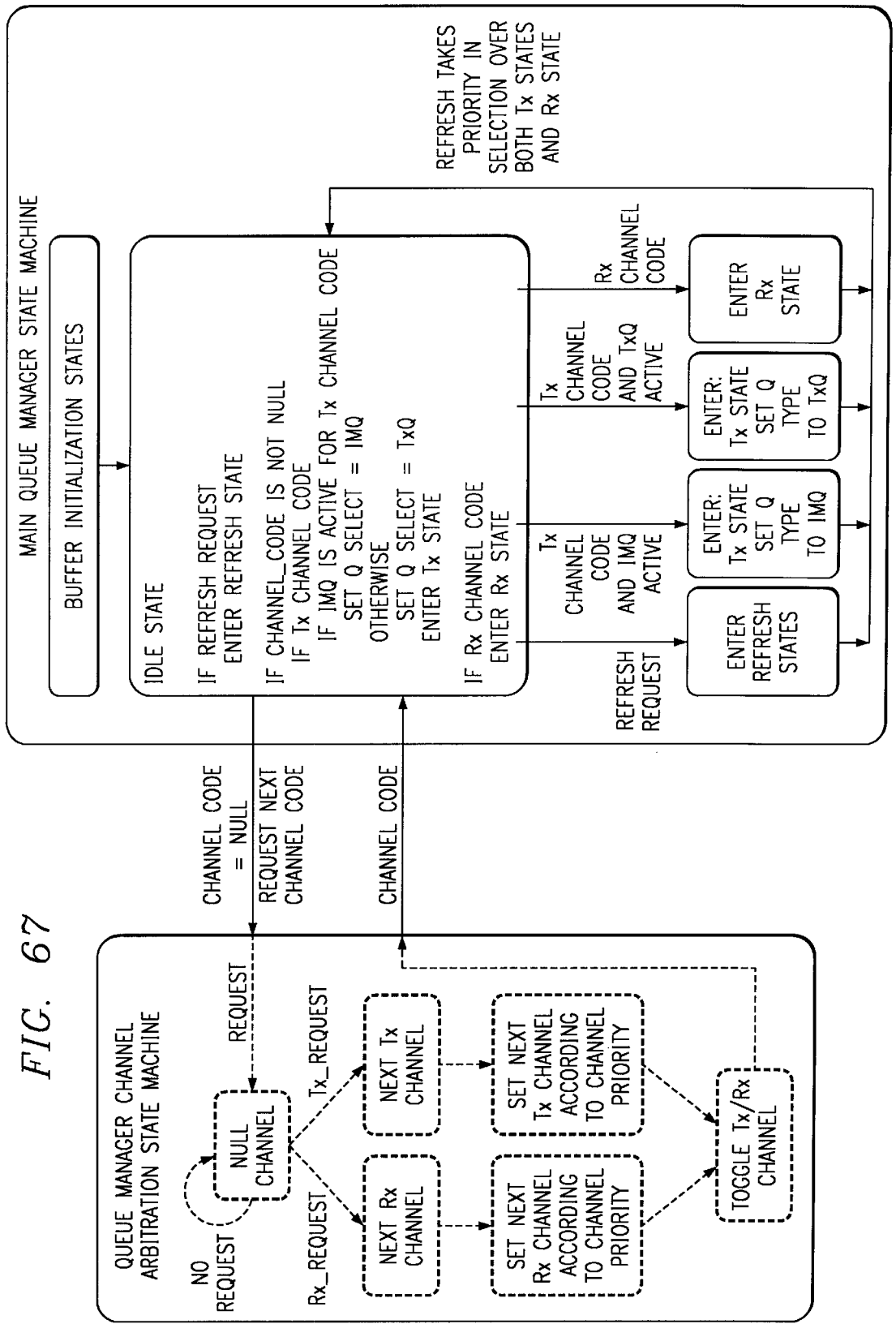
FIG. 67 is a simplified flow diagram illustrating the major states of the queue manager (QM) state machine for the circuit of FIG. 1.

Referring now to FIG. 67, there may be seen a simplified flow diagram illustrating the major states of the main queue manager state machine 14011, its interconnection with the queue manager channel arbitration state machine 14012, and the main states of the queue manager channel arbitration state machine 14012. More particularly, it may be seen that the queue manager channel arbitration state machine 14012 is a state machine that implements the QM portion of the multi-level access sequencing scheme discussed earlier with respect to FIG. 3. There is a corresponding hardware state machine for the MAC portion of FIG. 3 that is depicted on the left-hand side of FIG. 31. The MAC state machine depicted in FIG. 31 is a much simpler state machine, as it does not have changing priorities; when inactive transmits are canceled, their time slot is left in place and not used.

Continuing to refer to FIG. 67, it may be seen that the Main Queue Manager State Machine 14011 sends a request next channel code to the Que Manager Arbitration State Machine 14012. This request comes into a portion of the Queue Manager Channel Arbitration State Machine 14012 that is identified as the null channel block. More particularly, the null channel block returns a channel code of null when there is no request and has a loop to keep looping back on itself when there is no request present.

When a request comes in, the null channel block determines whether the next request should be a receive request (Rx_request) or a transmit request (Tx_request). Both of these requests then go to a block that is either the next receive or transmit channel. This block determines which channel is next in sequence according to the sequencing scheme. of FIG. 3. The output from the blocks for the next channel goes into two parallel blocks for the receive and transmit sides that deal with setting the channel according to the channel priority. The output from these blocks are then fed to a toggle either transmit or receive channel block which then outputs the channel code to the Main Queue Manager State Machine 14011.

The Main Queue Manager State Machine 14011 is first initialized in the buffer initialization state. The details of the activities that occur in this block are further described in FIG. 68. In essence, this block is directed to setting up the chain of buffers in the external memory 300. This block looks at things like RAM size to determine how many blocks of queues should be set up in the external memory 300. After the external memory 300 has been initialized, the queue manager state machine passes into an idle state.

While in the idle state, the Main Queue Manager State Maching 14011 determines if it has a refresh request pending. If it does, it then enters the refresh state. This is depicted by the enter refresh states block which is entered by the arrow between the idle state and this enter refresh states block. The refresh request comes from a timer that starts at some preselected value and counts down and when it gets to zero generates the refresh request. Upon generation of the request, the Main Queue Manager State Machine 14011 then enters the refresh state and performs the CAS before RAS on a portion of the external memory 300 to maintain it in a refreshed state. In addition, the address where this refresh takes place is incremented so that the refresh occurs in different portions of memory, but covers all of the memory locations within the specified refresh time.

The Main Queue Manager State Machine 14011 then looks at the channel code and determines if it is a receive or transmit code. If it is a receive channel code it enters the receive (Rx) state. This is depicted by the arrow from the idle state block to the enter receive (Rx) state block. The enter receive state block is more completely described in FIGS. 69 and 72. If a transmit channel code has been provided, then the Main Queue Manager State Machine 14011 determines if the intermediate queue (IMQ) is active for that transmit channel code. It sets the queue (Q) select to the immediate queue (IMQ) if the immediate queue (IMQ) is active for that transmit channel. Otherwise, the queue (Q) select is set to TxQ and the Main Queue Manager State Machine 14011 then enters the transmit (Tx) state. There are two arrows from the out of state machine shifts to one of the enter transmit (Tx) state blocks with one transmit state corresponding to the (TxQ) and the other transmit (Tx) state block corresponding to the immediate queue (IMQ. After completing the activities with either the refresh state block or the transmit (Tx) state blocks or the receive (Rx) state blocks, there is a return back to the idle state. The idle state then again loops through the various steps described herein above. As noted in FIG. 67, refresh takes priority in selection over both of the transmit states and the receive state. If there is a pending refresh request, then that refresh request will occur before anything else occurs and the transmit or receive states are merely pushed back in time.

Figure 68:
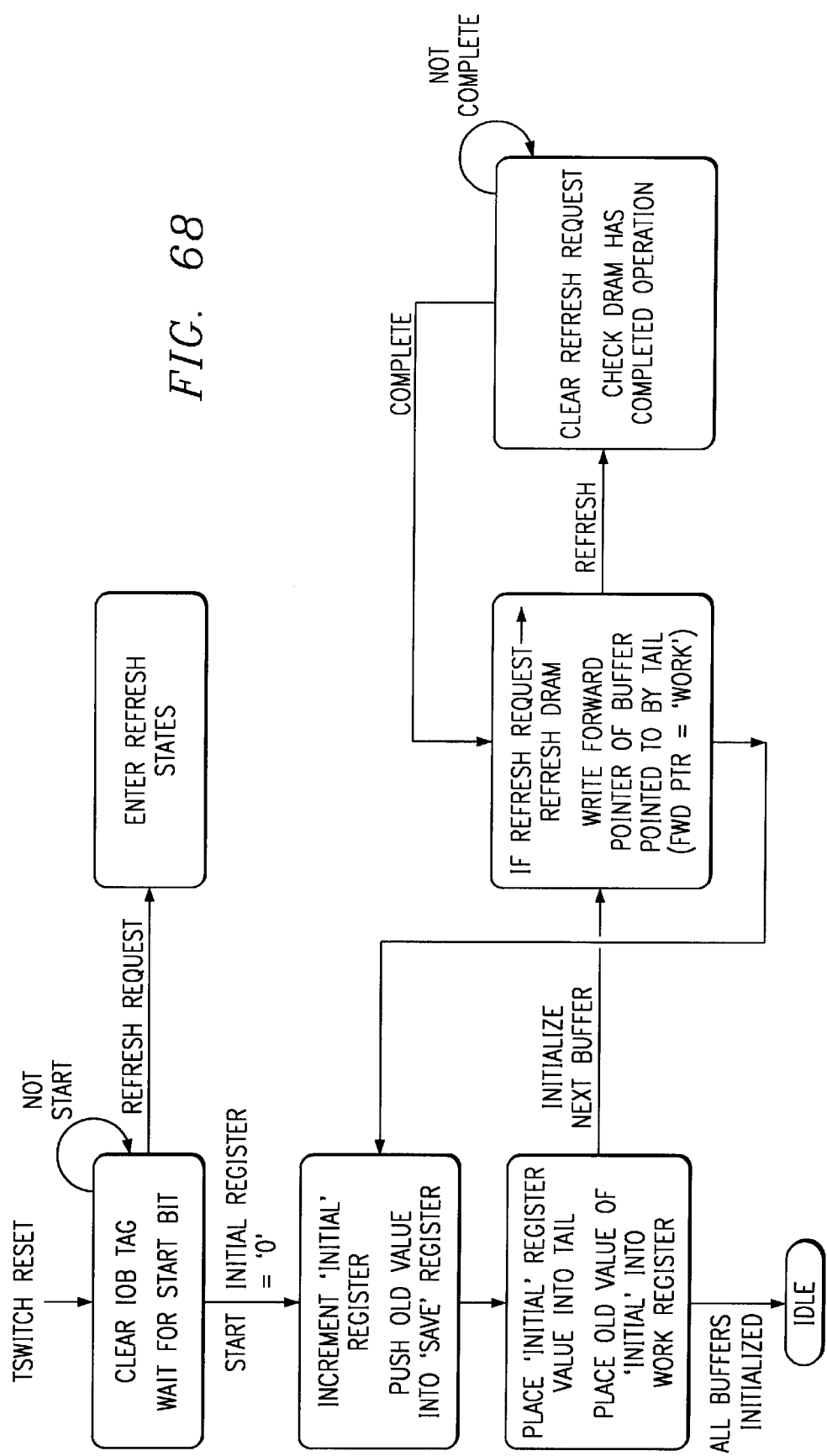
FIG. 68 depicts the details of the buffer initialization state for the circuit of FIG. 67.

Referring now to FIG. 68, there may be seen more detail of the buffer initialization state portion of the Main Queue Manager State Machine 14011 depicted in FIG. 67. More particularly, it may be seen that when the circuit 200 is reset the initial block is the clear IOB tag, which is the in order buffer tag, and then waits for a start bit. If the start bit is not seen, then it loops in the not start loop. While in this block, if a refresh is requested, then the Main Queue Manager State Machine 14011 enters the refresh states and refreshes a portion of the external memory 300. After the refresh is completed the Main Queue Manager State Machine 14011 returns to the clear IOB tag wait for start bit block until the start bit is reset.

After the start bit is reset, the Main Queue Manager State Machine 14011 moves to the next block, which is the increment initial register and push old value into save register. This process is the start of the initialization of the buffer chain in the external memory 300. The Main Queue Manager State Machine 14011 then proceeds to the next block which is to place the initial register value into the tail and place the old value of the initial register into the work register. In this manner, the Main Queue Manager State Maching 14011 starts at the zeroth address and increments up the length of a buffer and then takes the value of the top of that buffer and places it in the save register as the end of that buffer. It then increments up to the bottom of the next buffer and puts a tail pointer which points from the bottom of this new buffer back to the top of the initial buffer. It continues to increment through the initialize next buffer step and goes into the refresh request or write forward pointer buffer pointed to by tail block. If the refresh request is noted, it enters refresh and clears the refresh request and checks that the DRAM has completed its operation. If it is not completed it loops back; once completed it goes back into the write forward pointer of buffer pointed to by the tail block. After this is completed, it goes back to the increment initial register and push the old value into save register and continues to loop like this until all the buffers are initialized.

This again is a function of the RAM size which is the size of the external memory 300. Initially, the all buffers initialize portion is checked by counting cycles, but at some preselected point it then shifts to looking at the addresses to see whether the address has reached the limit of the RAM size. After all the buffers are initialized, the state machine then passes back into the idle state which is again depicted in FIG. 67.

Figure 69:
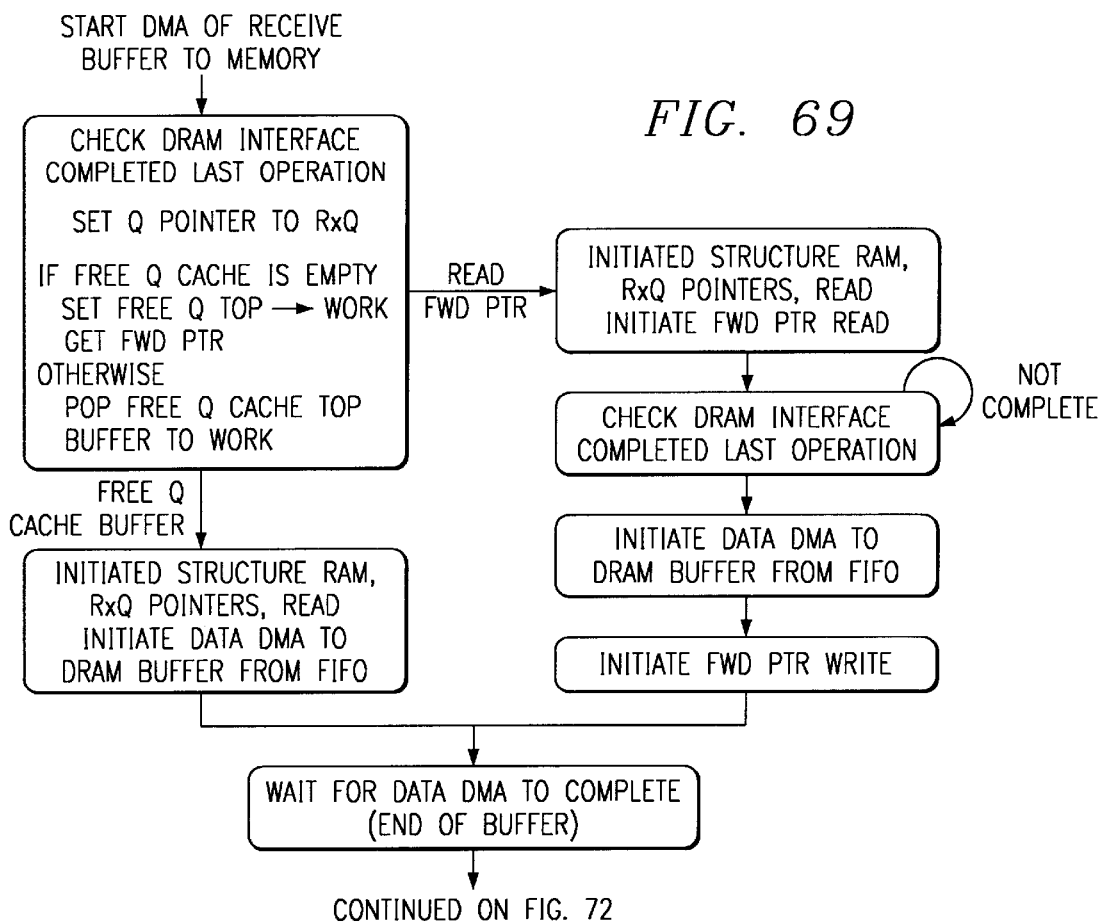
FIG. 69 shows a portion of the queue manager state machine associated with the receive state for the circuit of FIG. 1.

Referring now to FIG. 69, there may be seen a portion of the queue manager state machine associated with the receive state. More particularly, it may be seen that the initial state checks to see if the DMA of the receive buffer to memory is started. That is, it checks to see if the receive FIFO 1301 has been transferred to external memory 300. It checks the DRAM interface 1421 to ensure that it has completed the last operation associated with this data transfer. After this is completed it then sets the queue pointer to the receive queue (RxQ). It then looks to see if the free Q cache is empty. If so, it sets the free Q top to the work register and gets the forward pointer. Otherwise, it pops the free Q cache top buffer to the work buffer. In the next block it reads the receive queue pointers and initiates a data DMA to the memory buffer 300 from a FIFO 1301. Upon completion of this, it then passes down to the next state which is wait for the data DMA to complete and that is associated with an end of buffer flag. That then completes this block and the remainder of the receive state that is continued on FIG. 72. However, in the initial block after the Main Queue Manager State Machine 14011 has obtained a forward pointer it reads the forward pointer and shifts to another block which is to read the receive queue pointers and initiate a forward pointer read. It then passes to the next block which is to check that the DRAM interface 1421 has completed its last operation and loops back on itself if the DRAM interface 1421 has not completed these operations. It then passes to the next state which is to initiate a data DMA to the DRAM buffer 300 from the FIFO 1301. After this is completed, it then passes to the next state where it initiates a forward pointer write. After completing this it then passes to the same state earlier noted, which is the wait for DMA data to complete, i.e. the end of buffer state (the remainder of the receive state is continued on FIG. 72).

Figure 70:
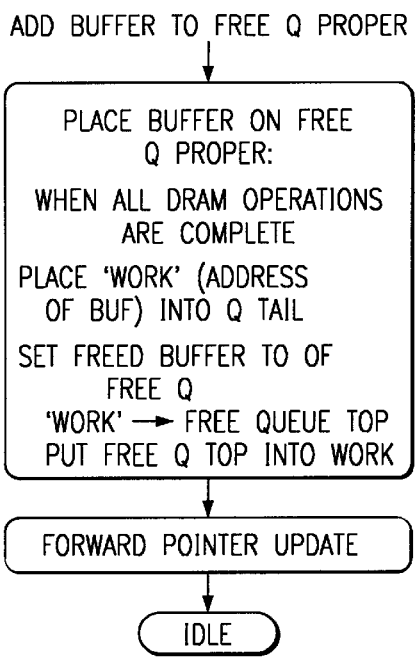
FIG. 70 depicts a more detailed portion of FIG. 72.
Figure 71:
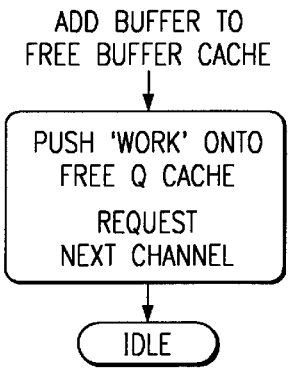
FIG. 71 depicts a more detailed portion of FIG. 72.
Figure 72:
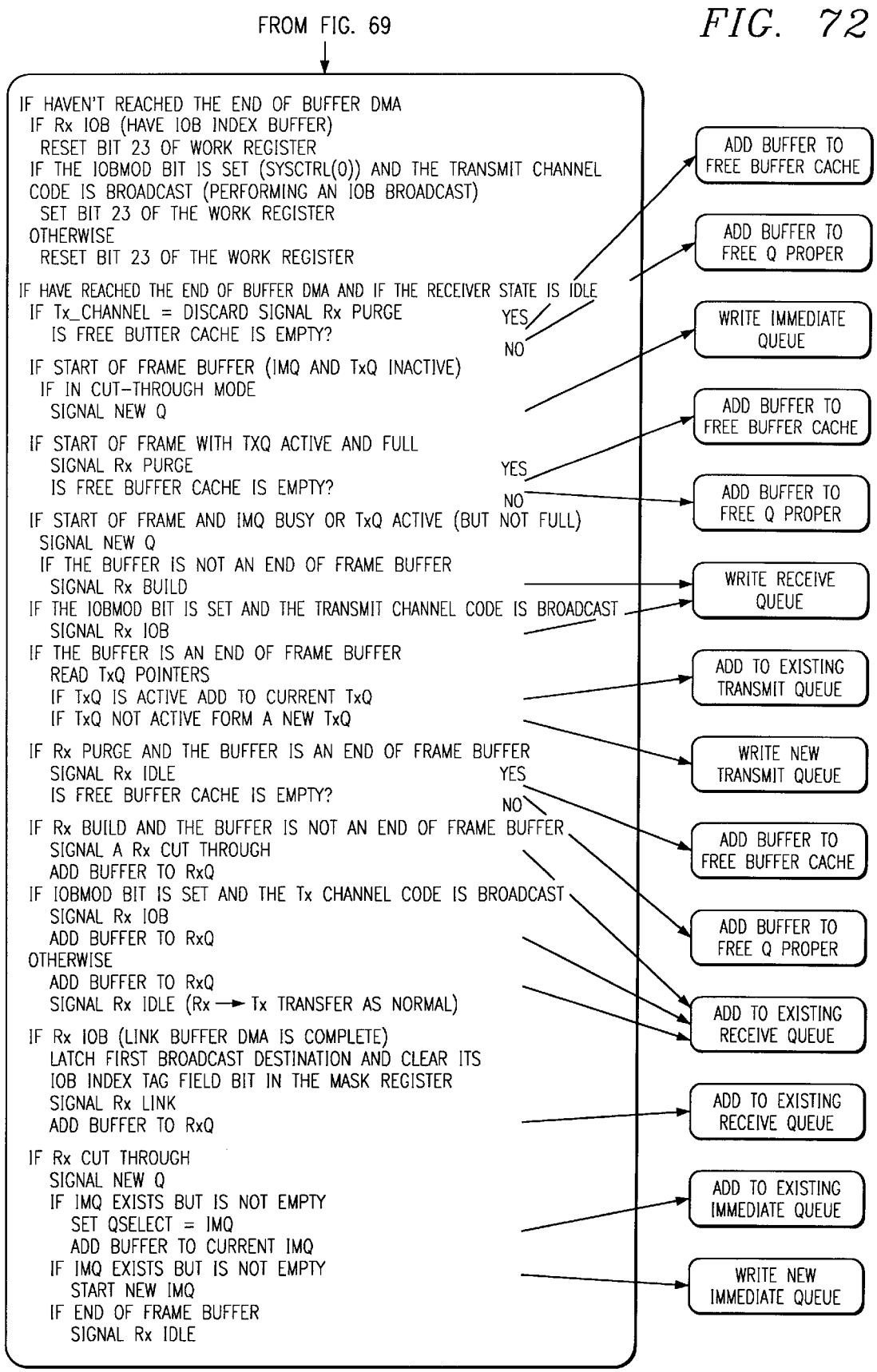
FIG. 72 depicts the QM receive state for the circuit of FIG. 1.

Referring now to FIG. 72, there may be seen a block which corresponds to main. states of the receive state. The Main Queue Manager State Machine 14001 initially determines if it has the end of the buffer in memory. It then determines if the receive in order (IOB) is present, and if so, it resets Bit 23 of the work registers. If the in order bit is set and the transmit channel code is broadcast, then Bit 23 of the work register is set. Otherwise, Bit 23 of the work register is reset. After this is completed it then checks to see if it has reached the end of the buffer in the DMA transfer and if the receive state is idle. Then, if the transmit channel is equal to a discard signal, the receive is purged. The Main Queue Manager State Machine 14011 then checks to see if the free buffer cache is empty. If the answer to this question is yes, then it moves to the add a buffer to free buffer cache block which is more fully described in FIG. 71. If the answer to this is no, then it moves to the add buffer to free queue proper block which is depicted in FIG. 70.

It then checks to see if the start of the frame buffer has been found and if the immediate queue and transmit queue are inactive. If so, then it is in the cut through mode and it signals for a new queue. It then writes to the immediate queue (IMQ). If it is the start of the frame with the TxQ active and full, then it signals a receive purge and checks to see if the free buffer cache is empty. If the answer to this is yes, it adds a buffer to the free buffer queue. If the answer to this is no, it adds a buffer to free queue proper. The Main Queue Manager State Machine 14011 then checks to see if it is the start of the frame and the immediate queue is busy or the transmit queue is active but not fall. If so, it signals for a new queue. If the buffer is not an end of frame buffer it signals for a receive build.

If the in order broadcast mode bit is set and the transmit channel code is broadcast then it signals for a receive in order buffer. Both the signal receive build and signal in order buffer result in write receive queue block. After this step, if the buffer is not in the frame buffer then the Main Queue Manager State Machine 14011 reads the transmit Q pointers and if the transmit queue is active it is added to the current transmit queue. The machine then moves to an add to an existing transmit queue block.

If the transmit queue is not active then it forms a new transmit queue and writes it to the new transmit queue. If it is a receive purge and the buffer is an end of frame buffer it signals receive idle and then checks to see is the free buffer cache empty. If the answer to this is yes, it adds a buffer to the free buffer cache. If the answer is no, then it adds a buffer to the free queue proper.

The Main Queue Manager State Machine 14011 then determines if it is a receive build and the buffer is not an end of buffer; it signals a receive cut-through. It then adds a buffer to the receive queue. If the end of buffer for IOB mode bit is set and the transmit channel code is broadcast it signals for a receive in order buffer and it adds a buffer to the receive queue. This is added to the existing receive queue as denoted by the add to existing receive queue block. Otherwise the Main Queue Manager State Machine 14011 adds a buffer to the receive queue and signals receive idle. That is, the receive to transmit transfer is normal.

If there is a receive in order buffer, which means that the link buffer DMA is complete, then the Main Queue Manager State Machine 14011 latches the first broadcast destination and clears its IOB index tag field in the mask register. It then signals its receive link and adds a buffer to the receive queue. This is added to the existing receive queue. If the Main Queue Manager State Machine 14011 is in the receive cut-through, then it signals for a new queue (IMQ) and if the immediate queue exists but is not empty it sets the queue select to IMQ and adds a buffer to the current IMQ. This then moves it into the add to existing queue block. If the immediate queue exists but is not empty, then it starts a new immediate queue which then moves it to the write new immediate queue block. If it is the end of frame buffer, it signals receive idle.

Referring now to FIG. 70, there may be seen the steps associated with a Main Queue Manager State Machine 14011 to add a buffer to the free queue proper. More particularly, it may be seen that it places the buffer on the free queue proper when all the memory operations are complete and it places the address of the work buffer into the queue tail. It then sets the freed buffer to the top of the freed queue. The work buffer is then moved to the top of the free queue buffer and it puts the free queue top address into the work buffer. After this it exits and does a forward pointer update and then shifts back into the idle mode.

Referring now to FIG. 71, it may be seen the steps associated with a Main Queue Manager State Machine 14011 to add a buffer to the free buffer cache. More particularly, the Main Queue Manager State Machine 14011 pushes the work buffer address onto the free Q cache and requests the next channel. It then shifts to the idle state.

Figure 73:
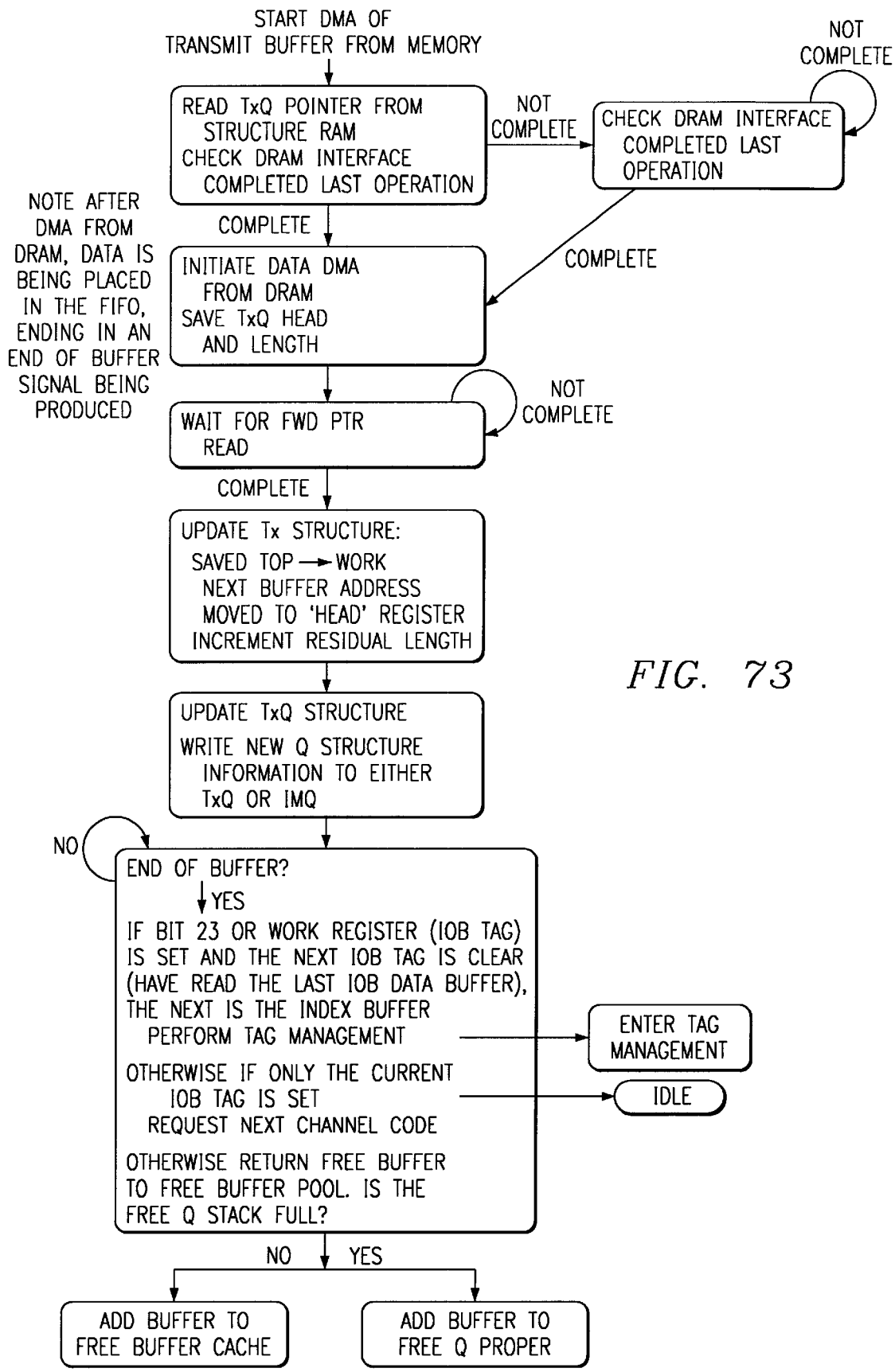
FIG. 73 shows the transmit portion of the QM state machine for the circuit of FIG. 1.
Figure 74:
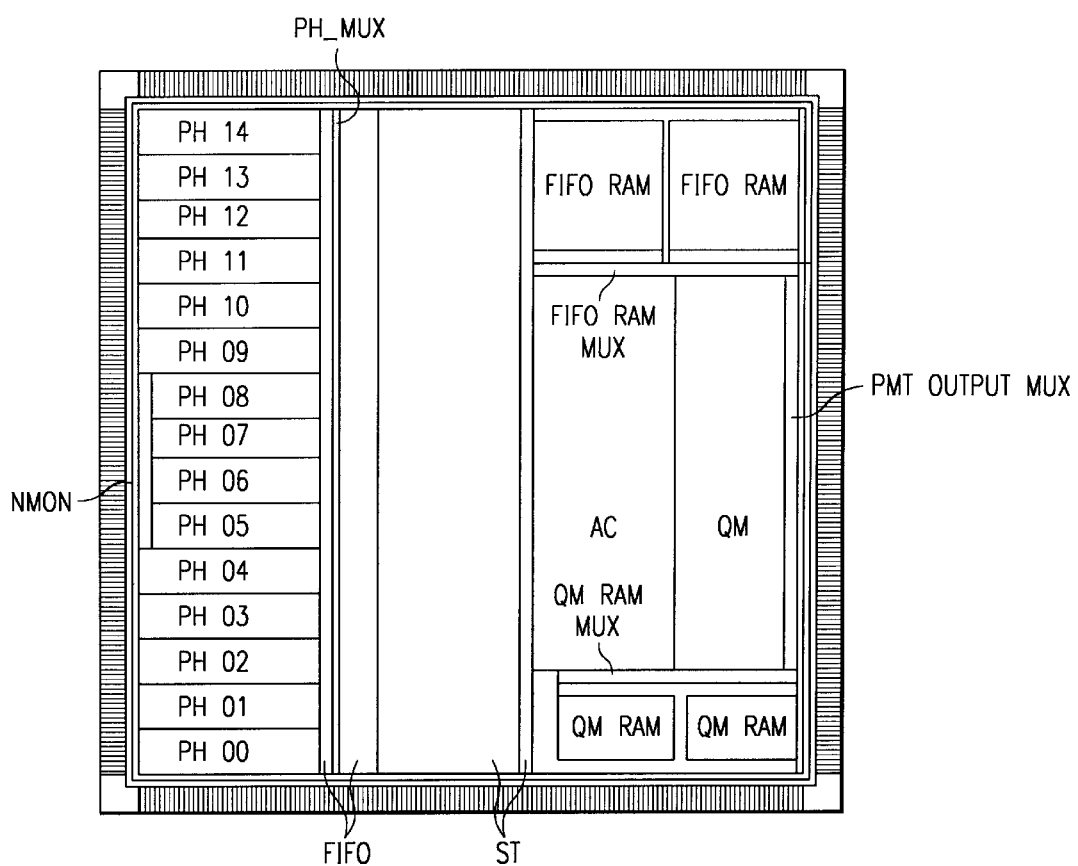
FIG. 74 is a chip layout map for the circuit of FIG. 1.
Figure 75:
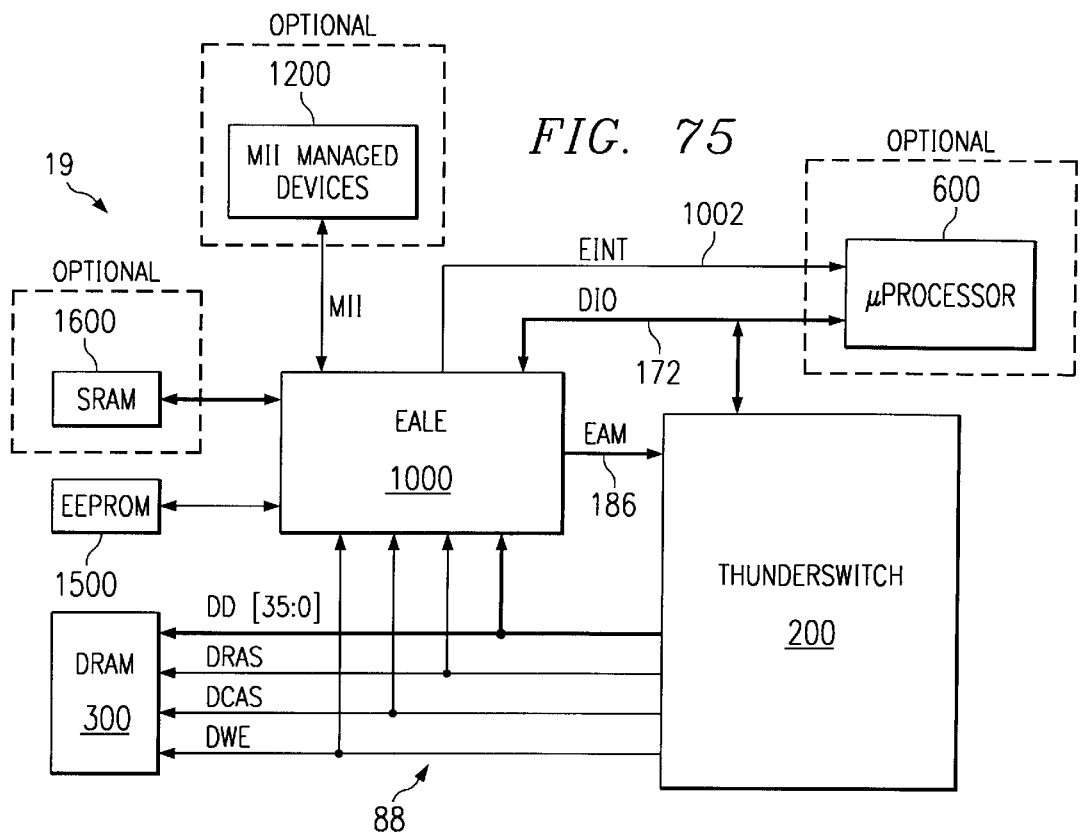
FIG. 75 is a block diagram of a portion of another improved communications system of the present invention.
Figure 77:
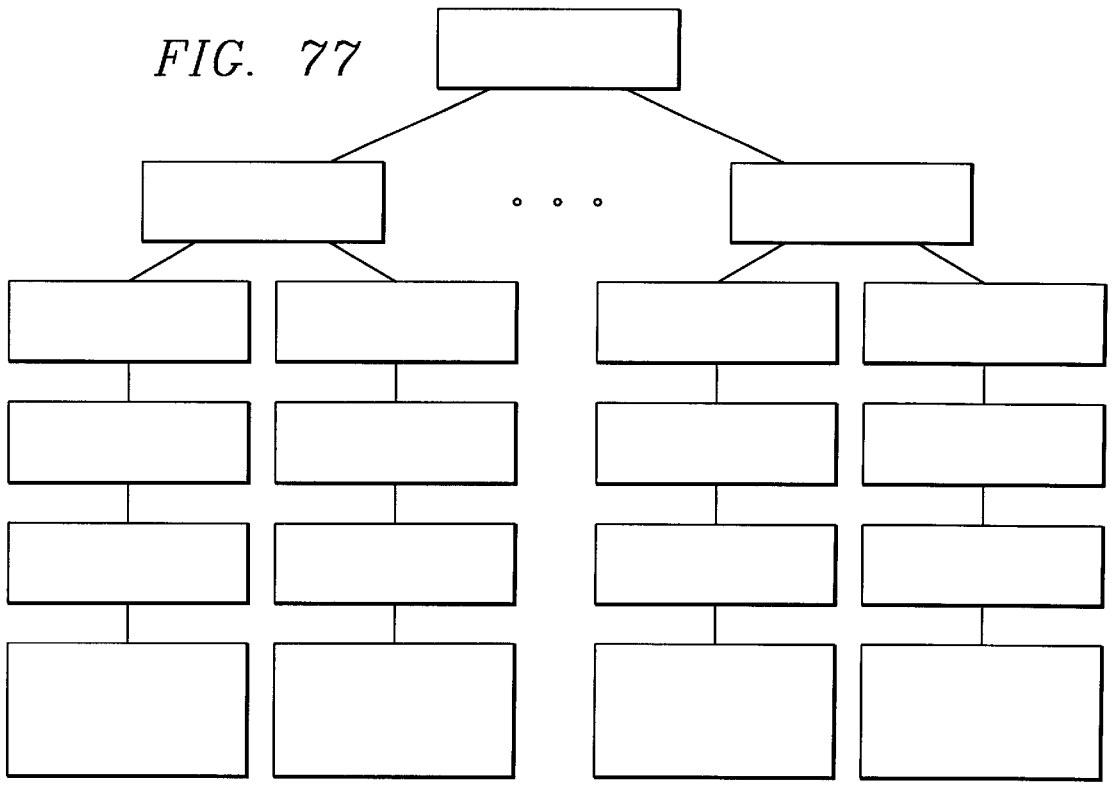
FIG. 77 is a graphical representation of the threaded address table look-up structure.
Figure 76:
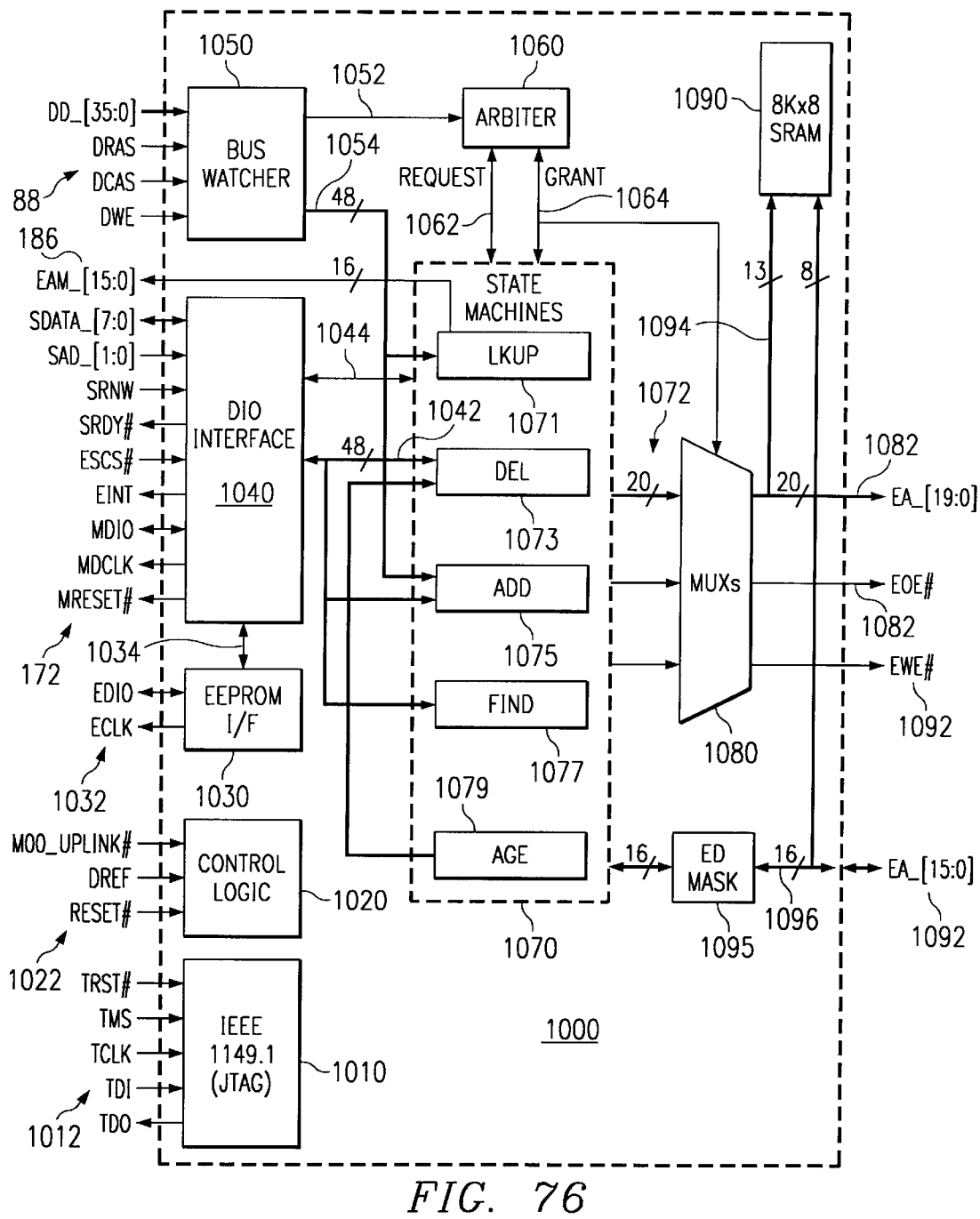
FIG. 76 is a functional block diagram of a circuit that optionally forms a portion of a communications system of the present invention.
Figure 82:
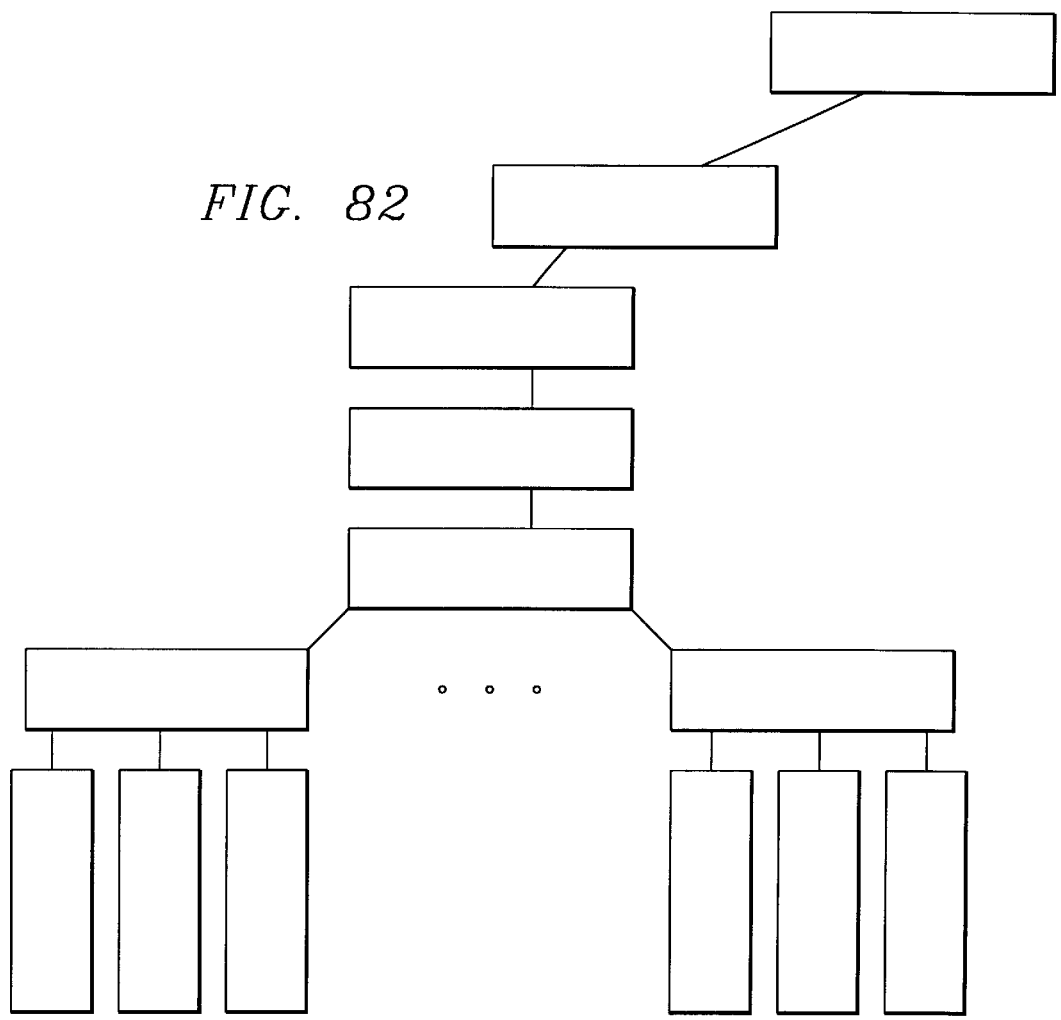
FIG. 82 illustrates an address "tree" for the circuit of FIG. 76.
Figure 83:
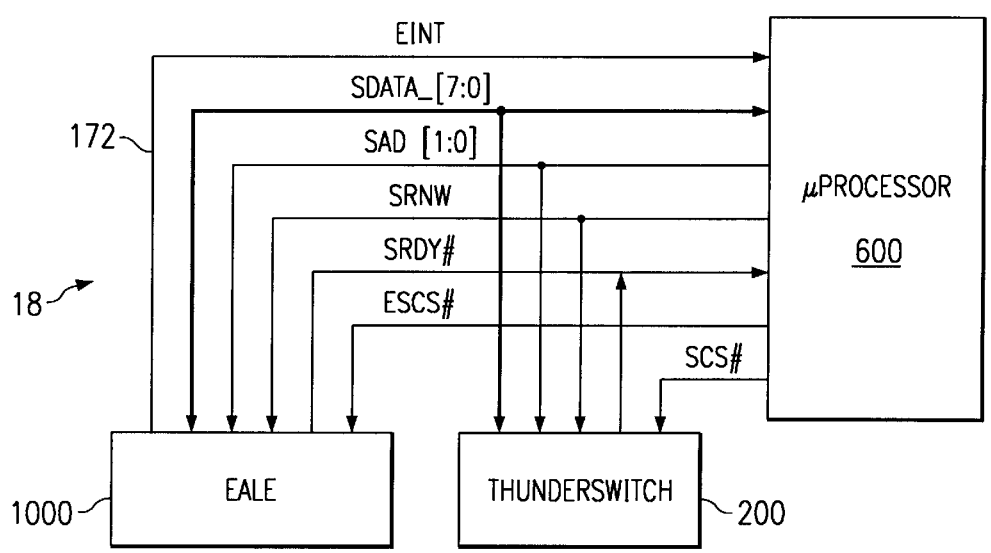
FIG. 83 illustrates the DIO interface for the circuit of FIG. 76.
Figure 84:
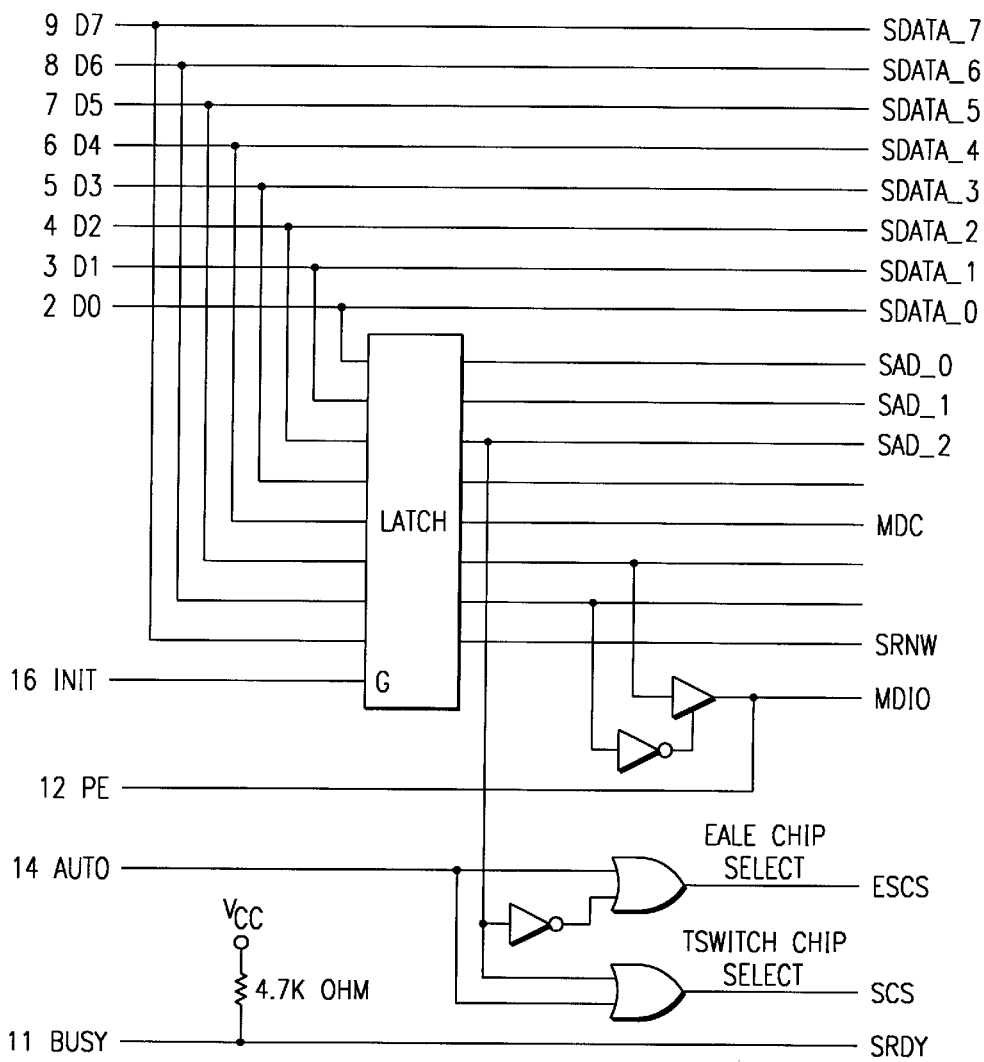
FIG. 84 is an example of accessing through a PC Parallel Port Interface for the circuit of FIG. 76.

Referring now to FIG. 73, there may be seen the detailed steps associated with the transmit portion of the Main Queue Manager State Machine 14011. More particularly, it may be seen that it starts with the DMA of the data from the external memory 300 to a transmit buffer. The initial block reads the transmit pointer from the structure of the RAM. It then checks the DRAM interface 1421 to ensure that it has completed its last operation. If it has not, then it goes along the not complete path and continues to check until it is completed and then passes to the next block. It also has the capability to keep looping while not complete until it is complete. For both the DRAM interface 1421 completes its last operation passes to the block that deals with initiating the data DMA from the memory. The Main Queue Manager State Machine 14011 saves the transmit queue head and length. As part of the DMA from the memory, the data is being placed into the transmit FIFO. This ultimately results in ending with an end of buffer signal being produced. The Main Queue Manager State Machine 14011 then passes to the next block which is delayed for the forward pointer read and it loops back on itself until that is complete. Once it is complete it moves to the next state. In the next state, it updates the transmit structure by saving the top buffer to the work buffer. The next buffer address is then moved to the head register and the residual length of the transmit queue is incremented for this removal of the buffer. It then moves to the update transmit queue structure.

It does this by writing the new queue structure to either the transmit queue or the immediate queue. It then moves to the next block where it checks for the end of the buffer. If the answer is no then it loops back until the answer is yes. Once the answer is yes, it determines if Bit 23 or the work register IOB tag is set and the next IOB tag is cleared. This is checking to see if it has read the last IOB data buffer. It next performs tag management in the index buffer to clear this tag. It then enters the tag management block, clears the tag and comes back. Otherwise the state machine checks to see if it is the only current IOB tag set and if so requests the next channel code. In requesting the next channel code, it passes to the idle state. Otherwise it returns the free buffer to the free buffer pool. It then determines is the free queue stack fall. If the answer to this is yes, it adds the buffer to the free queue proper. If the answer to this is no, then it adds the buffer to the free buffer cache.

The statistics for the ports will be updated using different strategies depending on the frequency of updates required, in order to maintain a constant bandwidth to the statistics RAM. This will ensure a recordable event is not ignored or dropped. The memory map for one port of the statistics RAM is described later herein.

The majority of the 10 Mbps port statistic records will be incremented using read, modify (increment), write cycles to the statistics RAM. The worst case update cycle time (including access made to the port structures for buffer updates and DIO access to the RAM) for all part statistics is less than the time required for a minimum. length Ethernet frame to be received. The exceptions to this, relate to statistics which apply to less than minimum length frames or hardware errors. (Namely: Undersize Rx Frames, Rx Fragments, Tx H/W errors and Rx H/W errors). For these exceptional cases an intermediate counter is incremented for each recordable event, and the resulting count is used to update the statistics records using the normal read modify write cycle. This causes some statistics latency.

For the 100 Mbps ports read, modify, write cycles, cannot be used without over subscribing the SRAM bandwidth. To accommodate the maximum statistics backlog count that might accrue before an update could be guaranteed, intermediate counters are used. These counters are small, storing the incremental change between SRAM updates. The contents of the counter will be used to modify the RAM using a read, modify, write cycle, before being reset. Longer intermediate counters are used for the faster updating statistics outlined above and for 200 Mbps operations on the uplink port.

A hardware statistics state machine arbitrates access to the ports and the statistic updates. That is, the hardware statistics state machine is preferably sequential logic configured to realize the functions described herein.

When accessing the statistics values from the DID port, it is necessary to perform four 1 byte DID reads, to obtain the full 32 bits of a counter. To prevent the chance of the counter being updated while reading the four bytes, the low byte should be accessed first, followed by the upper 3 bytes. On reading the low byte, the counter statistic value is transferred to a 32 bit holding register, before being placed on the DIO bus. The register is only updated when reading the low byte of the counter statistic. By accessing in this way, spurious updates will not be seen.

Test access to the statistics RAM is provided via the DID port after the circuit has been soft reset (or following power on before the start bit has been set). In this mode all locations of the RAM can be written to and read from. Once the start bit has been set, only read access is permitted to the RAM. When asserting soft reset, it is important to clear the soft reset bit immediately after setting it. This ensures the DRAM refresh state machine is not held at reset, allowing normal DRAM refreshing to occur. Failure to clear the soft reset bit will result in the DRAM contents becoming invalid.

The statistics RAM may be requested to be cleared at anytime during operation. This is achieved by setting the CLRSTS bit in the system control register. The state of this bit is latched. When set, the next statistics update cycle will write zero to all counters in the statistics RAM, before resetting the latched bit. If the CLRSTS bit has not subsequently been reset (by the system/user), the latched bit will be set again, causing the circuit to load zero into the statistics counters again. This will continue, until such time as the CLRSTS bit is reset. It should be noted that soft reset has no effect on the statistics counters, their contents are not cleared during a soft reset. A hard reset will cause the statistics counters to be reset to zero.

Within the queue manager 1401 the DRAM control block provides control for the interface to the external DRAM buffer memory. This provides a cost effective memory buffer. The interface control signals required are produced by the queue manager unit which controls the data transfer with the DRAM.

The interface relies on the use of EDO DRAM to minimize the access time, while maintaining RAM bandwidth. The circuit 200 preferably uses EDO DRAM (Extended Data Output—Dynamic Memory) operating at 60 ns. EDO DRAM differs from normal DRAM memory by the inclusion of data latches on the outputs, preventing the output from becoming tristate with the de-assertion of CAS in preparation for the next access. The data bus is released when CAS is next taken low. The use of EDO DRAM permits the high data transfer rates required by the circuit.

The external memory 300 is accessed in a number of ways. Single access is used during initialization and forward pointer writes, and is the slowest access method; single access transfers a single 36 bit word. Each access takes 7, 20 ns clock cycles.

Page mode burst access is used for fast data transfer of one 64 byte buffer from the FIFO RAM to the external memory. The locations used are located within the DRAM's page boundary permitting fast burst accesses to be made. Each successive burst access only requires 2 clock cycles after the initial row address has been loaded.

CAS before RAS access is used as a refresh cycle. Dynamic memories must be refreshed periodically to prevent data loss. This method of refresh requires only a small amount of control logic within the circuit (the refresh address is generated internally). Each row refresh cycle requires a minimum of 7 clock cycles and must be performed such that the whole device is refreshed every 16 ms. A normal read or write operation refreshes the whole row being accessed.

Figure 20:
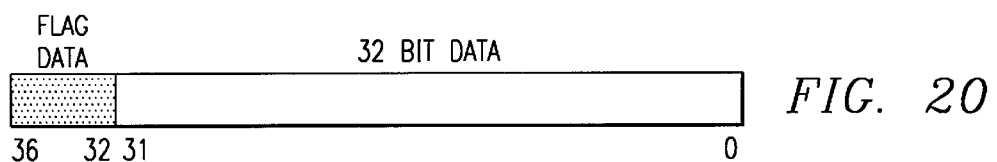
FIG. 20 depicts the format of the 36 bit data word used for the circuit of FIG. 1.

The external memory data bus (DRAM bus) is 36 bits wide. Buffered data is accessed over two memory cycles from the external memory 300, before it is concatenated into an 8 byte data word and one byte of flag data, for use by the circuit 200. FIG. 20 depicts the format of the 36 bit data word used.

The address lines for the external memory are arranged to permit a wide range of memory sizes to be connected, with a maximum of 22 address lines. The address lines are organized as shown in Table 3 below.

TABLE 3

| Pin Name | DX_2 | DX_1 | DX_0 | DA_7 | DA-6 | DA_5 | DA_4 | DA-3 | DA-2 | DA-1 | DA-0 |
|---|---|---|---|---|---|---|---|---|---|---|---|
| Address bit valid during RAS | 21 | 19 | 17 | 15 | 14 | 13 | 12 | 11 | 10 | 9 | 8 |
| Address bit valid during CAS | 20 | 18 | 16 | 7 | 6 | 5 | 4 | 3 | 2 | 1 | 0 |

This permits buffers to be aligned so as not to cross a page boundary (which would reduce the bandwidth available.) A 10 Mbps MAC links the FIFO 1301 and data handling mechanisms of the circuit 200 to the MAC interface and the network beyond. Network data will flow into the circuit 200 through the 10 Mbps or 100 Mbps MACS.

Although similar, there are some differences between the receive and transmit operations of a MAC. Accordingly, each operation is separately considered herein below.

Figure 21:
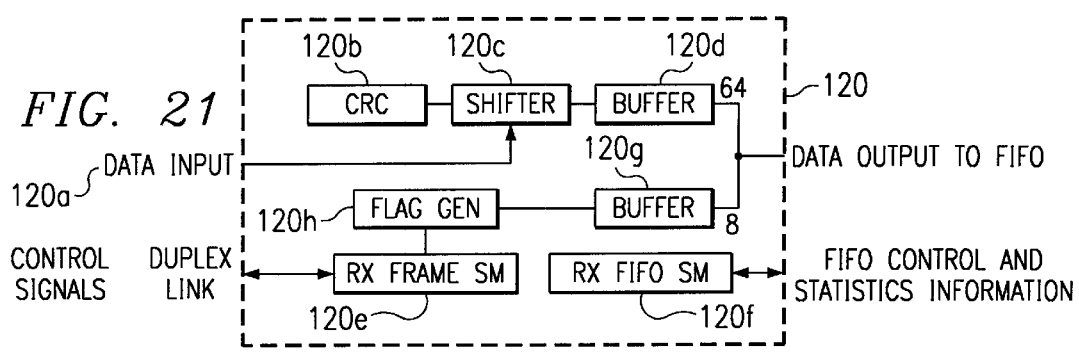
FIG. 21 is a simplified block diagram of the receive portion of a representative 10 Mbps MAC for the circuit of FIG. 1.

Referring now to FIG. 21, there may be seen a simplified block diagram of the receive portion of a representative 10 Mbps MAC 1201. The raw input data 120a is deseriahzed by a shifter 120c before further processing. This is accomplished by shifting in the serial data and doing a CRC check 120b while this is occurring. The data is formed into 64 bit words and stored in a buffer 120d before being transferred to an Rx FIFO buffer. The received data is synchronized with the internal clock of the circuit 200.

Figure 22:
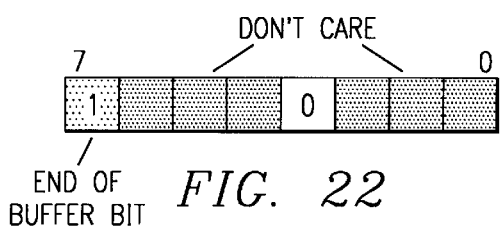
FIG. 22 depicts the end of buffer flag format for the circuit of FIG. 1.
Figure 23:
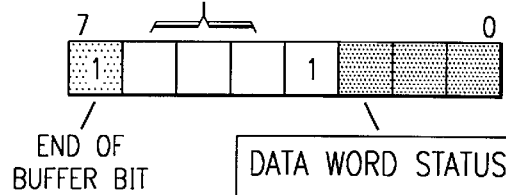
FIG. 23 depicts the data word types for error/status information for the circuit of FIG. 1.

Flag attributes 120h are assigned to the deserialized data word, identifying key attributes. The flags are used in later data handling. The flag field is assigned to every eight data bytes. The format of the sub-fields within the flag byte change depending on the flag information. The start of frame format was described in earlier in reference to FIG. 8. The format depicted in FIG. 22 is the end of buffer flag format. When the most significant (MS) bit (MSB) or End of Buffer bit (bit 7) is set, the remaining bits of the MS nibble (bits 4–6) contain the number of bytes in the data word, while the least significant (LS) nibble (bits 0–3) contains error/status information. The data word types for error/status information is depicted in FIG. 23. The end of buffer (EOB) bit is asserted after each 64 data byte transfer; the end of frame is when bit 3 of the flag byte is set to "1" as depicted in FIG. 23.

The receive frame state machine 120e (control block) of FIG. 21 schedules all receive operations (detection and removal of the preamble, extraction of the addresses and frame length, data handling and CRC checking). Also included is a jabber detection timer, to detect greater than maximum length frames, being received on the network.

The receive FIFO state machine 120f (control block) of FIG. 21 places the received data into the FIFO buffers while also detecting and flagging erroneous data conditions in the flag byte.

Figure 66:
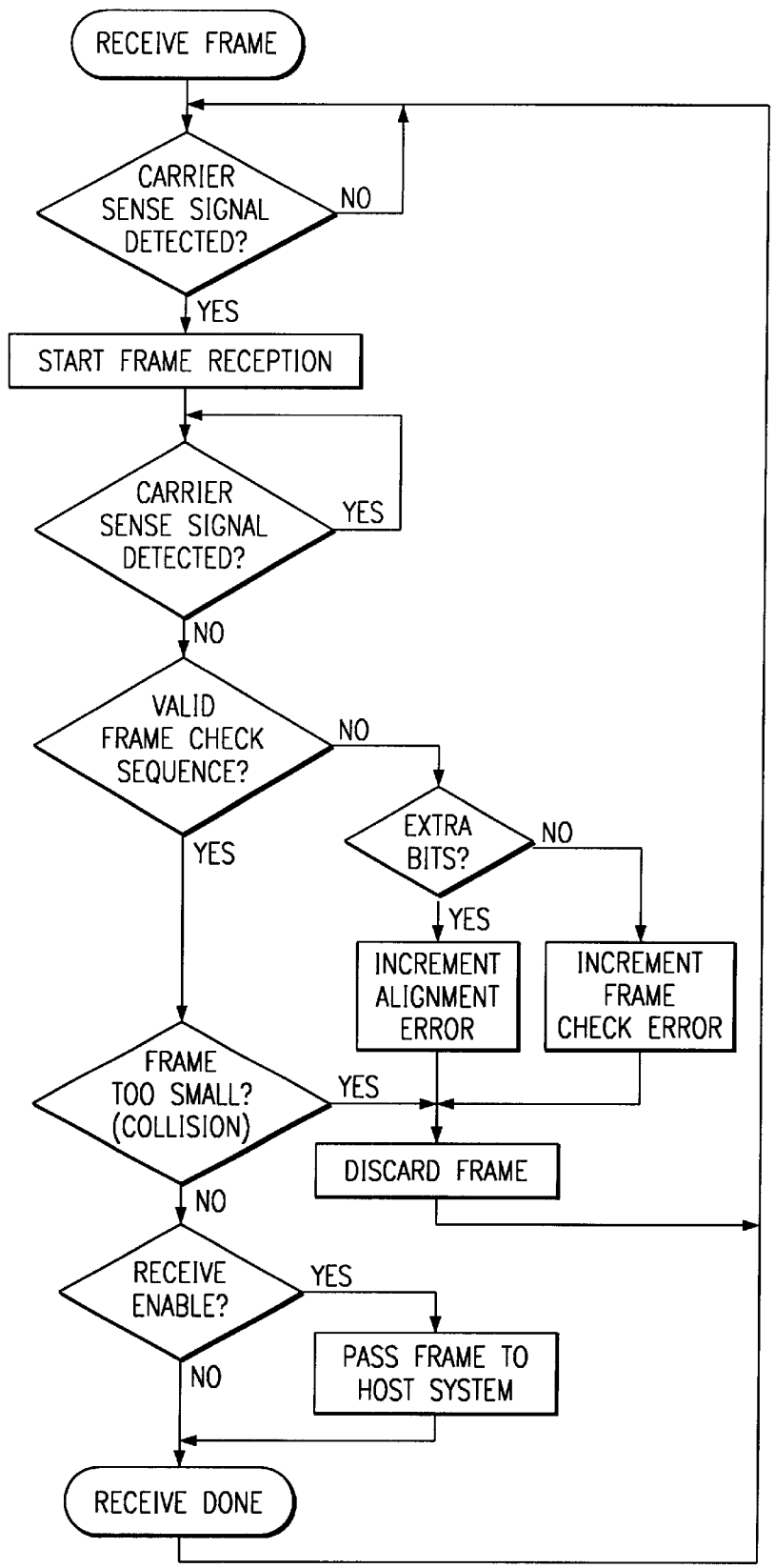
FIG. 66 is a generalized summary flow diagram used by the MAC receive state machine to control the receiving of a frame for the circuit of FIG. 1.

Referring now to FIG. 66, there may be seen a generalized summary flow diagram used by the receive state machine 120e to control the receiving of a frame. When data is received from the network into the physical layer interface, it is reshaped into distortion-free digital signals. The Ethernet physical layer interface performs Manchester encoding/decoding. The Ethernet provides synchronization to the received data stream and level translation to levels compatible with TTL. The arrival of a frame is first detected by the physical layer circuitry, which responds by synchronizing with the incoming preamble, and by turning on the carrier sense signal. As the encoded bits arrive from the medium, they are decoded and translated back into binary data. The physical layer interface passes subsequent bits up to the MAC, where the leading bits are discarded, up to and including the end of the Preamble and Frame Starting Delimiter (SDEL).

The MAC, having observed carrier sense, waits for the incoming bits to be delivered. The MAC collects bits from the physical layer interface as long as the carrier sense signal remains on. When the carrier sense signal is removed, the frame is truncated to a byte boundary, if necessary. Synchronization is achieved via an integrated digital phase-locked loop (PLL), which locks to the bit stream signaling rate. This clock is boundary/aligned to the bit stream and is passed to the MAC for data extraction.

The MAC, as the first step during data receive, provides deserialization of the bit stream to 64-bit data words by counting clock pulses received from the physical layer interface. Parity bits are generated on the received data, so that the integrity of the received data may optionally be continuously monitored as it passes from the MAC to the FIFO RAM.

The destination and source addresses, the LLC data portions, and the CRC field of the current receive packet are passed to the FIFO RAM in the appropriate sequence. When the end of the CRC-protected field is received, the calculated value is compared to the CRC value received as part of the packet.

If these two values disagree, the MAC signals an error has occurred and the frame should be ignored. The MAC also checks to see if the frame is too small.

After a valid frame has been received and buffered in the MAC's buffer, the Rx FIFO state machine transfers the frame to the Rx FIFO buffer pointed to by the MACs Rx FIFO pointer. When the transfer is complete, the Rx FIFO state machine completes the receive operation by reporting the status of the transfer to the statistics system and updating the MAC's Rx FIFO pointer to point to the next buffer block, or buffer depending upon receipt of an end of a frame.

Figure 24:
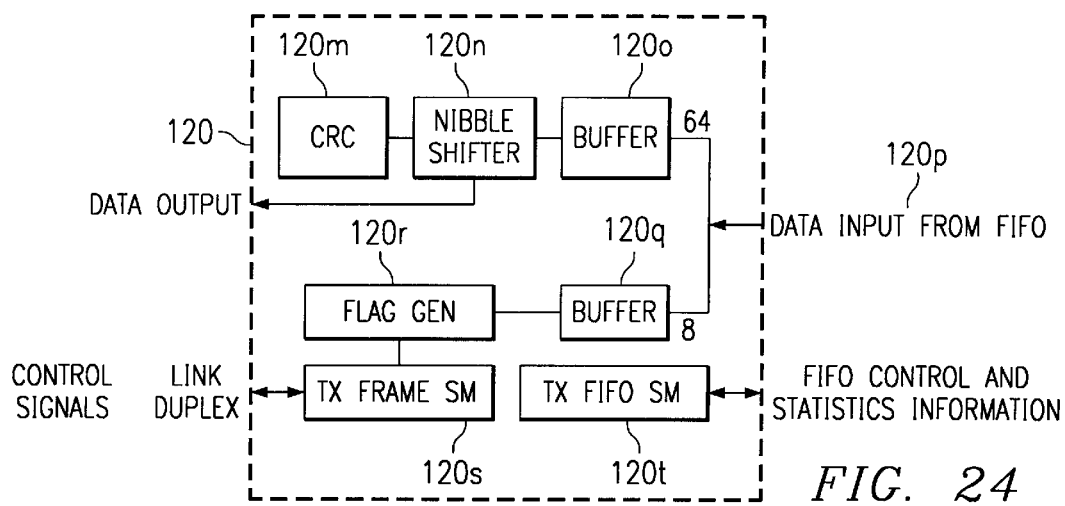
FIG. 24 is a simplified block diagram of the transmit portion of a representative 10 Mbps MAC for the circuit of FIG. 1.

Data transmission requires more processing and data handling than data reception. This is due to the overhead of implementing collision detection and recovery logic. Referring now to FIG. 24, there may be seen a simplified block diagram of the transmit portion of a representative 10 Mbps MAC 1201. Data 120p entering from a Tx FIFO as a 64 bit word is serialized by nibble shifter 120n for transmission at the transmit clock rate; this also requires the data to be synchronized to the transmit clock rate from the circuit's internal clock.

The transmit frame state machine (Tx frame sm) 120s of FIG. 24 schedules all transmit operations (generation and insertion of the preamble, insertion of the addresses and frame length, data handling and CRC checking). The CRC block 120m is only used to check that the frame still has a valid CRC, it is not used to re-calculate a new CRC for the frame. If the CRC does not match, then this indicates that the frame contents were somehow corrupted and will be counted in the Tx Data errors counter.

The transmit frame state machine block 120s handles the output of data into the PHYs 110. A number of error states are handled. If a collision is detected the state machine 120s jams the output. Each MAC 1201 implements the IEEE 802.3 binary exponential backoff algorithm. If the collision was late (after the first 64 byte buffer has been transmitted) the frame is lost. If it is an early collision the controller will back off before retrying. While operating in full duplex both carrier sense (CRS) mode and collision sensing modes are disabled.

The transmit FIFO state machine (control block) 120t of FIG. 24 handles the flow of data from the TX FIFO buffers into the MAC internal buffer 120o for transmission. The data within a TX FIFO buffer will only be cleared once the data has been successfully transmitted without collision (for the half duplex ports). Transmission recovery is also handled in this state machine 120T. If a collision is detected frame recovery and re-transmission is initiated.

Figure 65:
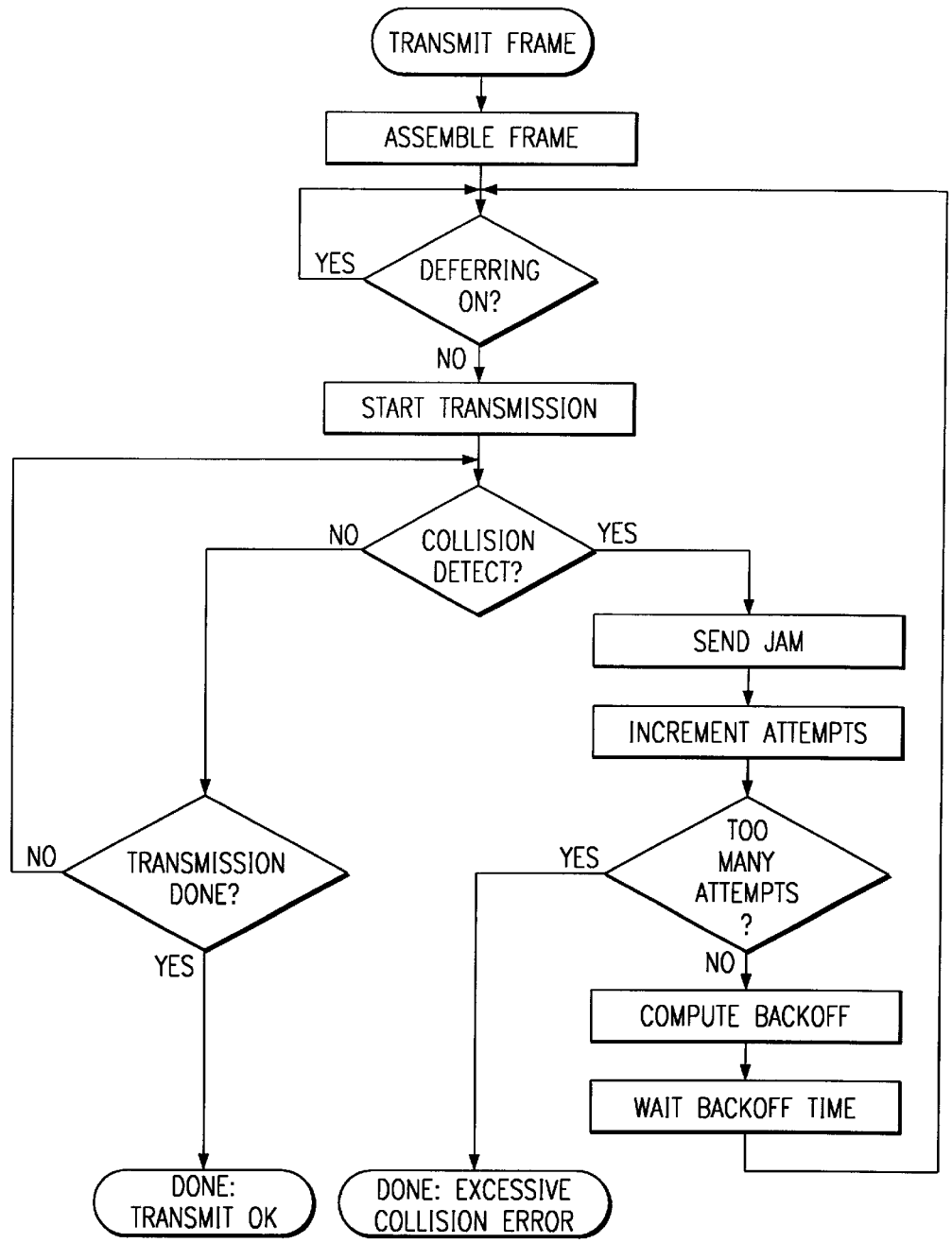
FIG. 65 is a generalized summary flow diagram used by the MAC transmit state machine to control the transmission of a frame for the circuit of FIG. 1.

Referring now to FIG. 65, there may be seen a generalized summary flow diagram used by the transmit state machine 120s to control the transmission of a frame. When the transmission of a frame is requested, the transmit data encapsulation function constructs the frame from the supplied data. It appends a preamble and a frame starting delimiter (SDEL) to the beginning of the frame. If required, it appends a pad at the end of the Information/Data field of sufficient length to ensure that the transmitted frame length satisfies a minimum frame size requirement. It also overwrites the Source Addresses, if specified, and appends the Frame Check Sequence (CRC) to provide for error detection.

The MAC 1201 then attempts to avoid contention with other traffic on the medium by monitoring the carrier sense signal provided by the physical layer circuitry 110 and deferring if the network is currently being used by another transmitting station. When the medium is clear, frame transmission is initiated (after a brief interframe delay to provide recovery time for other nodes and for the physical medium). The MAC 1201 then provides a serial stream of bits to the physical layer interface 110 for transmission.

The physical layer circuitry performs the task of actually generating the electrical signals on the medium that represent the bits of the frame. Simultaneously, it monitors the medium and generates the collision detect signal to the MAC, which in the contention-free case under discussion, remains off for the duration of the frame. When transmission has completed without contention, the MAC informs the statistics system and awaits the next request for frame transmission.

If multiple MACS attempt to transmit at the same time, it is possible for them to interfere with each other's transmission, in spite of their attempts to avoid this by deferring. When transmissions from two stations overlap, the resulting contention is called a collision. A given station can experience a collision during the initial part of its transmission (the collision window) before its transmitted signal has had time to propagate to all stations on the CSMA/CD network. Once the collision window has passed, a transmitting station is said to have acquired the network; subsequent collisions are avoided since all other (properly functioning) stations can be assumed to have noticed the signal (by way of carrier sense) and to be deferring to it. The time to acquire the network is thus based on the round-trip propagation time of the physical layer.

In the event of a collision, the transmitting station's physical layer circuitry initially notices the interference on the medium and then turns on the collision detect signals.

This is noticed in turn by the MAC, and collision handling begins. First, the MAC enforces the collision by transmitting a bit sequence called jam. This ensures that the duration of the collision is sufficient to be noticed by the other transmitting stations involved in the collision. After the jam is sent, the MAC terminates the transmission and schedules another transmission attempt after a randomly selected time interval (backoff). Retransmission is attempted until it is successful or an excessive collision condition is detected. Since repeated collisions indicate a busy medium, however, the MAC attempts to adjust to the network load by backing off (voluntarily delaying its own retransmissions to reduce its load on the network). This is accomplished by expanding the interval from which the random transmission time is selected on each successive transmit attempt. Eventually, either the transmission succeeds, or the attempt is abandoned on the assumption that the network has failed or has become overloaded.

At the receiving end, the bits resulting from a collision are received and decoded by the physical layer circuitry just as are the bits of a valid frame. Fragmentary frames received during collisions are distinguished from valid transmissions by the MAC. Collided frames or fragmentary frames are ignored by the MAC.

Figure 25:
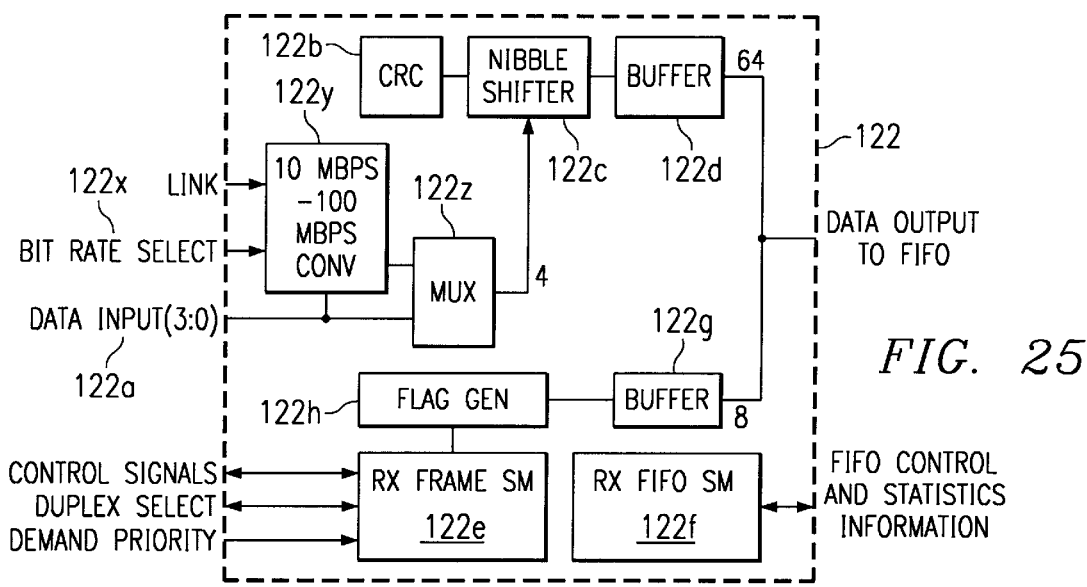
FIG. 25 is a simplified block diagram of the receive portion of a representative 10/100 Mbps MAC for the circuit of FIG. 1.

The 100 Mbps MAC 122 links the high speed MAC interfaces to the FIFO and data handling mechanisms of the circuit. The 10/100 Mbps ports support a number of options, such as full/half duplex, bit rate switching and demand priority mode. Referring now to FIG. 25, there may be seen a simplified block diagram of the receive portion of a representative 10/100 Mbps MAC.

The architecture for the 100 Mbps MAC is similar to that for 10 Mbps. This permits the interface to support both 10 and 100 Mbps operation. When operated at 10 Mbps, the 10/100 Mbps ports, can operate either in nibble serial, or bit serial interface mode. The bit serial mode is identical to the dedicated 10 Mbps ports (ports 3–14) operation.

The data received 122 a from the external PHY is de-nibblized in the shifter 122c, forming 64 bit words. The data is synchronized to the internal clock of the circuit. After deserialization, a flag byte is assigned to the data word by flag generator 122h, identifying attributes for later data handling. The format of the flag byte data is common for both 10 and 10/100 1 VIbps ports. Once the 100 Mbps data has been de-serialized it is handled no differently to the 10 Mbps data.

The receive frame state 122e machine of FIG. 25 schedules all receive operations (detection and removal of the preamble, extraction of the addresses and frame length, data handling and CRC checking). Also included is a jabber detection timer, to detect greater than maximum length frames, being received on the network.

The receive FIFO state machine 122e of FIG. 25 places the received data into the FIFO buffers 130 while also detecting and flagging erroneous data conditions in the flag byte.

Figure 26:
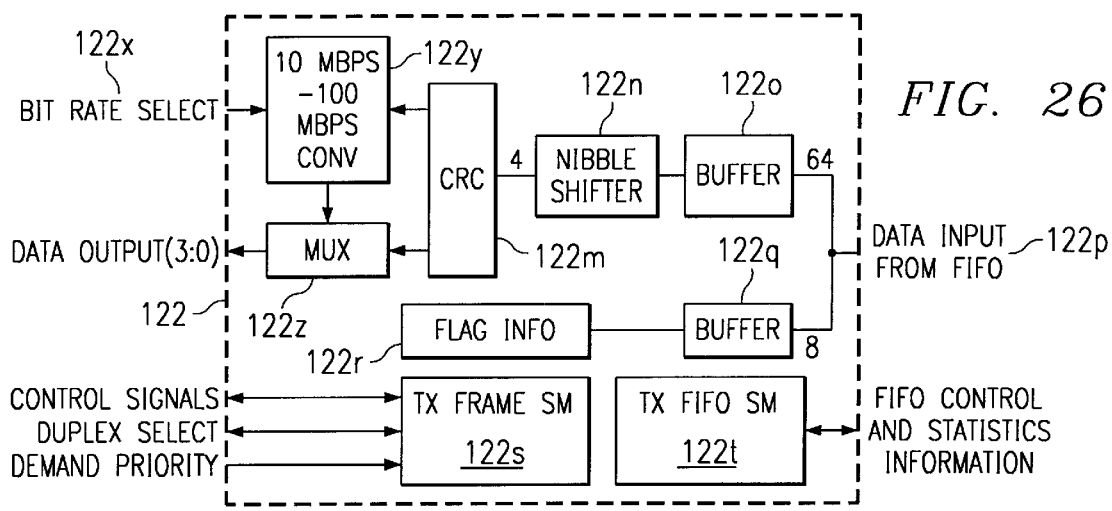
FIG. 26 is a simplified block diagram of the transmit portion of a representative 10/100 Mbps MAC for the circuit of FIG. 1.

Referring now to FIG. 26, there may be seen a simplified block diagram of the transmit portion of a representative 10/100 Mbps MAC 122. Data from FIFO 122p, is nibblized 122n for transmission at the interface clock rate. The nibbles are transmitted and also are used to generate the CRC 122m to be appended to the transmitted frame. If the port is operating at 10 Mbps, the nibbles are synchronized to a 10 Mhz clock and transmitted serially. The 100 Mbps ports have separate CRC logic for both Rx and Tx frames, to support full duplex operation. The two Tx state machines 122s, 122t are essentially the same as those described earlier in reference to FIG. 24, but also have to control the two bit rates.

The CRC block 122m is only used to check that the frame still has a valid CRC, it is not used to re-calculate a new CRC for the frame. If the CRC does not match this indicates that the frame contents were corrupted and will be counted in the Tx CRC error counter.

The uplink port can be used as a fifteenth 10/100 Mbps switched port, even though no address compare register exists for it. Packets will be switched by default since the destination address will not be matched to any of the other fourteen switched ports.

The port 0 implementation is similar to the 10/100 Mbps port described above, however modifications are included to make it 200 Mbps capable; byte wide data transfers rather than nibble transfers are employed. The 200 Mbps wide uplink mode is selected by taking the M00_UPLINK # (active low) signal low.

With M00_UPLINK# set low, all packets are sent to the uplink port by default. The address compare disable option bits (ADRDIS), (in the port control register), are set for all ports except port 0. Local address comparison is possible by clearing the ADRDIS bits, for the ports that will take part in address comparison. Alternatively the EAM interface can be used in the normal manner. Frames received on the uplink port cannot be routed using local address comparisons or EAM interface, post frame tagging, must be used. Broadcast and Unicast traffic received on ports 01–14 are treated similarly, (forwarded to the Uplink only, if no local addressing is enabled). Identification of broadcast traffic is retained for statistic counting purposes. Setting M00_UPLINK# low also selects store and forward operation on all ports, to prevent data underflows and to permit errored frame filtering. If local frame switching is employed, clearing the relevant STFORRX bits from ports 01–14 and ensuring both STFORRX and STFORTX bits are set for port 00 (uplink), will improve performance, by permitting cut-through where possible to do so. Store and forward permits errored frame filtering, cut-through does not.

Flow control is available on all ports and is applicable in full duplex mode only. In this mode, asserting the collision signal before the circuit begins the transmission of a frame, will force the circuit to wait for the collision signal to be de-asserted before the frame is transmitted. The collision pin is sampled immediately prior to transmission. If it is not asserted frame transmission will continue. If subsequent to transmission the collision signal is asserted, the current frame continues transmission, however the circuit will hold off all future frames transmissions until the collision signal is deasserted. The interfacing hardware must be capable of storing up to a maximum length Ethernet frame, if it is not to drop frames due to congestion.

The frame will be transmitted immediately following the de-assertion of the collision signal. It is the duty of the flow control requesting device to be ready to accept data whenever the collision signal is de-asserted following a flow controlled frame, no inter-frame gap is imposed by the circuit in this mode of operation. This provides maximum flexibility and control to the interfacing hardware on the uplink.

When the circuit is used in the multiplex mode, it is desirable to have an indication of which port received the frame. This permits an address look up device to be connected to the uplink port, allowing incorporation of the circuit into a larger switch fabric. The circuit will provide one byte of information (to identify the source port) on the MII interface data. pins prior to M00_TXEN being asserted.

Figure 27:
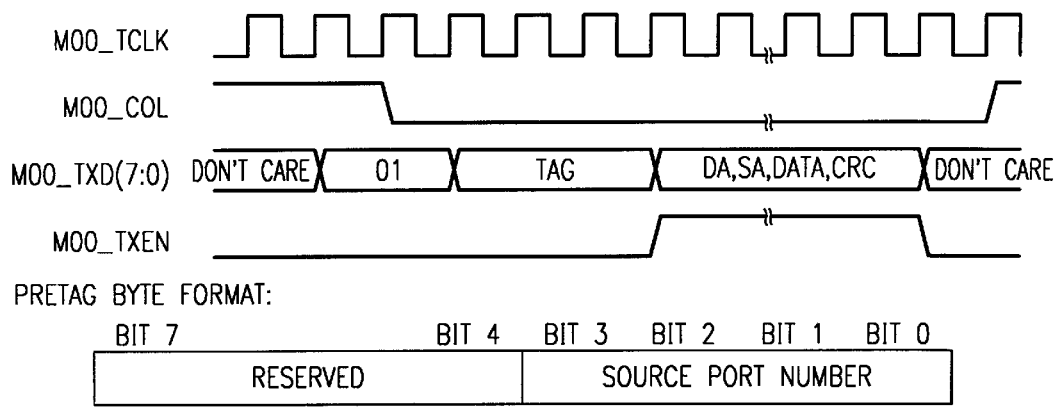
FIG. 27 depicts the signal timings for a 200 Mbps handshake protocol for the circuit of FIG. 1.

The 200 Mbps handshake protocol depicted in FIG. 27 is as follows:

Upstream device is holding flow control signal (MOO-COL) high, preventing the circuit from transmitting frames on the uplink.

When a frame is ready to transmit, make a request to the upstream device by taking the signal MOO_TXD (00) high.

When ready to receive, the upstream device in response to seeing M00_TXD(00) go high, takes MOO-COL low.

The circuit places the source port address on bits M00_TXD(00) thru M00_TXD(03).

Four MOO_TCLK clock cycles after MOO_COL was driven low, M00_TXEN is taken high and normal data transfer occurs, starting with the destination address. No preamble is provided prior to the destination address within the frame.

When M00 TXEN is taken low at the end of frame. M00 COL is taken high in preparation for the next handshake. If the upstream device is busy, MOO-COL should be kept high (even after M00_TXD(00) is taken high), until such time that the upstream congestion has cleared and transmission can continue. The next frame transmission will not proceed until the handshake is performed. MOO-COL must be cycled prior to each transmission. (To operate in this mode, M00_UPLINK# (active low) should be held low, MOO-DUPLEX and M00_DPNET should be held high and the IOB option bit in the SYS CTRL register must be set).

The source port number of FIG. 27 is coded as indicated in Table 4 below.

TABLE 4

| Source Port Number 3:0 | Port |
|---|---|
| 0000 | Reserved |
| 0001 | Port 1 10/100 |
| 0010 | Port 2 10/100 |
| 0011 | Port 3 (10 Mb s |
| 0100 | Port 4 (10 Mb s |
| 0101 | Port 5 (10 Mb s |
| 0110 | Port 6 (10 Mb s |
| 0111 | Port 7 (10 Mb s |
| 1000 | Port 8 (10 Mb s |
| 1001 | Port 9 (10 Mb s |
| 1010 | Port 10 (10 Mb s |
| 1011 | Port 11 (10 Mb s |
| 1100 | Port 12 (10 Mb s |
| 1101 | Port 13 (10 Mb s |
| 1110 | Port 14 (10 Mb s |
| 1111 | Reserved |

Port 00 operated at 100 Mbps (i.e. MOO_UPLINK#=1) will provide a tag nibble on the cycle prior to M00_TXEN being asserted. A preamble will be provided on this port when operated at 100 Mbps. The nibble format will be as shown in FIG. 27.

Figure 28:
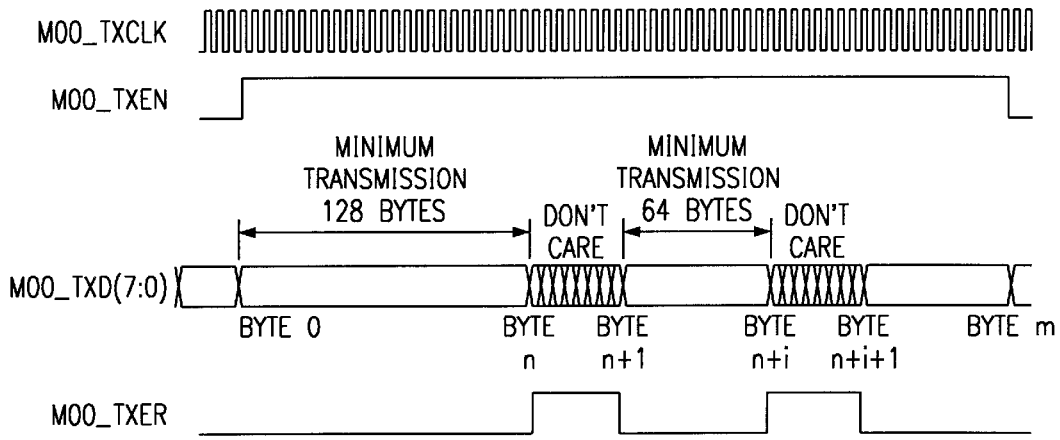
FIG. 28 is a signal timing diagram illustrating that a frame control signal provided on MOO TXER during 200 Mbps uplink operations permits the reconstruction of frames using external logic, if the Uplink Tx FIFO underruns for the circuit of FIG. 1.

As depicted in FIG. 28, a frame control signal is provided on M00_TXER during 200 Mbps uplink operations to permit the reconstruction of frames using external logic, if the Uplink Tx FIFO underruns.

In uplink mode, MOO_TXER will be low throughout a successfully transmitted frame. If a FIFO underrun occurs (due to high simultaneous activity on the ethernet ports), the data in the FIFO will continue to be transmitted until empty, at which point the M00_TXER signal will be taken high as depicted in FIG. 28. While high the data transmitted from the uplink should be discarded. When the next 64 byte data buffer has been forwarded to the uplink TX port, MOO_TXER will be taken low and normal transmission will continue. If following buffer updates are delayed, the FIFO will again underrun, causing M00_TXER to be taken high once the data present in the FIFO has been transmitted as depicted in FIG. 28.

The FIFO is preferably loaded with two buffers before transmission commences, this guarantees a minimum. transmission of 128 bytes before any potential underrun can occur. Following an underrun, only one buffer has been transferred guaranteeing a minimum. of 64 bytes following an underrun. During transmission of along frame during high traffic loads, multiple underruns may occur.

The tircuit relies on an external switch fabric to make switching decisions when used in 200 Mbps mode. The external hardware must provide an indication of the destination ports for the frame received on the uplink. This indication will consist of four bytes; if a single port bit is set, then the frame will be sent to the port associated with that bit. If multiple bits are set, then the i frame will be sent to multiple ports, this permits broadcast and multi-cast traffic to be limited, supporting external virtual LAN configurations.

No local switching using the circuit's internal address registers or the EAM interface is possible for routing frames received on the uplink port at 200 Mbps.

As depicted in FIG. 29, there is no handshake or flow control for the receive uplink path on the circuit 200. If required this must be implemented in upstream devices. No preamble will be expected on data received by the uplink port at 200 Mbps. As shown in FIG. 29 an ethernet frame of data (destination address, source address, data, and CRC) is sent when M00_RXDV goes high and ends when M00_RXDV goes low. Following this, M00_RXDVX goes high and the next time MOO_RXDV goes high a four byte tag (TagO–Tag 3) is appended to the ethernet frame. The edges of the packets are synchronous with the rising edge of M00_RXDV. The four keytag fields will not immediately follow the frame data, but will be presented after the end of data, and following an idle period, qualified by M00_RXDVX −1 and MOO_RXDV =1.

The tag fields of FIG. 29 are coded as keytags as depicted in FIG. 30. If only one bit is set in the destination port field, the packet is a unicast one, Le. Keytag 0=00000000 and Keytag 1=xx000100, the packet is unicast and destined for port 11.

If more than one bit is set, the packet is a ULAN multi-cast packet. For example, if Keytag 0=11001010 and Keytag 1=xx001001, the packet will be transmitted from ports 12,9,8,7,4 & 2.

If all bits are clear in the tags, the packet is invalid and will be discarded.

Receive arbitration biases the prioritization of the arbitration for received frames over transmitted frames. This utilizes the circuit's 200 buffering capability during heavy traffic loading, while increasing the transmission latency of the circuit. Receive arbitration can be selected by setting the RXARB bit (bit 5) in the SIO Register. The arbitration this selects is shown in FIG. 31.

The normal arbitration scheme is extended to bias the receive priority and active transmissions over inactive transmissions. The queue manager services buffer transfer requests between the port FIFOs and DRAM in the order shown. Rx requests and ongoing Tx requests take priority over transmission that have yet to start (inactive transmissions). If there are spare DRAM accesses available, an inactive request will be promoted to an active request. If there are no spare DRAM accesses, the TX requests will be arbitrated in the inactive priority shown, all ongoing transmits will be allowed to finish with no new transmission started until the Rx requests have been exhausted.

Port 00, when operated in uplink mode, is always assigned the TX Inactive priority. Even after being granted an active TX slot, one buffer will be guaranteed to be transferred (following the initial 2 buffers accrued before a frame start), before the port will have to renegotiate another TX active slot. Thus Port 00 TX in uplink mode has the lowest possible priority, reducing the probability of frame loss through oversubscribed bandwidth, while increasing frame latency and buffering requirements. When operated in this mode, external hardware to reconstruct the frame due to Port 00 underrunning must be provided.

The Network monitoring mux 160 will provide complete Network Monitoring (NMON) capability at 10 Mbps and a partial capability at 100 Mbps for the 10/100 ports. Port selection is based on the NMON register.

The interface will permit the following formats. A 7 wire SNI, 10 Mbps signals (ports 0, 1 & 2 must be used in bit serial 10 Mbps SNI) mode of operation. The signals that will be provided by the interface will be 10 Mbps bit serial, RxD, RClk, CRS, COL, TxD, TClk, TxEn. A 4 bit, nibble interface (either RX or TX), if ports 0,1 & 2 are operated in 100 Mbps mode (or 10 Mbps non-SNI). The system/user may select which half of the interface to access, Rx or Tx- If ports 3–14 are monitored while in this mode enabled by setting the MONWIDE bit high, only the least significant bus of the interface will contain network data, bits 1 thru 3 will not be driven. When monitoring Rx data RxD, RXDV, RXCLK and Ma—SPEED will be provided. When monitoring Tx data TxD, TXEN, TXCLK and Mxx SPEED will be provided.

The interface monitors the signal directly after the pad buffers, before any MAC processing is performed by the circuit. An RMON probe can monitor every packet on the segment connected to the port. The port selection is made by writing network monitor (NMON) codes to the network monitor control field as shown in Table 5 below.

TABLE 5

| NMON Code | Monitoring port Uplink 200 Mbps signals Port Number |
|---|---|
| 0000 | 0 10/100 Mbs |
| 0001 | 1 10/100 Mbs |
| 0010 | 2-(10/100 Mb s |
| 0011 | 3 10 Mb s |
| 0100 | 4 10 Mb s |
| 0101 | 5 10 Mb s |
| 0110 | 6 10 Mb s |
| 0111 | 7 10 Mb s |
| 1000 | 8 10 Mb s |
| 1001 | 9 10 Mb s |
| 1010 | 10 10 Mb s |
| 1011 | 11 10 Mb s |
| 1100 | 12 10 Mb s |
| 1101 | 13 10 Mb s |
| 1110 | 14 10 Mb s |
| 1111- | -Disable-NMON monitoring |

The network monitoring control field is mapped to the lower 4 bits of the System NMON register DIO register.

For 10 Mbps monitoring, the network monitoring signals will be provided as shown in Table 6 below. The NMON register option bits are: MONRXTX=X, MONVVIDE=0.

TABLE 6

| Pin Name | Network Monitoring Mode (uplink) |
|---|---|
| NMOM-00 | Mxx__RXD |
| NMOM_01 | Mxx__CRS |
| NMOM_02 | Mxx__RCLK |
| NMOM-03 | Mxx__TXD |
| NMOM_04 | Mxx TXEN |
| NMOM_05 | Mxx__TCLK |
| NMOM 06 | Mxx COL |

The 100 Mbps monitoring, network monitoring signals will be provided for Tx as shown in Table 7 below. The NMON register option bits are:

TABLE 7

| MONRXTX −1, MONWIDE = 1. | |
|---|---|
| Normal Operation Pin Description | Network Monitoring Mode (uplink) |
| NM N__00 | Mxx__TXD \|0\| |
| NM N__01 | Mx) (TXD \|1\| |
| M N__02 | xx_T \|2\| XD \|\| |
| NM N__03 | Mxx__TXD \|3\| |
| NM N__04 | Mxx__TXEN |
| NM N__5 | Mxx__TX LK |
| NM O 06 N | Mxx PEED |

For 100 Mbps monitoring, network monitoring signals will be provided for Rx as shown in Table 8 below. The NMON register option bits are: MONRxTX=0, MONVVIDE=1.

TABLE 8

| Normal Operation Pin Description | Network Monitoring Mode a link |
|---|---|
| NM\| __00 | xx RXD \|0\| |
| NM N__01 | M)oc \|1\| RXDI |
| NM N__02 | Mxx__\|2\| RXD \|\| |
| NM N__03 | Mxoc\|3\| __RXD\| \| |
| NM N__04 | xx RXD \| V\| |
| NM N__05 | M)oc__R LK |
| MN 06 | MXoc PEED |

Referring now to FIG. 32, there may be seen a simplified block diagram of the network monitoring port. More particularly, it may be seen that it consists of a final multiplexer (mux) 1342 for Rx(N selection only in the 10/100 mode, whose output is the output of the network monitoring mug block of FIG. 1 and whose outputs were described earlier herein. The two inputs are the latched 1344 and unlatched outputs of a 15 to 1 mux 1346 that selects the port to be monitored, based upon values in the control register. Note that ports 0–2 are operated in the 10 Mbps mode, Representative MACS 120 are shown connected to the inputs of the 15 to 1 mux 1346. RX signals will be latched 1344 and provided 1 RX Clock cycle delayed. TX signals are the same as the TX pins (no latching).

All frames less than 64 bytes, received into any port will be filtered by the circuit within the receiving FIFOs, they will not appear on the DRAM bus.

The circuit 200 has the ability to handle frames up to 1531 bytes, to support 802.1Q. This is selected by setting the LONG option bit in the SYSCTRL register. Setting this bit will cause all ports to handle giant frames. The statistics for giant frames will be recorded in the Rx+Tx-frames 1024–1518 statistic (which will become Rx+Tx-frames 1024–1531 with this option selected).

If possible a MAC will filter errored RX frames (CRC, alignment, Jabber etc.). This is only possible if the frame in question is not cut-through. A frame may be non-cut-through if its destination is busy. The error will be recorded in the relevant statistic counter with all used buffers being recovered and returned to the free Q.

The measurement reference for the interframe gap of 96 gs, when transmitting on at 10 Mbps, is changed, dependent upon frame traffic conditions. If a frame is successfully transmitted (without collision), 96 gs is measured from Mxx TXEN. If the frame suffered a collision, 96 p is measured from MM CRS.

Each Ethernet MAC 120,122,124 incorporates Adaptive Performance Optimization (APO) logic. This can be enabled on an individual basis by setting the TXPACE bit, (bit 1) of the Port Control registers. When set the MACS use transmission pacing to enhance performance (when connected on networks using other transmit pacing capable MACs). Adaptive performance pacing, introduces delays into the normal transmission of frames, delaying transmission attempts between stations and reducing the probability of collisions occurring during heavy traffic (as indicated by frame deferrals and collisions) thereby increasing the chance of successful transmission.

Whenever a frame is deferred, suffers a single collision, multiple collisions or excessive collisions, the pacing counter is loaded with the initial value loaded into the PACTST register bits 4:0. When a frame is transmitted successfully (without experiencing a deferral, single collision, multiple collision or excessive collision) the pacing counter is decremented by one, down to zero.

With pacing enabled, a frame is permitted to immediately (after one IPG) attempt transmission only if the pacing counter is zero. If the pacing counter is non zero, the frame is delayed by the pacing delay, a delay of approximately four interframe gap delays.

A CPU 600 via an Ethernet MAC 120' or suitable protocol translating device can be directly connected to one of the circuit's ports for use with SNMP as depicted in FIG. 33.

The Transmit Mx) logic signals for a 10 Mbps port are depicted in FIG. 34. FIG. 34 depicts a normal, ethernet frame (DA, SA, data, CRC) on Mxx TXD that is framed by the rise and fall of Mxx TXEN, and with the rise and fall of NM TXEN framed by the rising edge of Mxx TCLK.

The Receive (Rx) logic signals for a 10 Mbps port are depicted in FIG. 35. FIG. 35 depicts a normal ethernet frame (DA, SA, data, CRC) on Mxx TXD that is framed by the rise and fall of Mxx CRS, and with the rise and fall of MXX CRS framed by the rising edge of Mxx TCLK.

Figure 36:
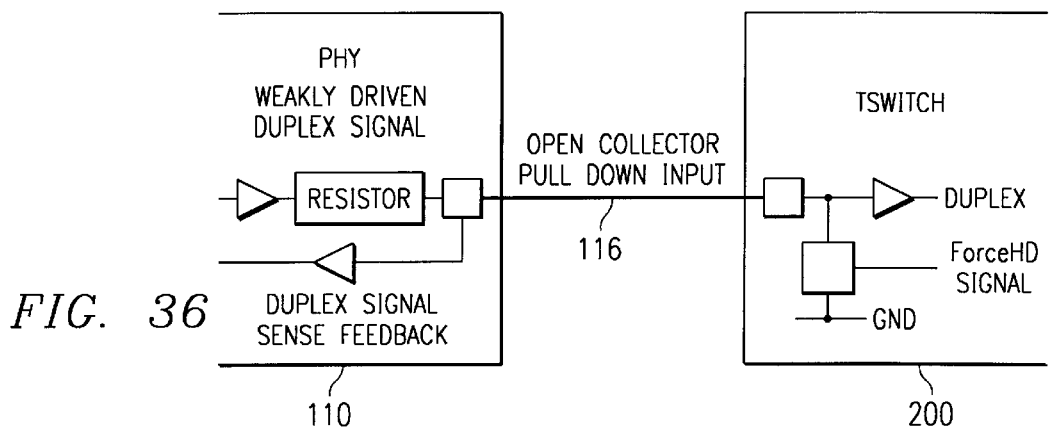
FIG. 36 depicts the Mxx DUPLEX pins implemented as inputs with active pull down circuitry for the circuit of FIG. 1.

As depicted in FIG. 36, the Mxx DUPLEX pins are implemented as inputs with active pull down circuitry, producing a 'pseudo' bi-directional pin.

An external PHY can weakly drive the DUPLEX line high, indicating an intention for duplex operation. The circuit can override this DUPLEX pin input by pulling the line low. This is detected by the PHY, which monitors the sense of the DUPLEX signal, causing it to operate in a Half Duplex mode. Thus, the circuit 200 can force the PHY into half duplex operation when desired (during testing for example).

If the PHY is to be driven only in half duplex operation, a pull down resistor should be permanently attached to the DUPLEX signal.

If the PHY is to be operated in Full Duplex (with the option of forcing half duplex), a pull up resistor should be placed on the DUPLEX signal. If the PHY is to operate in auto negotiate mode, no external resistor should be added, allowing the PHY to control the DUPLEX signal.

Figure 37:
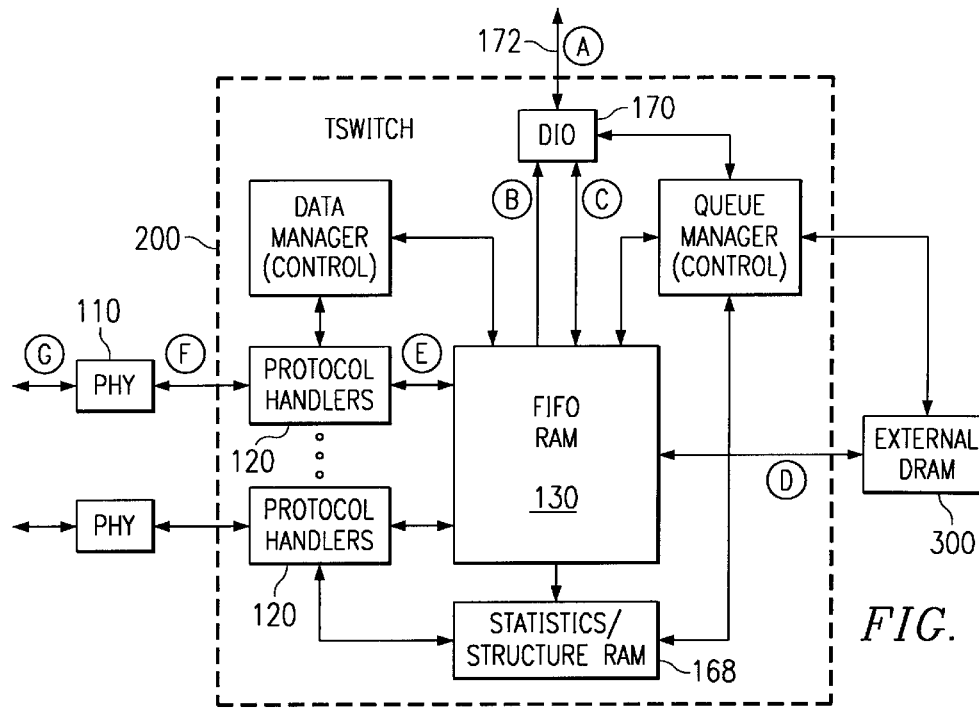
FIG. 37 depicts a testing sequence for the circuit of FIG. 1.

FIG. 37 depicts a sequence of testing. This sequence of tests is aimed at simplifying burn-in testing, system level testing and debug operations. All tests are based on an incremental approach, building upon tested truths before reaching the final goal. For tests using the DIO interface for example, the external DIO interface should be tested (step A) first, and once found to be functioning correctly, the next depth of testing can be performed (i.e. internal circuit testing), (such as step B followed by Steps C–G). If a test fails using this methodology the cause of the failure can be determined quickly and test/debug time can be reduced. The protocol handlers 120 in FIG. 37 are the MACS 120 of FIG. 1.

Figure 38:
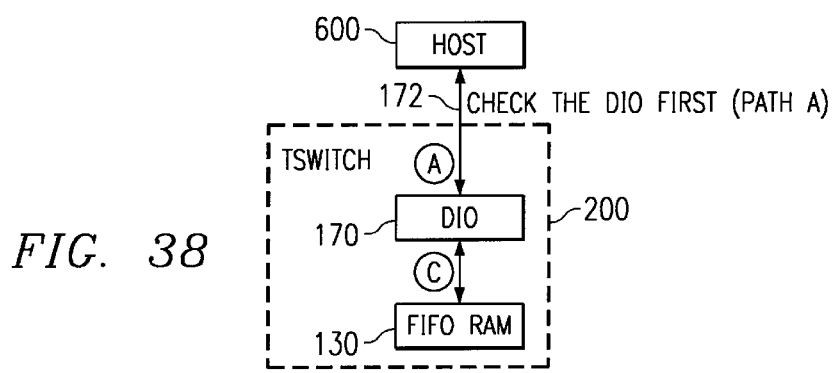
FIG. 38 depicts how in step A the DIO registers can be written to and read from directly from the pin interface for the circuit of FIG. 1.

As depicted in FIG. 38, for step A the DIO registers can be written to and read from directly from the pin interface. This level of testing is trivial, but essential before continuing to test the internals of the circuit.

When implementing an architecture that employs embedded RAM structures, it is necessary to ensure test access over and above JTAG connectivity testing via standard interfacing. The DIO interface used by the circuit enables the system/user to interrogate the internal RAMS of the circuit, giving the required observability for the RAMS themselves and the data they contain.

RAM test access is desirable at all levels of testing. Silicon production level to enable defective devices to be filtered. System production level to permit diagnostic testing to be performed. In the field, permitting diagnostic and debug to be performed.

FIFO RAM access for test is provided via the DIO interface. This allows full RAM access for RAM testing purposes. Access to the FIFO shall only be allowed following a soft reset and before the start bit is written (or after power up and before the start bit is written). The soft reset bit should be set then immediately reset, if the soft reset bit is not cleared, the circuit will hold the DRAM refresh state machine in reset and the contents of the external memory will become invalid.

To access the FIFO RAM from the DIO, bytes are written to a holding latch the width of the RAM word (72 bits). Because of this latch between the FIFO RAM and the DIO, whenever a byte is accessed, the whole word is updated in FIFO RAM. If the same pattern is to be loaded throughout the memory, it only requires a new FIFO RAM address to be set up between accesses on a single byte within the word, the data in the latch will not change. (i.e. a read—modify—write is not performed)

Test access to the statistics RAM 168 is provided via the DIO port after the circuit has been soft reset (or following power before the start bit has been set). In this mode all locations of the RAM can be written to and read from. Once the start bit has been set, only read access is permitted to the RAM. When asserting soft reset, it is important to clear the soft reset bit immediately after setting it. This ensures the DRAM refresh state machine is not held at reset. If held at reset normal DRAM refreshes will fail to occur resulting in the DRAM contents becoming invalid.

To access the statistics RAM 168 from the DIO, bytes are written to a holding latch the width of the RAM word (64 bits). Whenever a byte is accessed, the whole word is updated in RAM. If the same pattern is to be loaded throughout the memory, it only requires a new statistics RAM address to be set up between accesses on a single byte within the word, the data in the latch will not change. (i.e. a read—modify—write is not performed)

Frame wrap mode, allows the system/user to send a frame into a designated source port, selectively route the frame successively to and from ports involved in the test or return the frame directly, before retransmitting the frame on the designated source port. By varying the number of ports between which the frame is forwarded, the potential fault capture area can be expanded or constrained. Initially, it is desirable to send data to and from each port in turn, allowing the MAC (protocol handler) to FIFO interface, and MAC pins to be tested for each port.

The tircuit 200 provides an internal loopback test mode. Internal loopback allows the frame datapath to be tested, and is useful for individual die burn in testing and system testing with minimal. reliance on external parts. Internal loopback is selected by suitably setting the INTVVRAP field of the DIATST register described later herein. Port 00 (uplink), Port 02 or Port 14 can be selected as the source port for injecting frames into the circuit when internal wrap is selected. All other ports will be set to internally wrap frames.

As depicted in FIG. 39, by injecting broadcast or multicast frames into the source port (port 0) and suitably setting the ULAN registers, frames can be forwarded between internally wrapped ports before transmission of the frame from the source port.

The operational status of the PHY or external connections to the circuit do not have to be considered or assumed good, when in the internal loopback mode.

The internal RAM access will only infer that both DIO port and Internal RAM structures are functioning correctly. It doesn't provide information on circuit's data paths to and from the RAMS during normal frame operations or an indication of the control path functionality. To assist with this, further tests proposed are:

DRAM access—proves the data path between FIFO and DRAM is functioning, as are certain sections of the queue manager and FIFO state machines
  Frame forwarding—frame data is forwarded from one port to the next using a loop back mode. This builds on the previous tests, and tests that the data path to and from the MACS and control paths are operational. The number of ports that take part in frame forwarding can be controlled using the ULAN registers, allowing any number of ports to be tested in this mode. Single connections can be tested allowing individual MAC data paths to FIFO connections to be tested or multiple port testing allowing for reduced system test time.

Using the incremental test approach, once the FIFO has been tested and verified, the data path to and control of the external DRAM memory should be verified.

DRAM writes are carried out by first constructing a buffer in the FIFO (64 data bytes), then initiating a buffer write from the FIFO to the DRAM. The buffer is transferred as for a normal buffer transfer in a 17 write DRAM burst. The forward painter field is mapped to the DRAM data register, the flag data fields are mapped to the DRAM flag register.

Reading from the DRAM performs a buffer transfer to the FIFO from which individual bytes can be read (and tested) via the DIO interface. The flag bytes and forward pointer bytes are transferred from the DRAM to the DRAM-data and DRAM-flag registers for reading.

The buffer transfer mechanism when operated in DRAM test access mode does not check the flag status. No actions will be performed depending on the status of the flags. The transfer is purely a test data transfer with no attempt made to comprehend flag contents.

After completion of the DRAM testing, the tircuit should be reset before normal switching activity is resumed. This ensures the circuit is returned to a defined state before normal functionality is resumed. This mechanism is primarily intended for DRAM testing and not as part of a breakpoint/debug mechanism. More information about the Test Registers is provided later herein.

Similar to internal wrap mode, the ports can be set to accept frame data that is wrapped at the PHY as depicted in FIG. 40. This permits network connections between the circuit and the PHY to be verified. Any port can be the source port (not just port 00 as illustrated). By using multicastJbroadcastframes, traffic can be routed selectively between ports involved in the test or return the frame directly, before retransmission on the uplink. Software control of the external PHYs will be required to select loopback.

The External Frame Wrap Test Mode is selected by setting the FDWRAP bit (bit 3) of the DIATST register. When selected the port is forced into FULL DUPLEX allowing it to receive frames it transmits. Note most external PHYs do not assert DUPLEX in wrap mode.

By using broadcast or multicast frames and suitably setting the ULAN registers, frames can be forwarded between internally wrapped ports before transmission from the frame the source port.

The circuit 200 is fully JTAG compliant with the exception of requiring external pull up resistors on the following pins: TDI, TMS and TRST. To implement internal pull-up resistors, the circuit would require the use of non-5v tolerant input pads. The use of 5v tolerant pads is more important for mixed voltage system boards, than to integrate the required pull up resistors required to be in strict compliance with the JTAG specification. Strict compliance with the JTAG specification is not claimed for this reason. Clearly, other choices may be made.

Mandatory: EXTEST, BYPASS & SAMPLE/PRELOAD
Optional Public: HIGHZ & IDCODE
Private: ATPG & SELF EXERCISE

| Instruction Name | JTAG Opcode |
|---|---|

The opcodes for the various instructions (4 bit instruction register) are noted in Table 9 below.

TABLE 9

| Instruction Type | | |
|---|---|---|
| Mandato | EXTEST | 0000 |
| Mandato | SAMPLE I PRELOAD | 0001 |
| Private | ATPG | 0010 |
| Private | SELF EXERCISE | 0011 |
| Optional | IDCODE | 0100 |
| Optional | HIGHZ | 0101 |
| Mandato | BYPASS | 1111 |

In ATPG mode all the flip flops are linked into a scan chain with TDI and TDO as the input and output respectively. Clocked scan flip flops are used to implement the chain.

In Self Exercise mode, taps are taken off the 19th and 21st flip flops in the scan chain, XOR'ed and fed back to the start of the scan chain. This causes the scan chain to act as a linear feedback shift register. This is useful during life testing.

The IDCODE format is depicted in FIG. 41 and consists of a four bit variant field, a 16 bit part number field, a 12 bit manufacturer field, and a 1 bit LSB field.

In both ATPG and SELF EXERCISE modes, pin EAK-00 can be used to control the RNW signals to each of the embedded RAMS.

Parallel Module Test uses the JTAG TAP controller during testing to control test access to the embedded RAM blocks directly from the external pins.

When selected, external pin inputs will be multiplexed to drive the embedded RAM inputs directly, while the embedded RAM outputs are multiplexed onto output pins. Four embedded ram cells are used to implement the two internal circuit memory maps. Only one embedded ram cell may be tested using PMT, reducing the routing overhead otherwise incurred.

Four instructions are used to implement parallel module test mux out the pins of one of the four rams to top level pins as set forth in Table 10 below.

TABLE 10

| Instruction Type | Instruction Name | JTAG O code | Description |
|---|---|---|---|
| Private | MUX_FIFO_R AM_LO | 0110 | Provide Parallel Module Test PMT access to the low FIFO ram |
| Private | MUX FIFO_ RAM_ HI | 0111 | Provide PMT access to the high FIFO ram |
| Private | MUX STAT_ RAM_ LO | 1000 | Provide PMT access to the low FIFO ram |
| Private | MUX STAT_ RAM_ HI | 1001 | Provide PMT access to the high FIFO ram |

Parallel Module test is intended for production testing only. It is not envisaged that target system hardware will make use of this functionality. During normal system operation, internal RAM access can be effected using the DIO interface, after power-up or soft reset and prior to setting the start bit.

The circuit 200 preferably uses EDO DRAM with an access time of 60 ns. The DRAM interface requires extended data out to simplify the DRAM interface and maintain a high data bandwidth.

Figure 42:
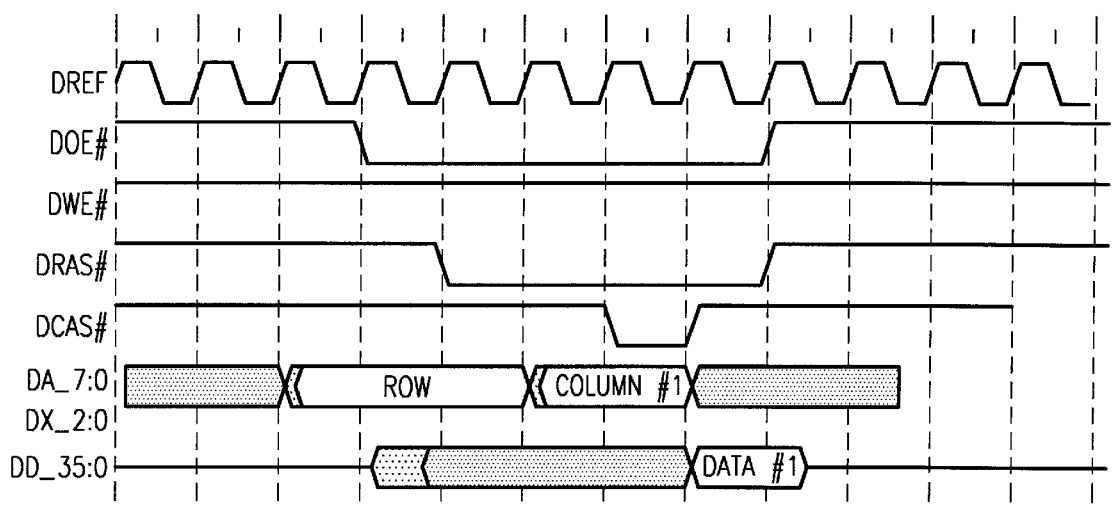
FIG. 42 is a signal timing diagram illustrating a single DRAM read for the circuit of FIG. 1.

FIG. 42 depicts a single DRAM read (next free buffer access). All DRAM signals are synchronous to the DREF clock signal, with preferably a maximum. ins delay from the rise of DREF to the signals being valid.

Data from the DRAM, must be stable and valid preferably after a maximum of 25 ns from the DREF edge coincident with CAS falling. The data is preferably held stable until ins after the next rising edge of DREF.

Figure 43:
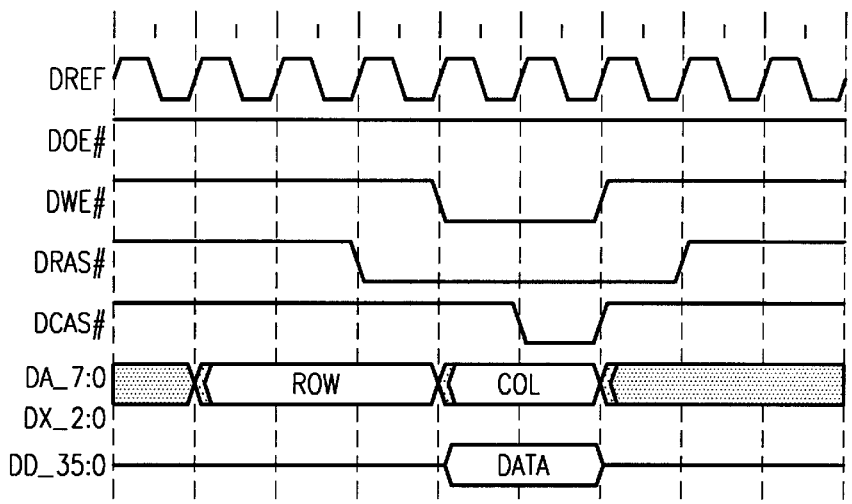
FIG. 43 is a signal timing diagram illustrating a single DRAM write for the circuit of FIG. 1.

FIG. 43 depicts a single DRAM write (forward pointer update). All DRAM signals are synchronous to the DREF clock signal, with a maximum ins delay from the rise of DREF to the signals being valid.

Figure 44:
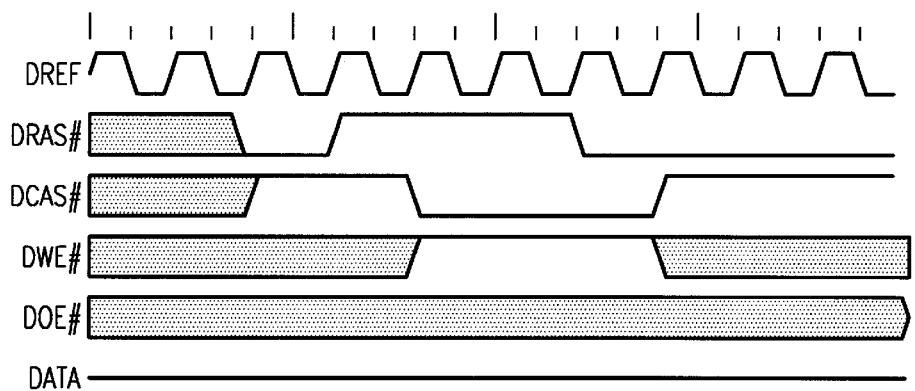
FIG. 44 is a signal timing diagram illustrating CAS before RAS refresh for the circuit of FIG. 1.

As depicted in FIG. 44, the circuit uses CAS before RAS refresh for simplicity. A refresh counter will be decremented causing periodic execution of CAS before RAS refresh cycles. A refresh operation must be performed at least once every 16 ms to retain data All DRAM signals are synchronous to the DREF clock signal, with a maximum ins delay from the rise of DREF to the signals being valid.

Figure 45:
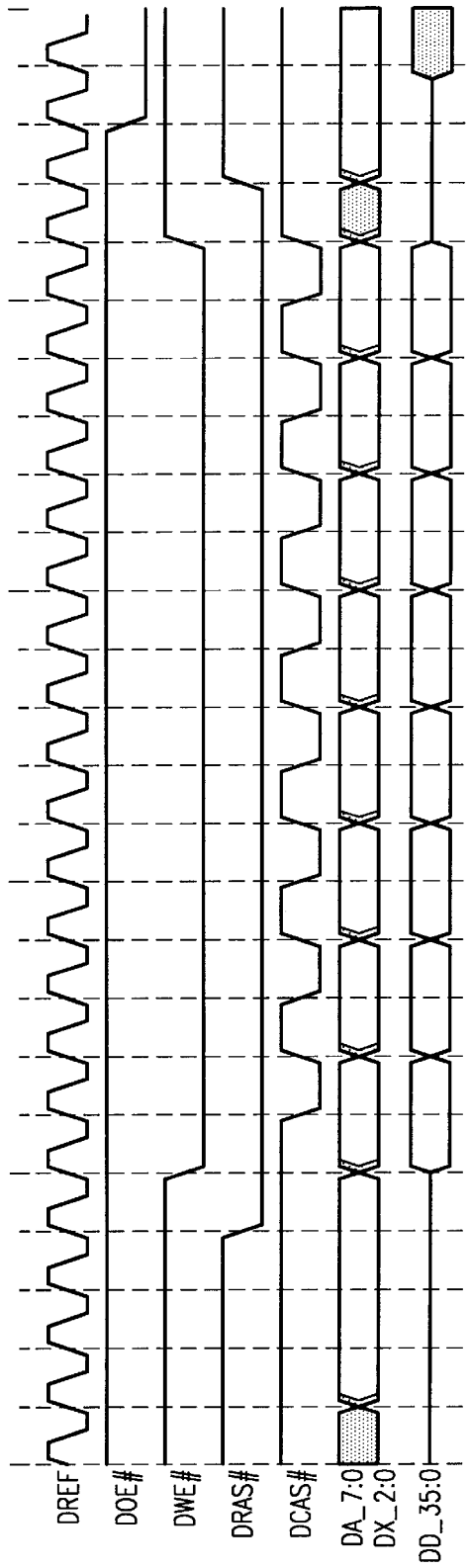
FIG. 45 is a signal timing diagram illustrating a series of eight write cycles for the circuit of FIG. 1.
Figure 46:
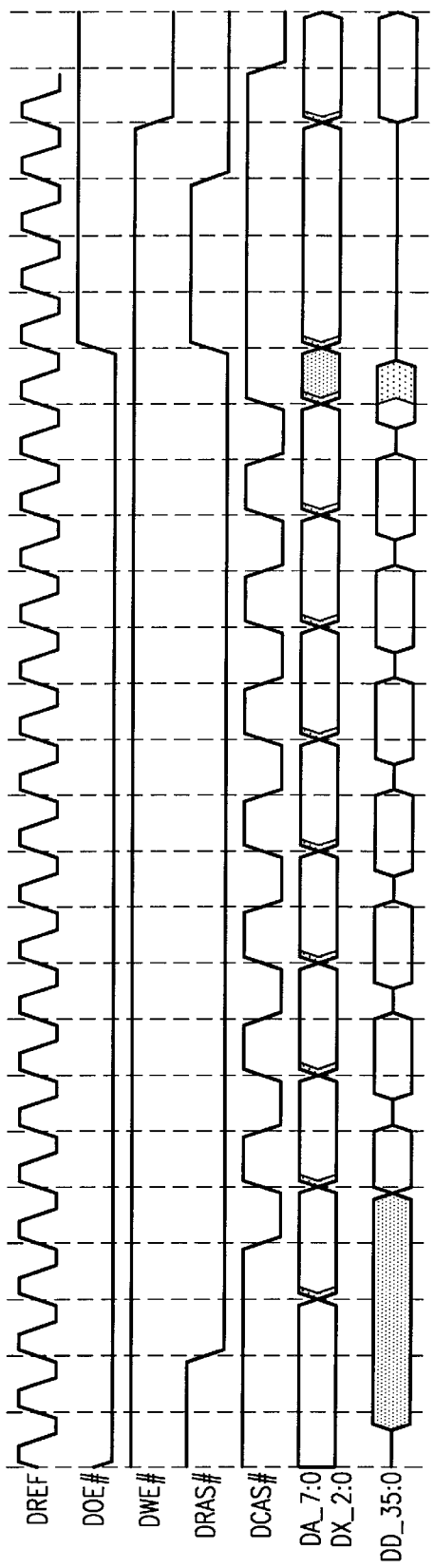
FIG. 46 is a signal timing diagram illustrating a sequence of eight read cycles for the circuit of FIG. 1.

FIG. 45 depicts a series of eight write cycles (buffer access uses 17 write cycles). FIG. 46 depicts a sequence of eight read cycles (buffer access uses 17 read cycle).

All DRAM signals are synchronous to the DREF clock signal, with a maximum ins delay from the rise of DREF to the signals being valid.

Data from the DRAM (Read Cycle), must be stable and valid after a m 3~;murn of 25 ns from the DREF edge coincident with the first and following CAS falling edges. The data must be held stable until ins after the next rising edge of DREF.

Figure 47:
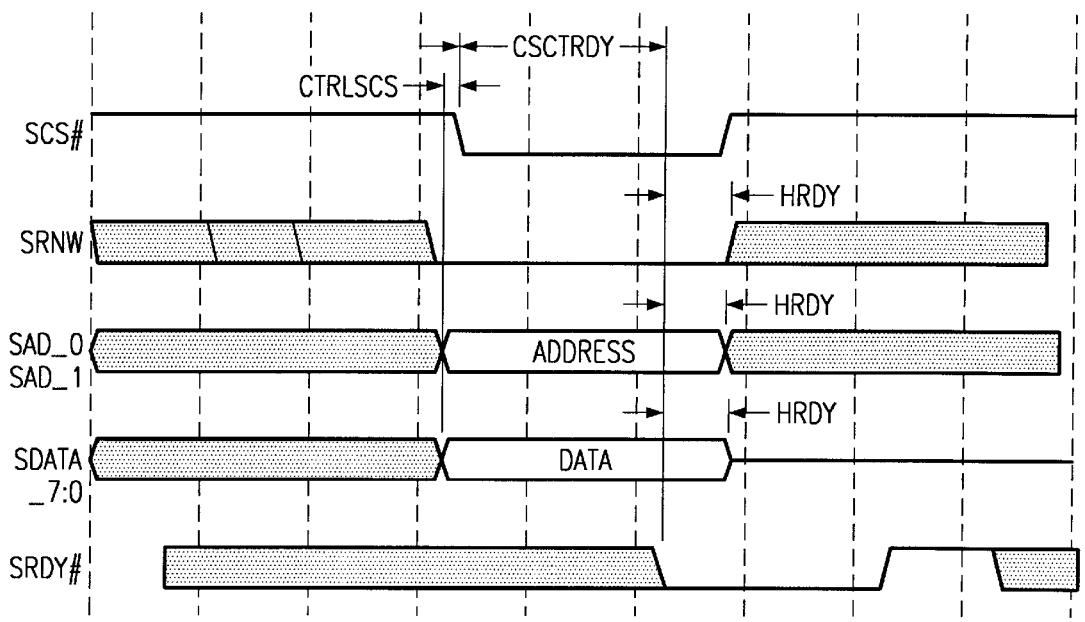
FIG. 47 depicts the DIO interface timing diagram for a write cycle for the circuit of FIG. 1.

The DIO interface has been kept simple and made asynchronous, to allow easy adaptation to a range of microprocessor devices and computer system interfaces. FIG. 47 depicts the DIO interface tinning diagram for a write cycle.

In particular, for a write cycle:

Host register address data SAD_1:0 and SDATA 7:0 are asserted, SRNW is taken low.

After setup time, SCS# is taken low initiating a write cycle.

Pull SRDY# low as the data is accepted, SDATA 7:0, SAD-1:0 and SRNW signal can be deasserted after the hold time has been satisfied.

SCS# taken high by the host completes the cycle, causing SRDY # to be deasserted, SRDY# is driven high for one cycle before tristating.

TABLE 11

| Name | Min | Max | Comment |
|---|---|---|---|
| ctriscs | 0 | — | Control Sginal Setu to SCS# |
| tdd | 0 | — | Delay to data driven after SRDY# low |
| hrdy | 0 | — | Minimum hold time after SRDY# low |
| scsh | 40 | — | Minimum SCS# high |

Table 11 illustrates some of the timing requirements for portions of FIG. 47.

Figure 48:
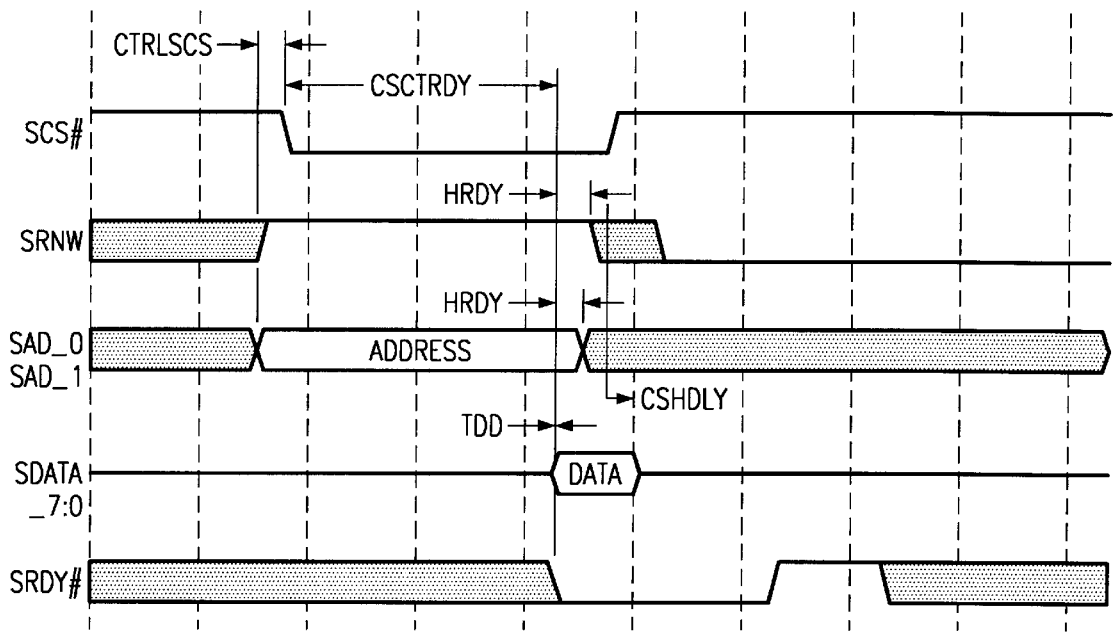
FIG. 48 depicts the DIO interface timing diagram for a read cycle for the circuit of FIG. 1.

FIG. 48 depicts the DIO interface timing diagram for a read cycle.

In particular, for a read cycle:

Host register address data is placed on address pins SAD-1:0 while SRNW is held high.

After setup time, SCS # is taken low initiating the read cycle.

After delay time, cstdr from SCS# low, SDATA 7:0 is released from tristate.

After delay time, cstrdy from SCS# low, SDATA 7:0 is driven with valid data and SRDY# is pulled low. The host can access the data.

SCS # taken high by the host, signals completion of the cycle, causes SRDY# to be deasserted, SRDY# is driven high for one clock cycle before tristating, SDATA_7:0 are also tristated.

TABLE 12

| Name | Min | Max | Comment |
|---|---|---|---|
| ctriscs | 0 | — | Control Sginal Setu to SCS# |
| tdd | 0 | — | Delay to data driven after SRDY# low |
| hrdy | 0 | — | Minimum hold time after SRDY# low |
| scsh | 40 | — | Minimum SCS# high |
| cshdly | 0 | — | Hold required after SCS#hi h |

Table 12 illustrates some of the timing requirements for portions of FIG. 48.

To determine the start of frame, the external address hardware must test bit 35 of the forward pointer and decode the first flag nibble placed on the external memory data bus. Bit 35 should be '0' indicating a valid data frame start as opposed to an IOB link buffer transfer. By using the DCAS signal, the destination address and source address of the frame can be extracted for external processing.

Figure 49:
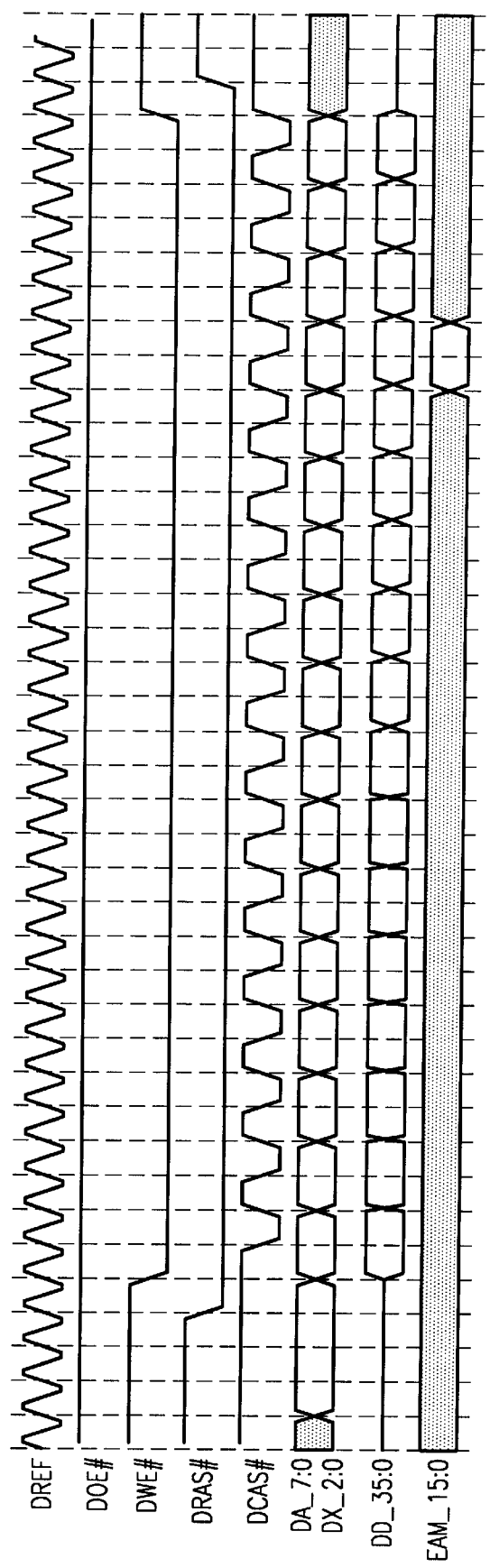
FIG. 49 is a signal timing diagram illustrating that the EAM-14:0 pins must be valid by the start of the 14th memory access for the circuit of FIG. 1.

The channel destination can be returned in one of two methods. If only one port address is to be specified (effectively a unicast), the EAM_15 (MODE_SELECT) signal can be asserted, and a 5 bit port code placed on EAM_04:00. If a group multicast is required, the channel bit map is applied directly to the EAM interface with EAM-15 (MODE SELECT) low. The EAM-14:0 pins must be valid by the start of the 14 th memory access as depicted in FIG. 49. All signals in the external address checking interface will be synchronous with the DREF clock.

Figure 50:
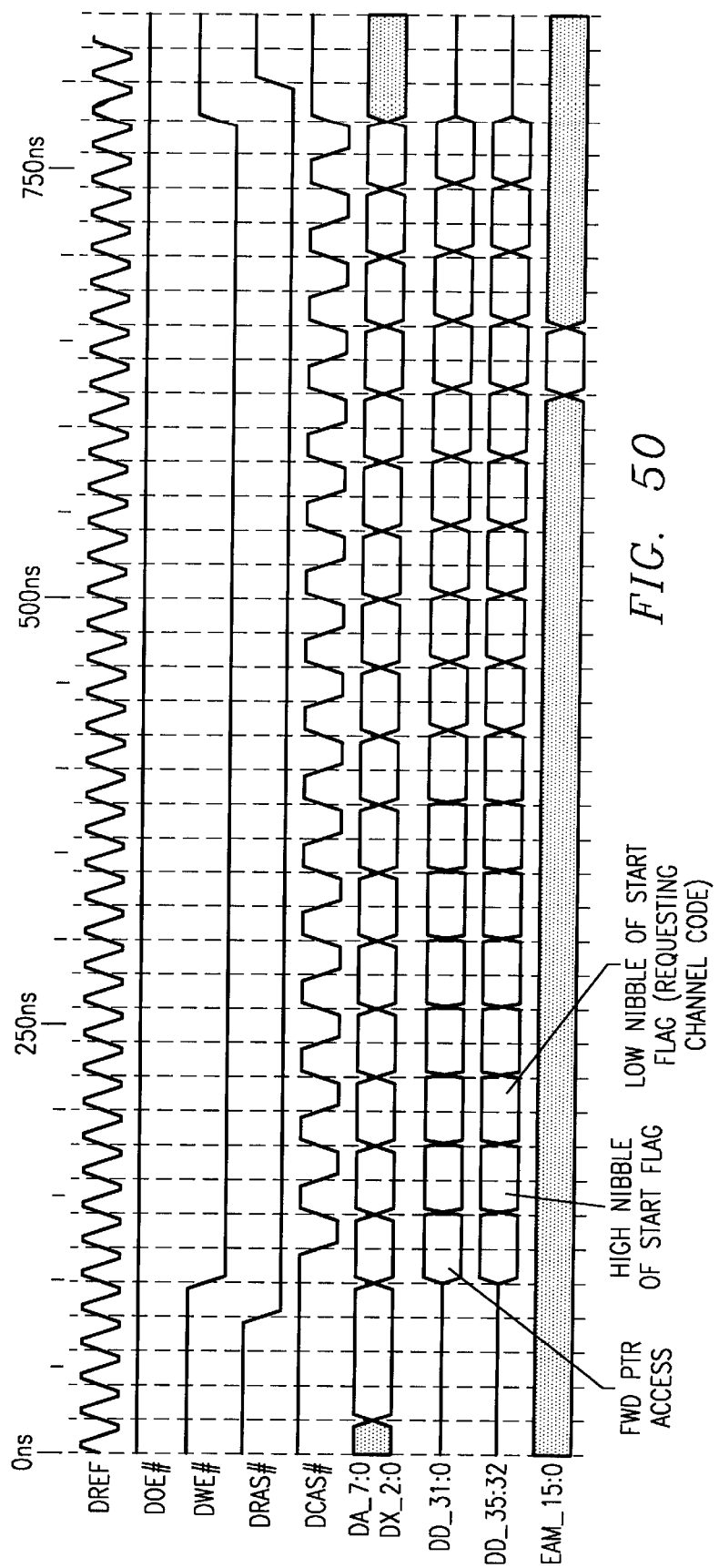
FIG. 50 is a signal timing diagramming illustrating a DRAM buffer access at the start of a frame for the circuit of FIG. 1.

Referring now to FIG. 50, there may be seen the DRAM buffer access at the start of a frame, illustrating the start of frame flag ordering.

Figure 51:
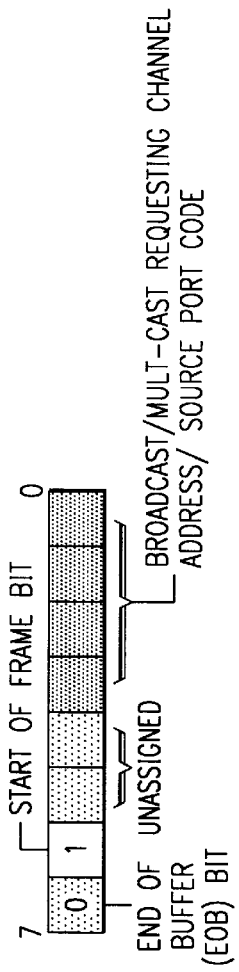
FIG. 51 depicts the start of frame format for the flag byte for the circuit of FIG. 1.

FIG. 51 depicts the start of frame format for the flag byte.

Figure 52:
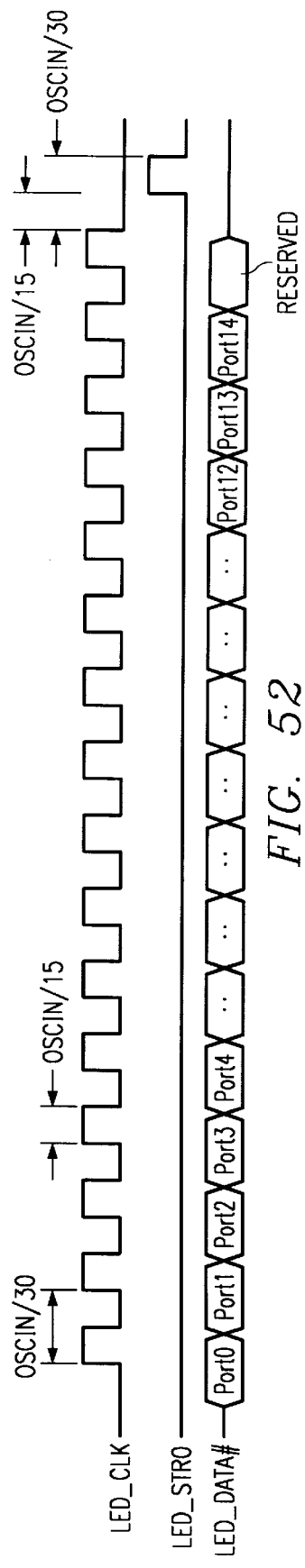
FIG. 52 depicts the LED timing interface for the LED status information for the circuit of FIG. 1.

FIG. 52 depicts the LED timing interface for the LED status information.

Figure 53:
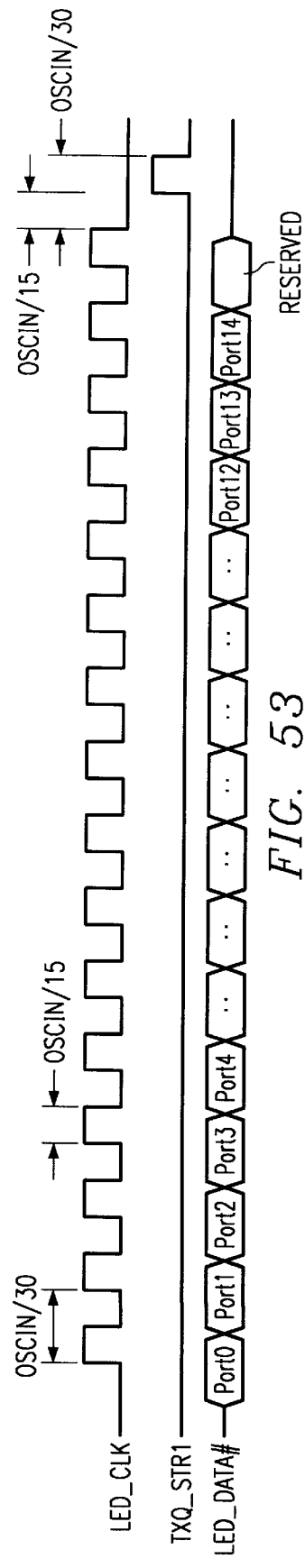
FIG. 53 depicts the LED timing interface for the TxQ status information for the circuit of FIG. 1.

FIG. 53 depicts the LED timing interface for the TxQ status information.

The LED STRI signal will only be pulsed when there has been a change in status for any of the TXQs. An external system monitoring this signal, can use it as a trigger to investigate which TxQ has become congested or has recovered from congestion.

Figure 54:
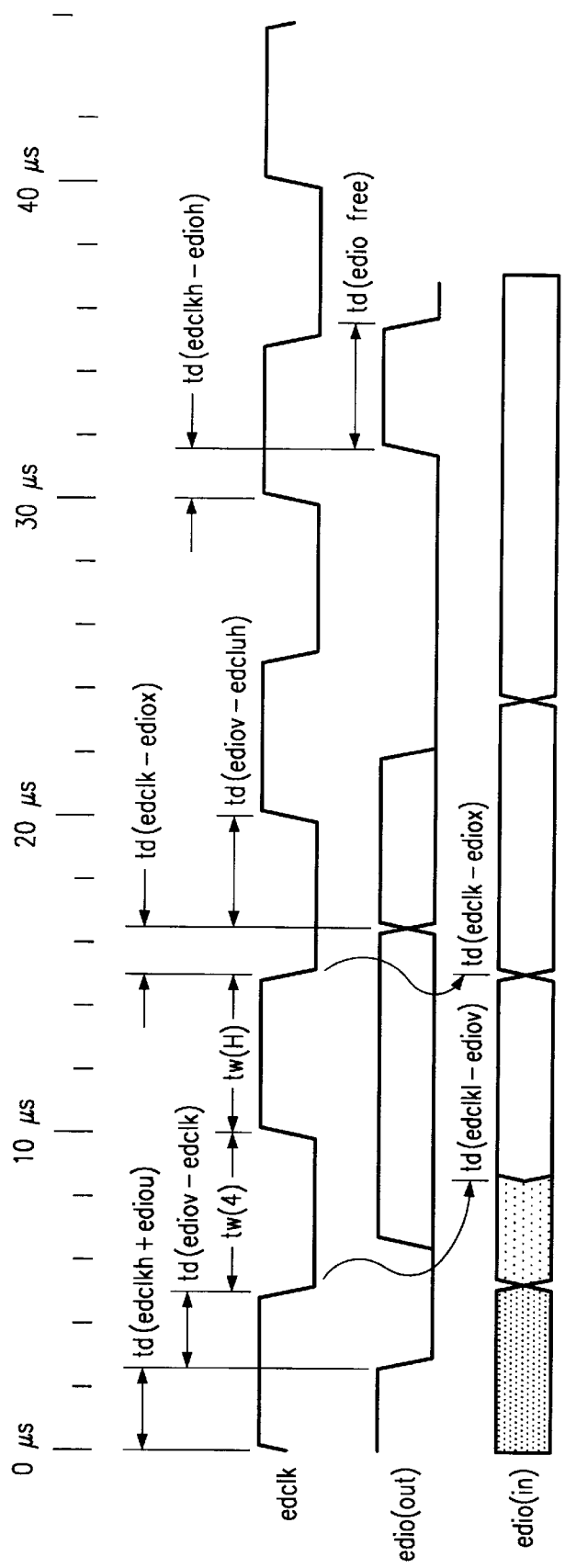
FIG. 54 depicts the EEPROM interface timing diagram for the circuit of FIG. 1.

FIG. 54 depicts the EEPROM interface timing diagram. Table 13 illustrates some of the timing requirements for portions of FIG. 54.

TABLE 13

| Name | Min | Max | Unit | Description |
|---|---|---|---|---|
| ECLK | 0 | 100 | Hz | Clock Frequency ECLK |
| tw(L) | 4.70 | | us | Low eriod clock |
| tw H | 4 | | us | High period clock |
| td ECLKL-EDIOV | 0.3 | 3.50 | us | ECLK low to EDIO data in valid |
| td(ECLKL-EDIOX) | 0.3 | | us | Delay time, ECLK low to EDIO changing data in hold time |
| td(EDIO free) | 4.7 | | us | Time the bus must be free before a new transmission can start |
| td(ECLKH-EDIOV | 4.7 | | us | Delay time ECLK high to EDIO valid start condition setu time |
| td(ECLKH-EDIOH | 4.7 | | us | Delay time ECLK high to EDIO high( sto condition setu time |
| td(ECLKI-EDIOX) | 0 | | us | Delay time ECLK low to EDIO changing data out hold time |
| td(EDIOV-ECLKL) | 4 | | us | Delay time EDIO valid after ECLK low (start conditon hold time for the EEPROM |
| td(EDIOV-ECLKH | 0.25 | | us | Delay time EDIO valid after ECLK high data out setu time |

For further information on EEPROM interface timing, refer to the device specification.

Figure 55:
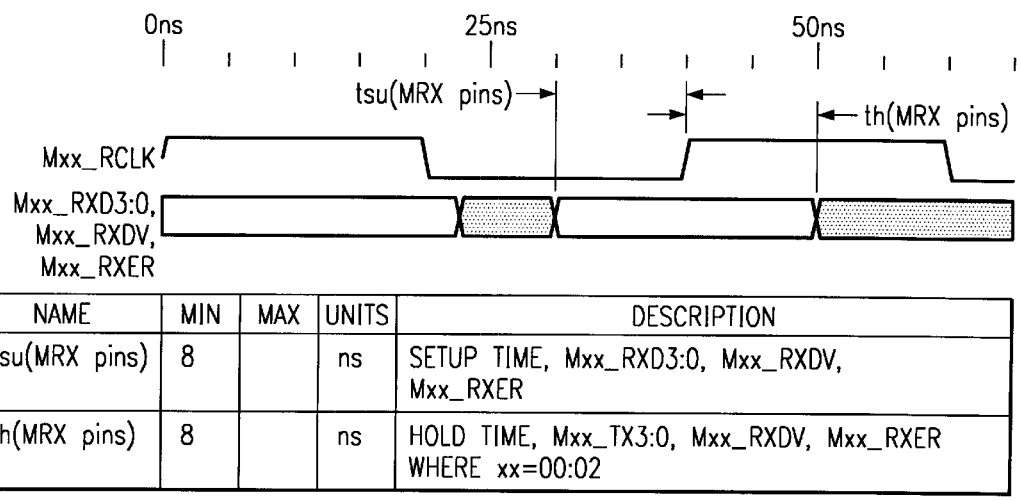
FIG. 55 depicts the 100 Mbps receive interface timing diagram and includes some of the timing requirements for the circuit of FIG. 1.

FIG. 55 depicts the 100 Mbps receive interface timing diagram and includes some of the timing requirements for portions of FIG. 55.

Both Mxx-CRS and McK-COL are driven asynchronously by the PHY. Mxx_RXD3:0 is driven by the PHY on the falling edge of Mxx RCLK. Mxx_RXD3:0 timing must be met during clock periods where Mxx RXDV is asserted. Mxx RXDV is asserted and deasserted by the PHY on the falling edge of Mxx RCLK. Mxx RXER is driven by the PHY on the falling edge of Mxx RCLK. (Where xx=00:02)

The above applies to the Uplink (port 00) when operating in 200 Mbps mode, with the exception that Mxx_RXD3:0 becomes Mxx RXD7:0 and an additional signal Mxx RXDVX is introduced. The same tsu and timing specifications will be enforced for the 10 Mbps input signals.

Figure 56:
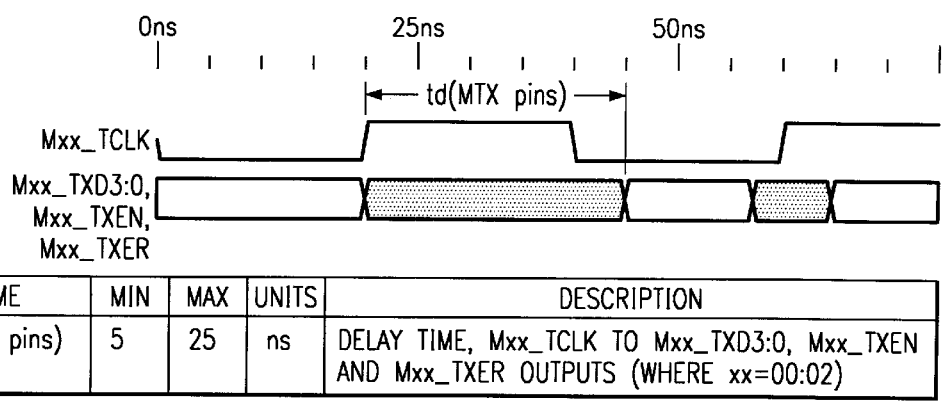
FIG. 56 depicts the 100 Mbps transmit interface timing diagram and includes some of the timing requirements for the circuit of FIG. 1.

FIG. 56 depicts the 100 Mbps transmit interface timing diagram and includes some of the timing requirements for portions of FIG. 56.

Both Mxx_CRS and Mxx COL are driven asynchronously by the PHY. Mxx_TXD3:0 is driven by the reconciliation sublayer synchronous to the Mxx TCLK. Mxx TXEN Is asserted and deasserted by the reconciliation sublayer synchronous to the Mxx TCLK rising edge. Mxx TXER is driven synchronous to the rising edge of Mxx TCLK. (Where xx=00:02)

The above applies to the Uplink (port 00) when operating in 200 Mbps mode, with the exception that Mxx TXD3:0 becomes Mxx TXD7:0. The same timing specification will be enforced for the 10 Mbps output signals.

As noted earlier herein in reference to FIG. 15, access to the internal registers of the circuit is available, indirectly, via the four host registers that are contained in the circuit. Table 2 below identifies these four host registers and the signal combination of SAD_1 and SAD-0 for accessing them.

TABLE 2

| SAD-1 | SAD-P | Host Register |
|---|---|---|
| 0 | 0 | DIO_ADR_LO |
| 0 | 1 | DIO_ADR_HI |
| 1 | 0 | DIO_DATA |
| 1 | 1 | DIO DATA-INC |

More particularly, the four host registers are addressed directly from the DIO interface via the address lines SAP-1 and SAD 0. Data can be read or written to the address registers using the data lines SDATA 7:0, under the control of Chip Select (SCS#), Read Not Write (SRNW) and Ready (SRDY#) signals. The details of the DIO Address Register DIO_ADR) are provided in Table 29 below.

| DIO_ADR HI | | | | | | DIO ADR LO | | | | |
|---|---|---|---|---|---|---|---|---|---|---|
| 15 14 13 12 11 | 10 | 9 | 8 | 7 | 6 | 5_4 | 3 | 2 | 1 | 0 |
| RAM RAM SEL MAP | | | | | | ADR_SEL | | | | |
| Bit Name | | | | | | Function | | | | |
| 15 RAM SEL | | | | | | RAM Address Select: When this bit is set to a one DIO accesses are to the Internal SRAMs, if this bit is set to a zero DIO accesses are to Internal TSWITCH registers. | | | | |
| 14 thru 13 RAM MAP | | | | | | Internal SRAM mapping select bits. 00-Statistics Ram access 01-FIFO Ram access (FIFO block 3) fifo 13 – 14 10-FIFO Ram access (FIFO block 1), fifo 15 + fifo 0–4 11-FIFO Ram access (FIFO block 2), fifo 5 – fifo 12 When the RAM-MAP field 00, accesses are to the STATISTICS SRAM. When non-zero one of three different fields of the FIFO RAM is accessible. The FIFO SRAM can only be accessed whilst TSWITCH is reset (RESET in the system control register is set to one). Accesses to the SRAM whilst TSWITCH is not reset are undefined: writes will be ignored and reads will return unknown data | | | | |

This field contains the internal DIO address to be used on thru ADR SEL subsequent accesses to the D10 DATA or DIO DATA-INC registers. This field will auto-increment (by one) on all accesses to the D10-DA TA INC register.

For Register accesses the M.S. 6 bits (12 to 8) of ADR SEL are ignored. The L.S. 8 bits (7 to 0) indicate the DIO address of the register.

For FIFO RAM accesses the M.S. 10 bits (12::4) indicate the RAM Row address, and the L.S. 4 bits (2::0) indicate the RAM word address of the Data field. If bit 3 is set the Flag byte is accessed.

For STATISTICS RAM accesses the M.S. bits 12 of ADR_SEL is ignored. The L.S. 3 bits (2 to 0) indicate the RAM Word address, and the remaining 8 bits (11 to 3) indicate the RAM Row address.

TABLE 29

The Statistics RAM is composed of 320 64 bit words. Bits (11 to 3) of ADR_SEL the RAM ROW address. Bits (2 to 0) indicate which byte of the 64 bit word is to be The FIFO RAM is composed of 1152 72 bit words. Bits 12 to 4 of ADR_SEL indicate the RAM ROW address for a given block of FIFO RAM as determined by Bits 14 to 13. Bits 3 to 0 indicate which part of the 72 bit word is to be accessed as shown below.

FIG. 59 depicts the DIO RAM access address mapping: The ram accessed via the DIOLADR register is dependent upon bits 14:13 or the DIO_ADR register according to the Table 30 below.

TABLE 30

| DIO ADR Bits 14::13 | Addressed Block | Address Range |
| --- | --- | --- |
| 11 | 2nd FIFO Ram block | Fifo Ram Address 0X200–0X3FF |
| 10 | 1st FIFO Ram block | Fifo Ram Address 0X000–0X1FF |
| 01 | 3rd FIFO Ram block | Fifo Ram Address 0x400–0X5FF |
| 00 | STATISTIC Ram block | Stats. Ram Address 0X000–0X140 |

The DIO Data Register (DIO DATA register) address allows indirect access to internal registers and SRAM. There is no actual DIO DATA register, accesses to this address are mapped to an internal bus access at the address specified in the DIOLADR register described in reference to Table 29 and FIG. 59.

The DIO Data Increment Register (DIO DATA INC register) address allows indirect access to internal registers and SRAM. Accesses to this register cause a post-increment of the ADR_SEL field of the DIO_ADR register described in reference to Table 29 and FIG. 59.

Table 31 below depicts the arrangement and name of the internal registers and a corresponding DIO address.

| DIO Address | |
| --- | --- |
| 0x00–0x07 | |
| 0x08–0x017 | |
| 0x1 Q–0x17 | |
| 0x18–0x1 F | |
| 0x20–0x27 | |
| 0x28–0x2F | |
| 0x30–0x37 | |
| Port D | registers |
| Port i | registers |

Appendix A
Port Statistics Descriptions
Good Rx Frames
   The total number of good packets (including unicast, broadcast packets and multicast packets) received.
Rx Octets
   This contains a count of data and padding octets in frames that successfully received. This does not include octets in frames received with frame-too-long, FCS, length or alignment errors.
Multicast Rx Frames
   The total number of good packets received that were directed to the multi-cast address. Note that this does not include packets directed to the broadcast address.
Broadcast Rx Frames
   The total number of good packets received that were directed to the broadcast address. Note that this does not include multicast packets.
Rx Align/Code Errors
   For the 10 Mbs ports, the counter will record alignment errors.
   For 100 Mbs ports, the counter will record the sum of alignment errors and code errors (frame received with rxerror signal).
Rx CRC Errors
   A count of frames received on a particular interface that are an integral number of octets in length but do not pass the FCS check.
Rx Jabbers
   The total number of packets received that were longer than 1518 octets (excluding framing bits, but including FCS octets), and had either a bad Frame Check Sequence (FCS) with an integral number of octets (FCS error) or a bad FCS with a non-integral number of octets. (Alignment Error). (1532 octets if SYSCTRL option bit LONG is set).
Rx Fragments
   The total number of packets received that were less than 64 octets in length (excluding framing bits, but including FCS octets) and had either a bad fame Check Sequence (FCS) with an integral number of octets (FCS Error) or a bad FCS with a non-integral number of octets (Alignment error).
Oversize Rx Frames
   The total number of packets received that were longer than 1518 octets (excluding framing bits, but including FCS octets) and were otherwise well formed. (1532 octets if SYSCTRL option bit LONG is set)
Undersize Rx Frames
   The total number of packets received that were less than 64 octets long (excluding framing bits, but including FCS octets) and were otherwise well formed.
Rx+Tx Frames 65–127
   The total number of packets (including bad packets) received and transmitted that were between 65 and 127 octets in length inclusive (excluding framing bits but including FCS octets).
Rx+Tx Frames 64
   The total number of packets (including bad packets) received and transmitted that were 64 octets in length (excluding framing bits but including FCS octets).
Rx+Tx Frames 256–511
   The total number of packets (including bad packets) received and transmitted that were between 256 and 511 octets in length inclusive (excluding framing bits but including FCS octets).
Rx+Tx Frames 128–255
   The total number of packets (including bad packets) received and transmitted that were between 128 and 255 octets in length inclusive (excluding framing bits but including FCS octets).
Rx+Tx Frames 1024–1518
   The total number of packets (including bad packets) received and transmitted that were between 1024 and 1518 octets in length inclusive (excluding framing bits but including FCS octets).

Note: if the LONG option bit is set, this statistic count frames that were between 1024 and 1536 octets in length inclusive (excluding framing bits but including FCS octets).

Rx+Tx Frames 512–1023

The total number of packets (including bad packets) received and transmitted that were between 512 and 1023 octets in length inclusive (excluding framing bits but including FCS octets).

SQE Test Errors

A count of times that the SQE TEST ERROR message is generated by the PLS sublayer for a particular interface. The SQE TEST ERROR message is defined in section 7.2.2.2.4 of ANSI/IEEE 802.3-1985 and its generation in 7.2.4.6 of the same.

Net Octets

The total number of octets of data (including those in bad packets) received on the network (excluding framing bit but including FCS octets). This object can be used as a reasonable indication of Ethernet utilization.

Tx Octets

This contains a count of data and padding octets of frames that were successfully transmitted.

Good Tx Frames

The total number of packets (including bad packets, broadcast packets and multicast packets) transmitted successfully.

Multiple Collision Tx Frames

A count of successfully transmitted frames on a particular interface for which transmission is inhibited by more that one collision.

Single Collision TF Frames

A count of the successfully transmitted frames on a particular interface for which transmission is inhibited by exactly one collision.

Deferred Tx Frames

A count of the frames for which the first transmission attempt on a particular interface is delayed because the medium was busy.

Carrier Sense Errors

The number of times that the carrier sense condition was lost or never asserted when attempting to transmit a frame on a particular interface. The count represented by an instance of this object is incremented at most once per transmission attempt, even if the carrier sense condition fluctuates during a transmission attempt.

Excessive Collisions

A count of frames for which transmission on a particular interface fails due to excessive collisions.

Late Collisions

The number of times that a collision is detected on a particular interface later than 512 bit-times into the transmission of a packet.

Multicast Tx Frames

The total number of packets transmitted that were directed to a multicast address. Note that this number does not include packets directed to the broadcast address.

Broadcast Tx Frames

The total number of packets transmitted that were directed to the broadcast address. Note that this does not include multicast packets.

Tx Data Errors

This statistic will be switchable between:

The number of Transmit frames discarded on transmission due to lack of resources (i.e. the transmit queue was full). This will allow queue monitoring for dynamic Q sizing and buffer allocation.

The number of data errors at transmission. This is incremented when a mismatch is seen between a received good CRC and a checked CRC at transmission. Or when a partial frame is transmitted due to a receive under run.

The function this counter performs is selected by the STMAP bit (bit 3) of the system control register.

Filtered RX Frames

The count of frames received but discarded due to lack of resources, (TXQ full, Destination Disabled or RX Errors). The number of frames sent to the TSWITCH discard channel for whatever reason.

Address mismatches/Address changes

The sum of:

The number of mismatches seen on a port, between a securely assigned port address and the source address observed on the port. Occurrence of this will cause TSWITCH to suspend the port (See Port Status Register description)

The number of times TSWITCH is required to assign or learn an address for a port.

Address Duplications

The number of address duplications between a securely assigned port address within TSWITCH and a source address observed on this port. Occurrence of this will cause TSWITCH to suspend the port (See Port Status Register description).

The following statistics are mapped in statistics memory region: 0x780–0x7FF.

Rx Over_Runs Port {00:14}

The number of frames lost due to a lack of resources during frame reception. This counter is incremented whenever frame data can not enter the RX FIFO for whatever reason. Frames that over_run after entering the FIFO may also be counted as Rx discards if they are not cut-through.

Collisions Port {00:14}

The number of times the ports transmitter was required to send a Jam Sequence.

The following counters are implemented in previously described counters.

Ts H/W Errors

The function of this counter is performed by the 'Tx Data Errors' counter.

Rx H/W Errors

The function of this counter is performed by the 'Filtered Rx Frames' counter.

What is claimed is:

1. An address matching circuit, comprising:

a memory for containing addresses arranged in a linked list, a first state machine for creating and updating the linked list of addresses, a second state machine for providing routing information for a selected address based upon the linked list of addresses, and a bus watcher circuit for monitoring data traffic on a bus to detect addresses.

2. An address matching circuit, comprising:

an address memory with an address memory bus, a bus watcher circuit connected to an external data bus for detecting addresses, an arbiter connected to said bus watcher and said address memory bus for generating control signals for prioritizing access to said address memory bus, and a plurality of state machines selectively connectable to said address memory bus in response to said control signals and for providing routing information based upon matching a detected address with an address stored in said address memory, for adding, updating or deleting addresses and associated routing information in said address memory, and for searching for an address in said address memory.

* * * * *